US012707089B2

(12) United States Patent
Koo et al.

(10) Patent No.: US 12,707,089 B2
(45) **Date of Patent: *Aug. 11, 2026**

(54) ENCODING/DECODING METHOD FOR VIDEO SIGNAL AND DEVICE THEREFOR

(71) Applicant: LG Electronics Inc., Seoul (KR)

(72) Inventors: Moonmo Koo, Seoul (KR); Mehdi Salehifar, Seoul (KR); Seunghwan Kim, Seoul (KR); Jaehyun Lim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/960,436

(22) Filed: Nov. 26, 2024

(65) Prior Publication Data

US 2025/0088669 A1 Mar. 13, 2025

Related U.S. Application Data

(63) Continuation of application No. 18/231,662, filed on Aug. 8, 2023, now Pat. No. 12,192,524, which is a continuation of application No. 18/094,047, filed on Jan. 6, 2023, now Pat. No. 11,770,560, which is a continuation of application No. 17/282,120, filed as application No. PCT/KR2019/012840 on Oct. 1, 2019, now Pat. No. 11,589,075.

(Continued)

(51) Int. Cl.

*H04N 19/00* (2014.01)
*H04N 19/129* (2014.01)
*H04N 19/176* (2014.01)
*H04N 19/625* (2014.01)
*H04N 19/70* (2014.01)

(52) U.S. Cl.

CPC ......... *H04N 19/625* (2014.11); *H04N 19/129* (2014.11); *H04N 19/176* (2014.11); *H04N 19/70* (2014.11)

(58) Field of Classification Search

CPC .. H04N 19/625; H04N 19/129; H04N 19/176; H04N 19/70; H04N 19/12; H04N 19/423

See application file for complete search history.

(56) References Cited

U.S. PATENT DOCUMENTS 11,122,290 B2 * 9/2021 Jang .................... H04N 19/105
2018/0332289 A1 * 11/2018 Huang .................. H04N 19/96

(Continued)

*Primary Examiner* — Frank F Huang

(74) *Attorney, Agent, or Firm* — Fish & Richardson P.C.

(57) ABSTRACT

Embodiments of the present invention provide a video signal processing method and device. Particularly, a method for decoding a video signal, may comprise the steps of: checking whether a transfer skip is applied to a current block; obtaining, from a video signal, a transform index for indicating a transform type set applied to the current block when the transform skip is not applied to the current block, wherein the transform type set includes transform types applied to the current block in horizontal and vertical directions; checking whether the transform type set includes DCT2; determining a region to which a primary transform is applied based on a checking result; and performing an inverse transform on the region to which the primary transform is applied in the horizontal and vertical directions using the transform types included in the transform type set.

11 Claims, 49 Drawing Sheets

Related U.S. Application Data

(60) Provisional application No. 62/739,800, filed on Oct. 1, 2018.

(56) References Cited

U.S. PATENT DOCUMENTS

| | | | | |
|---|---|---|---|---|
| 2019/0349587 | A1* | 11/2019 | Jang | H04N 19/124 |
| 2019/0387241 | A1* | 12/2019 | Kim | H04N 19/44 |
| 2020/0068195 | A1* | 2/2020 | Yoo | H04N 19/117 |
| 2020/0177901 | A1* | 6/2020 | Choi | H04N 19/186 |
| 2020/0177921 | A1* | 6/2020 | Koo | H04N 19/176 |
| 2020/0374531 | A1* | 11/2020 | Zhao | H04N 19/91 |
| 2021/0014534 | A1* | 1/2021 | Koo | H04N 19/132 |
| 2021/0144376 | A1* | 5/2021 | Tsukuba | H04N 19/139 |
| 2021/0211729 | A1* | 7/2021 | Koo | H04N 19/70 |
| 2021/0218996 | A1* | 7/2021 | Koo | H04N 19/176 |
| 2022/0303542 | A1* | 9/2022 | Paluri | H04N 19/172 |

* cited by examiner

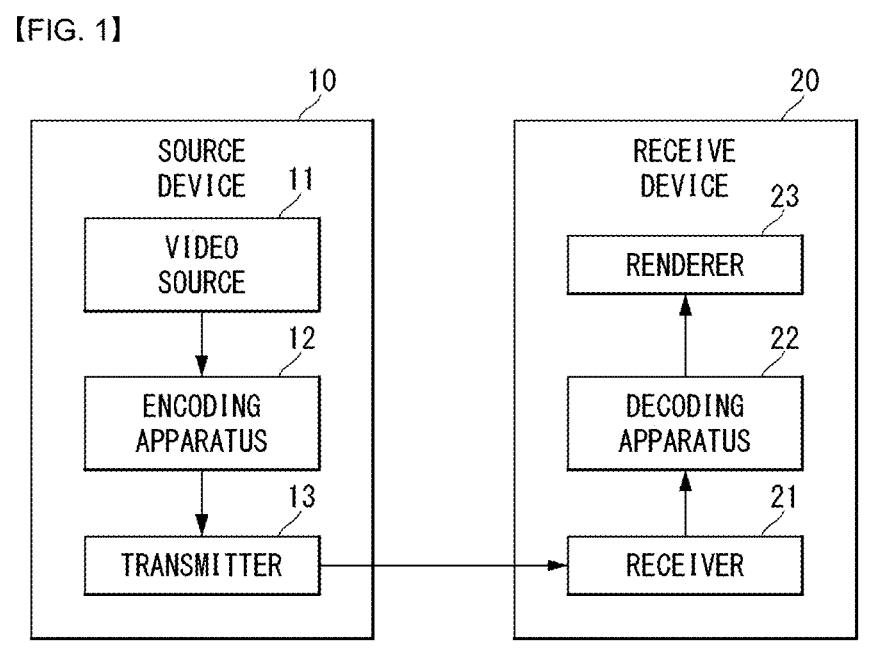

【FIG. 1】

【FIG. 2】
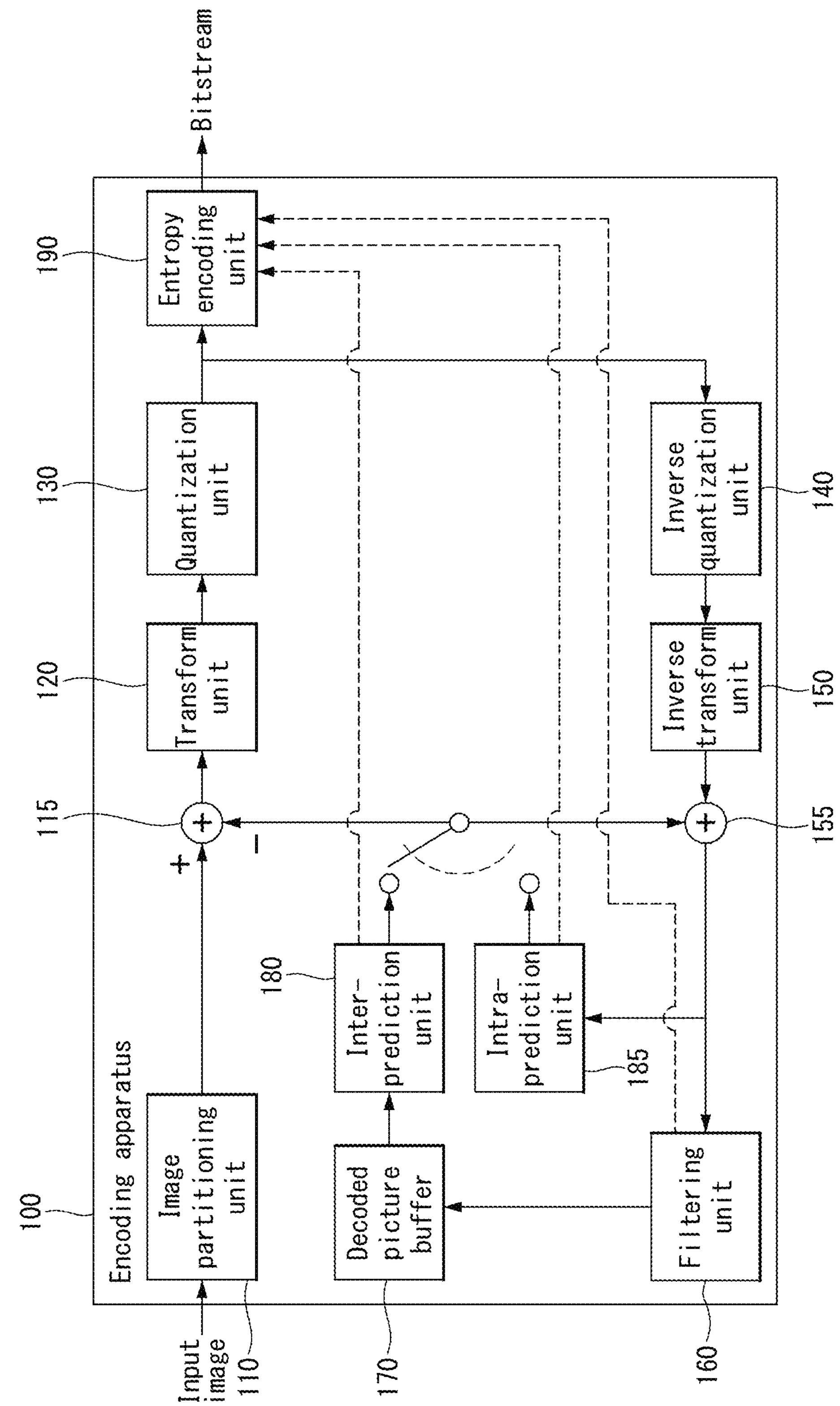

【FIG. 3】
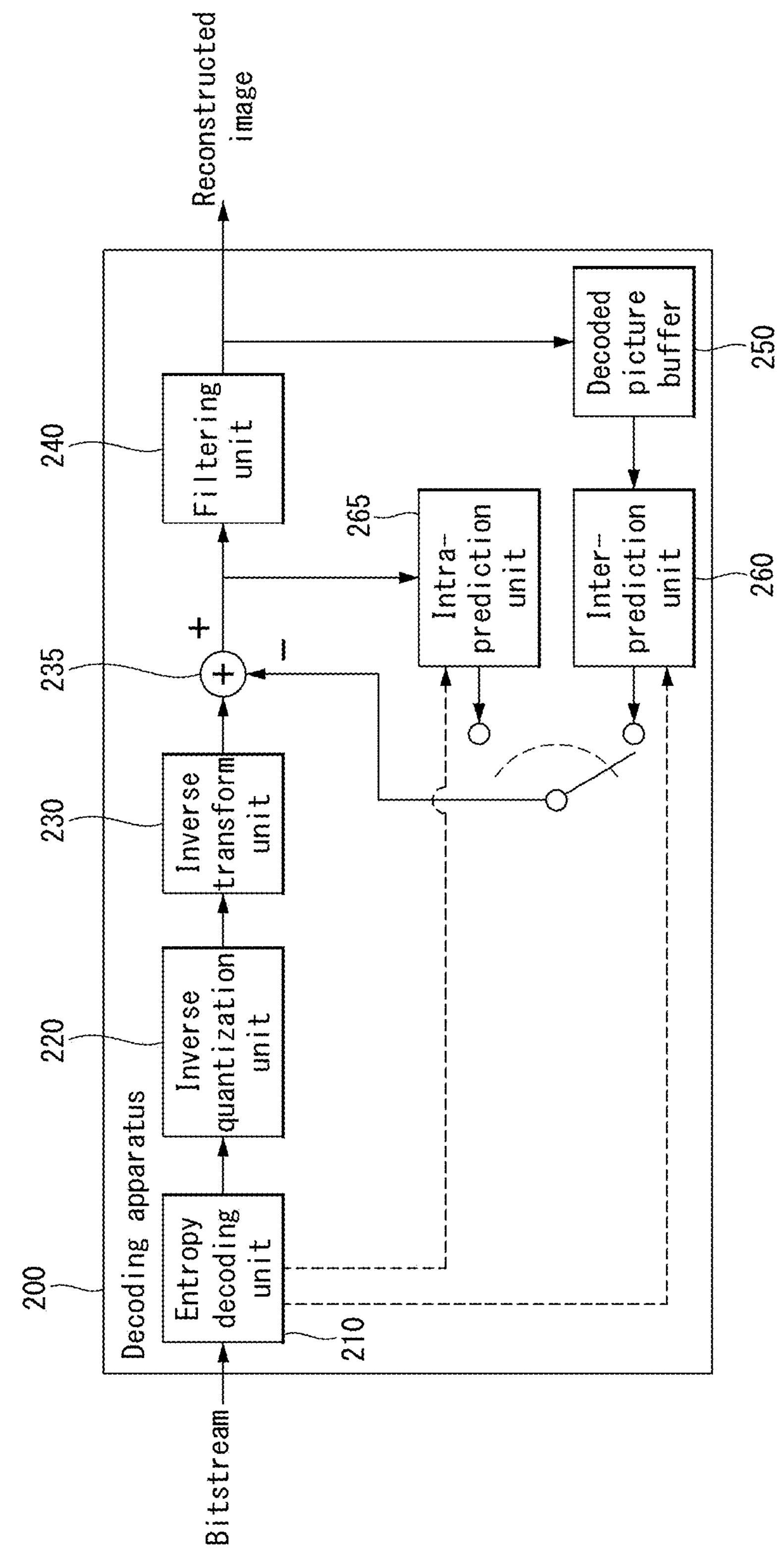

【FIG. 4】
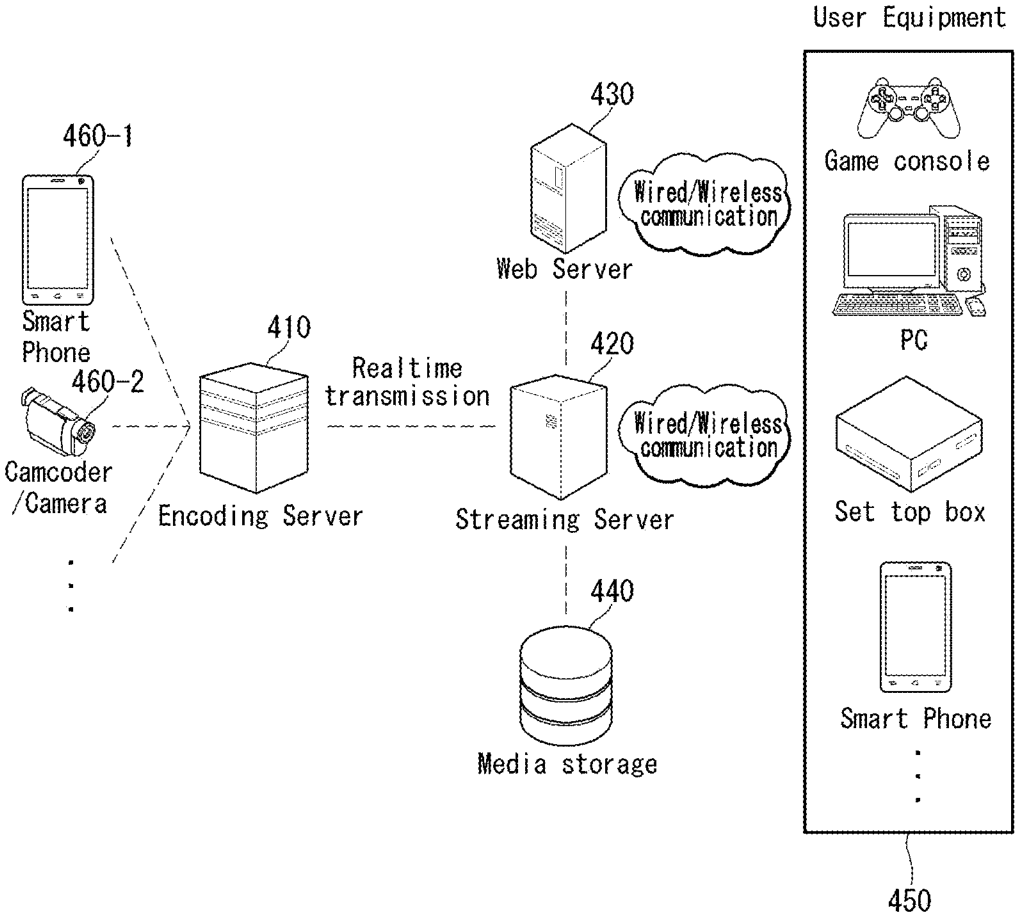

【FIG. 5A】
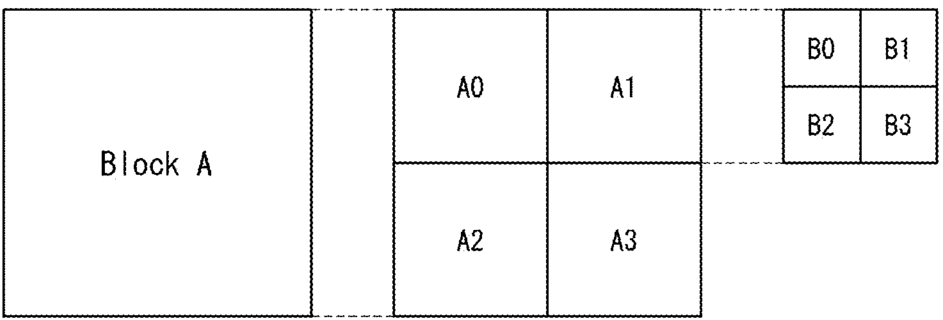
【FIG. 5B】
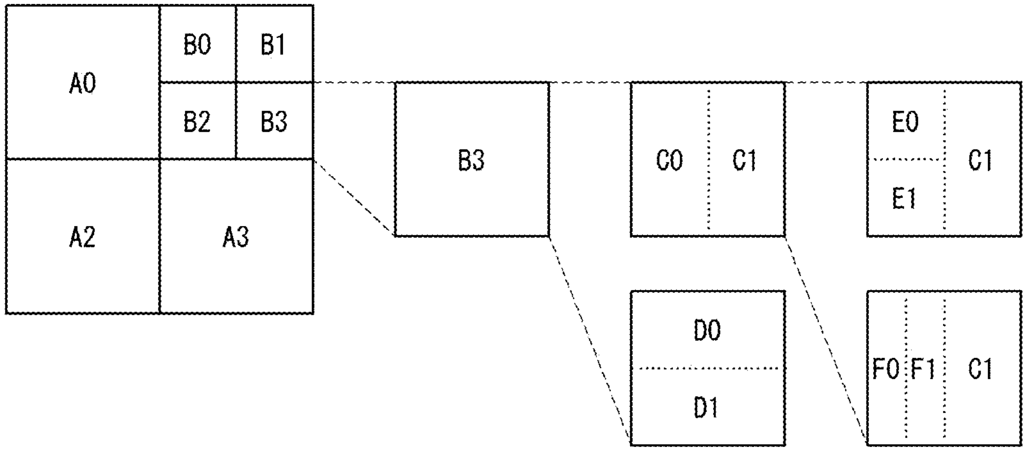
【FIG. 5C】
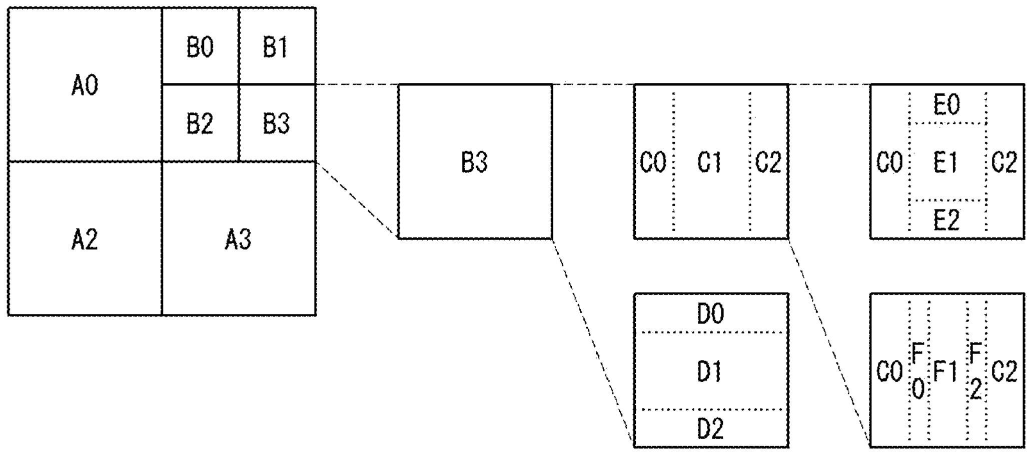

【FIG. 5D】
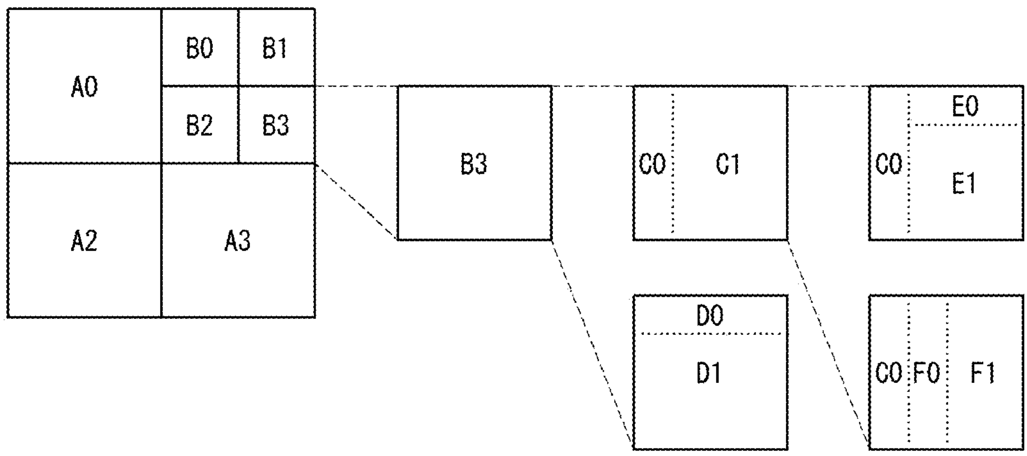

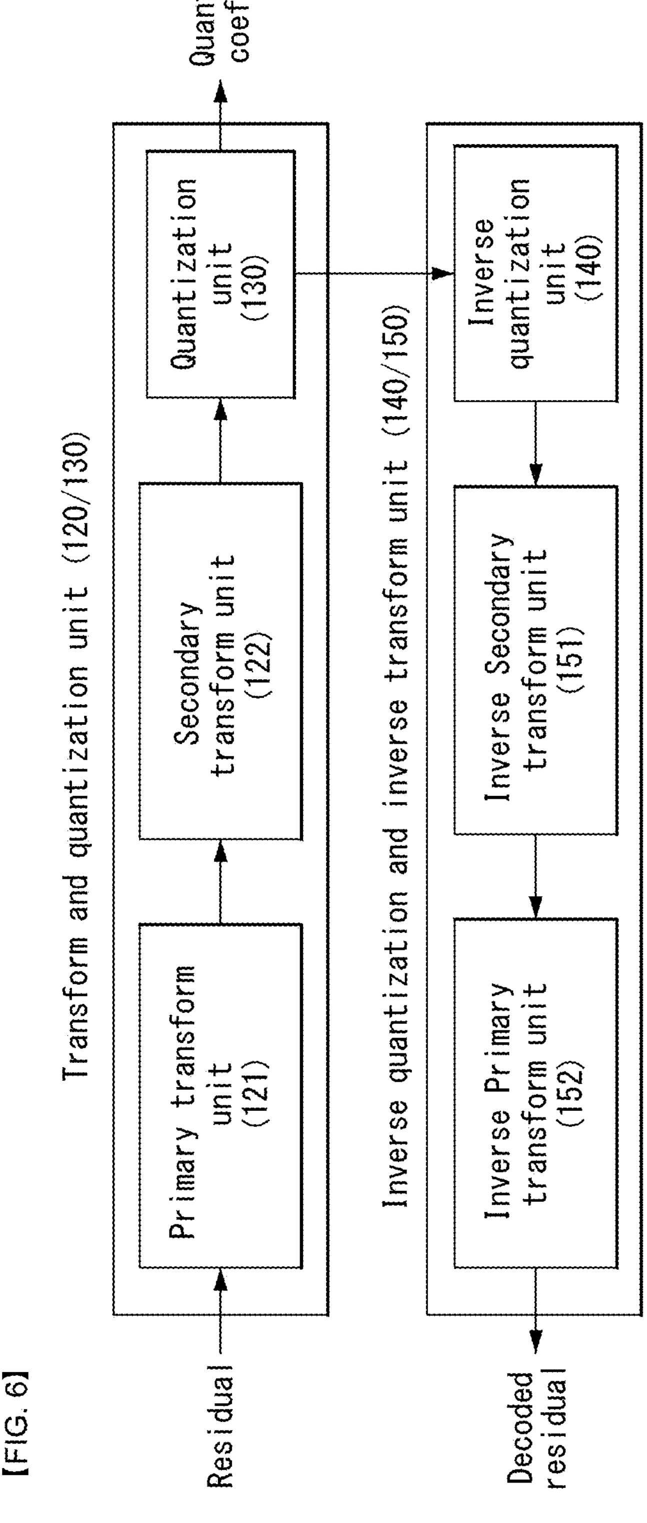
【FIG. 6】

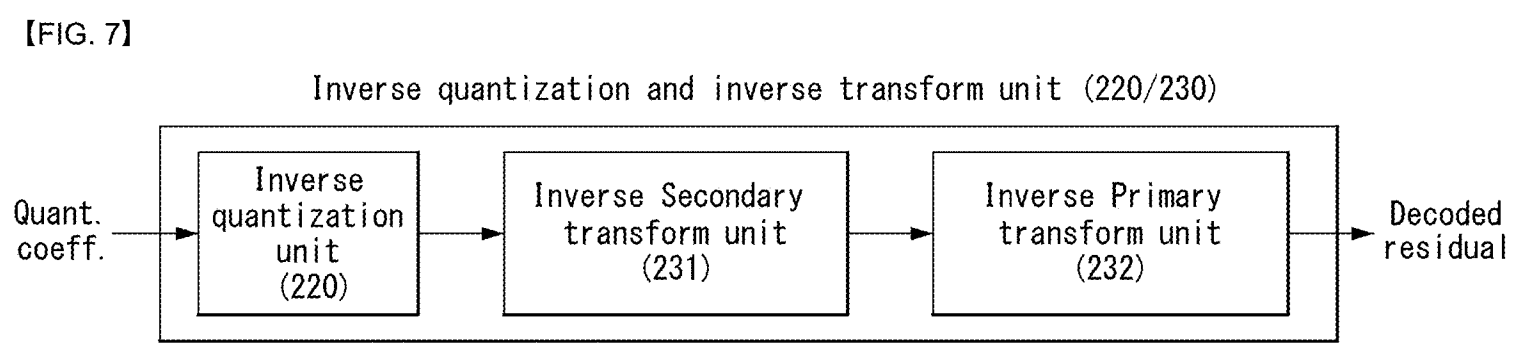

【FIG. 7】

Inverse quantization and inverse transform unit (220/230)

Quant. coeff.

Inverse quantization unit (220)

Inverse Secondary transform unit (231)

Inverse Primary transform unit (232)

Decoded residual

【FIG. 8】
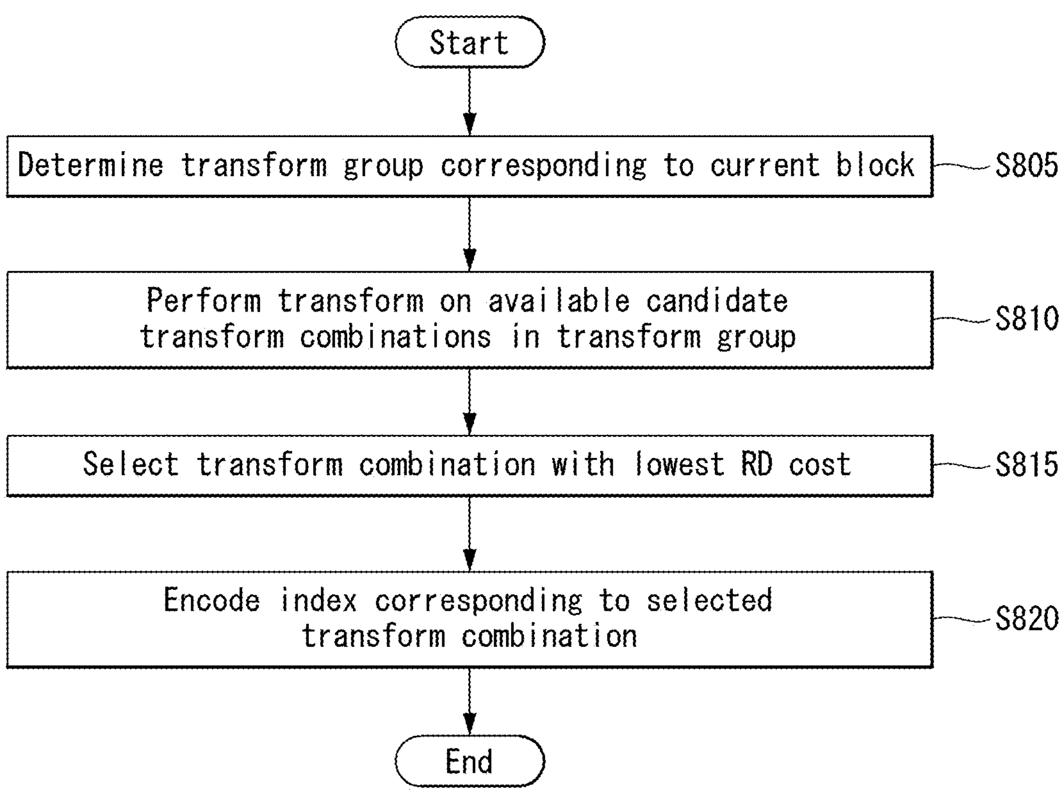

【FIG. 9】
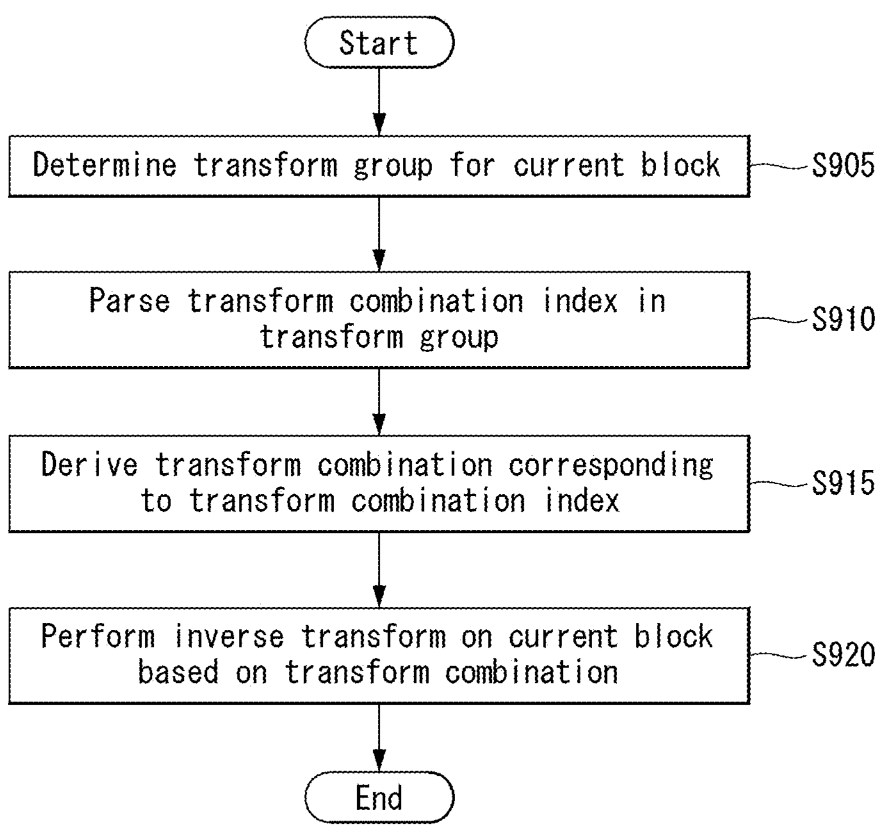

【FIG. 10】
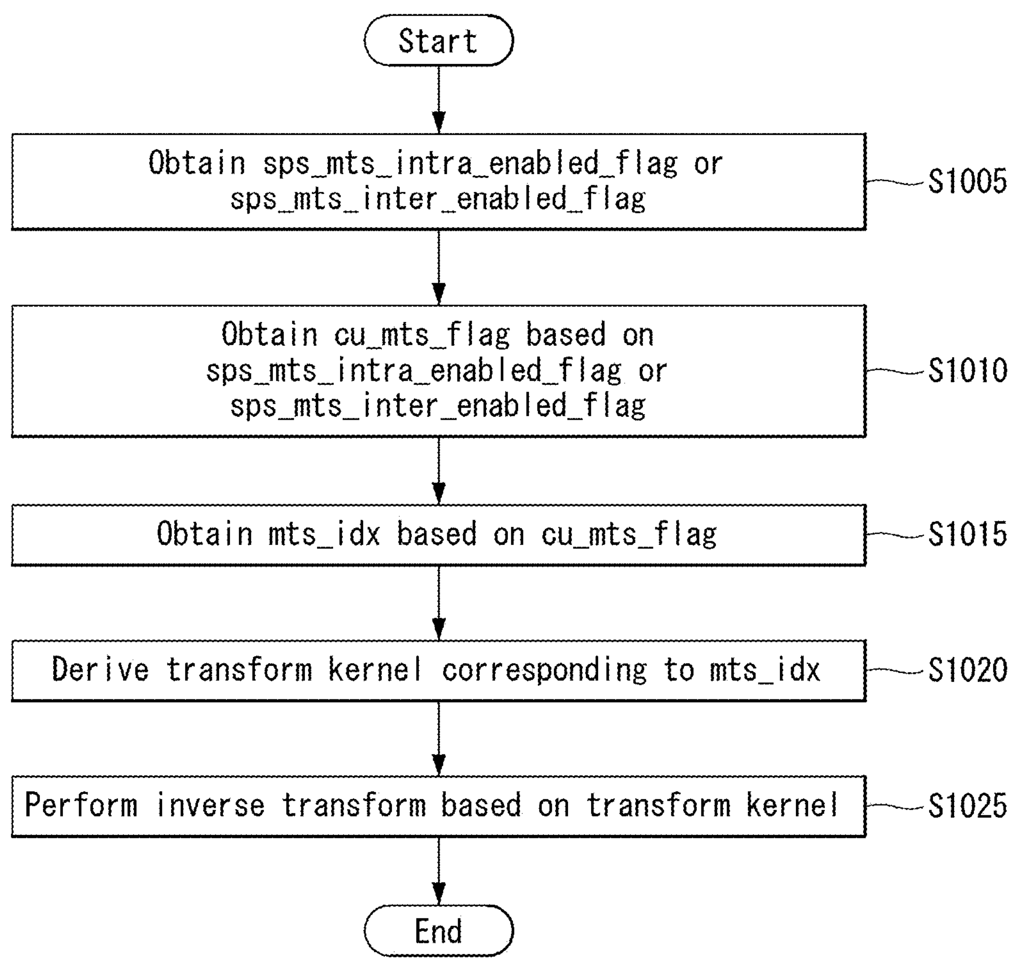

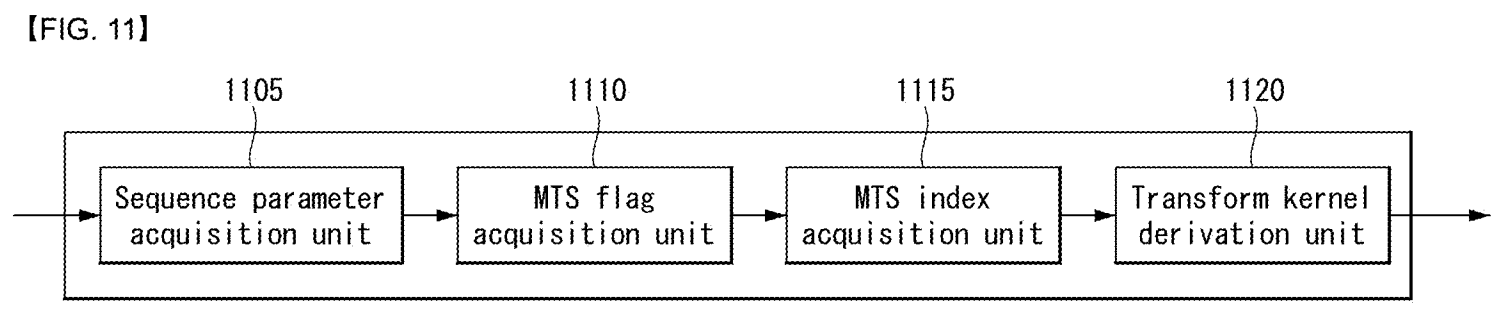

【FIG. 11】

1105 Sequence parameter acquisition unit

1110 MTS flag acquisition unit

1115 MTS index acquisition unit

1120 Transform kernel derivation unit

【FIG. 12】
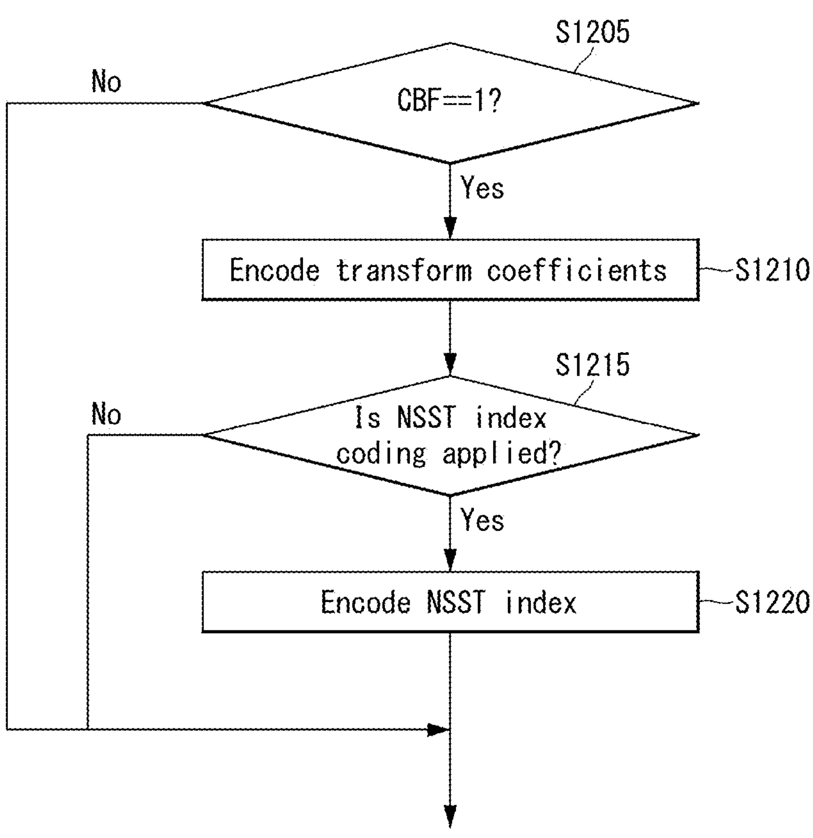

【FIG. 13】
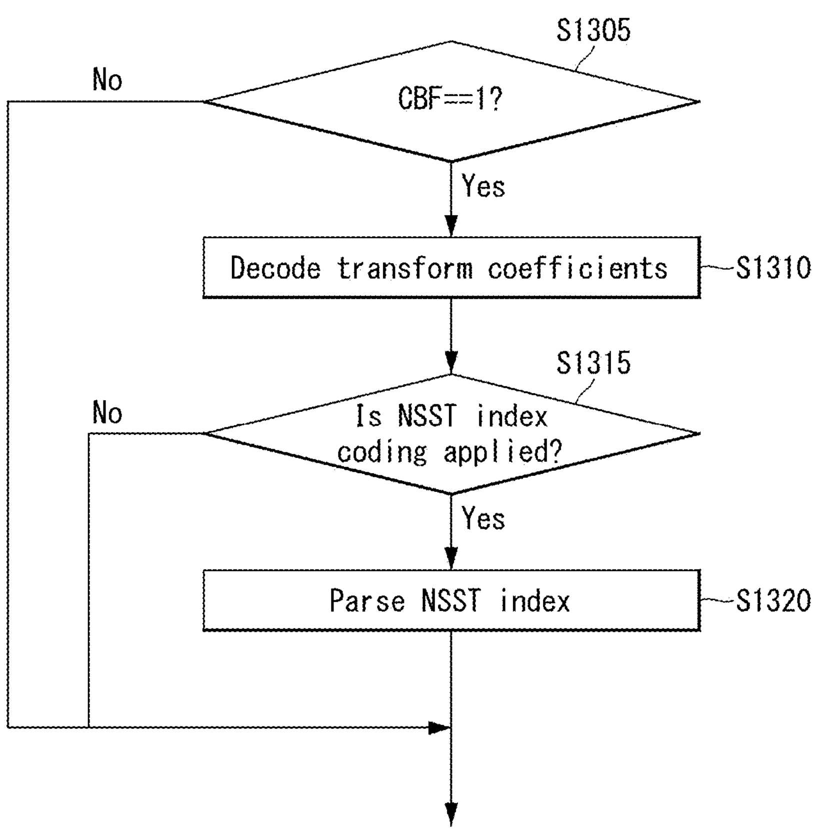

【FIG. 14】
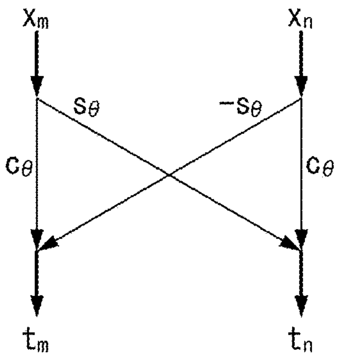

【FIG. 15】
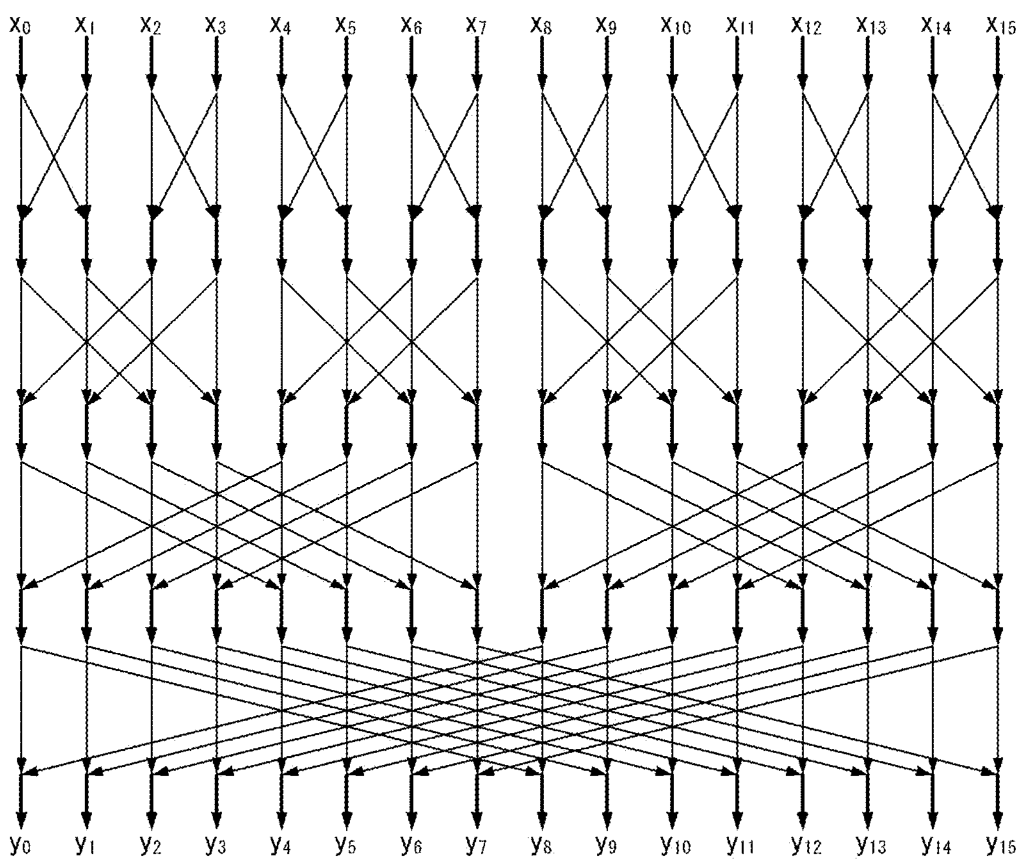

【FIG. 16A】
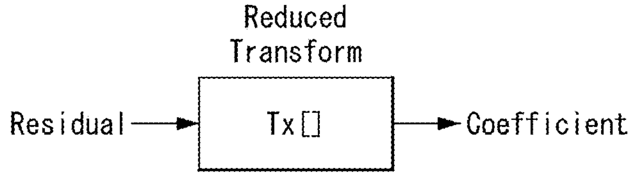
【FIG. 16B】
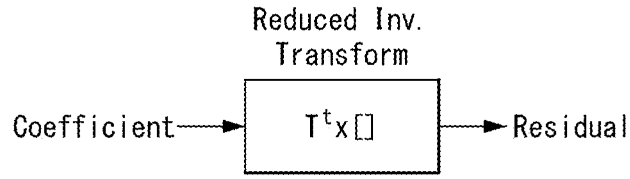

【FIG. 17】
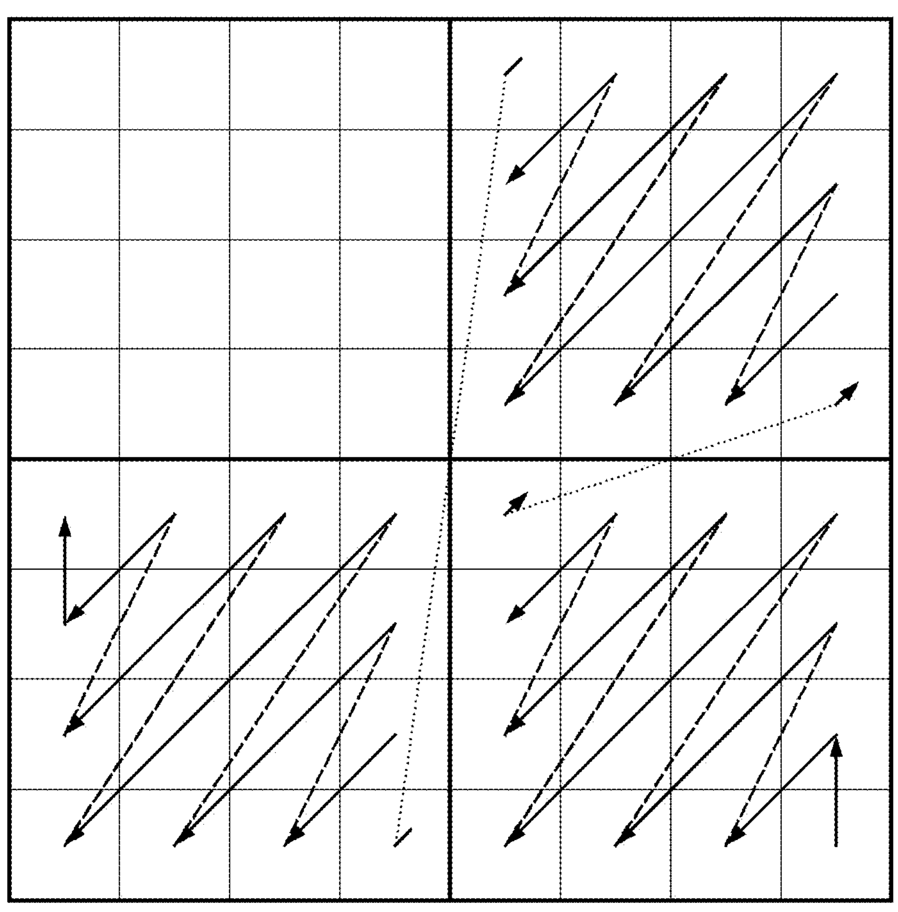

【FIG. 18】
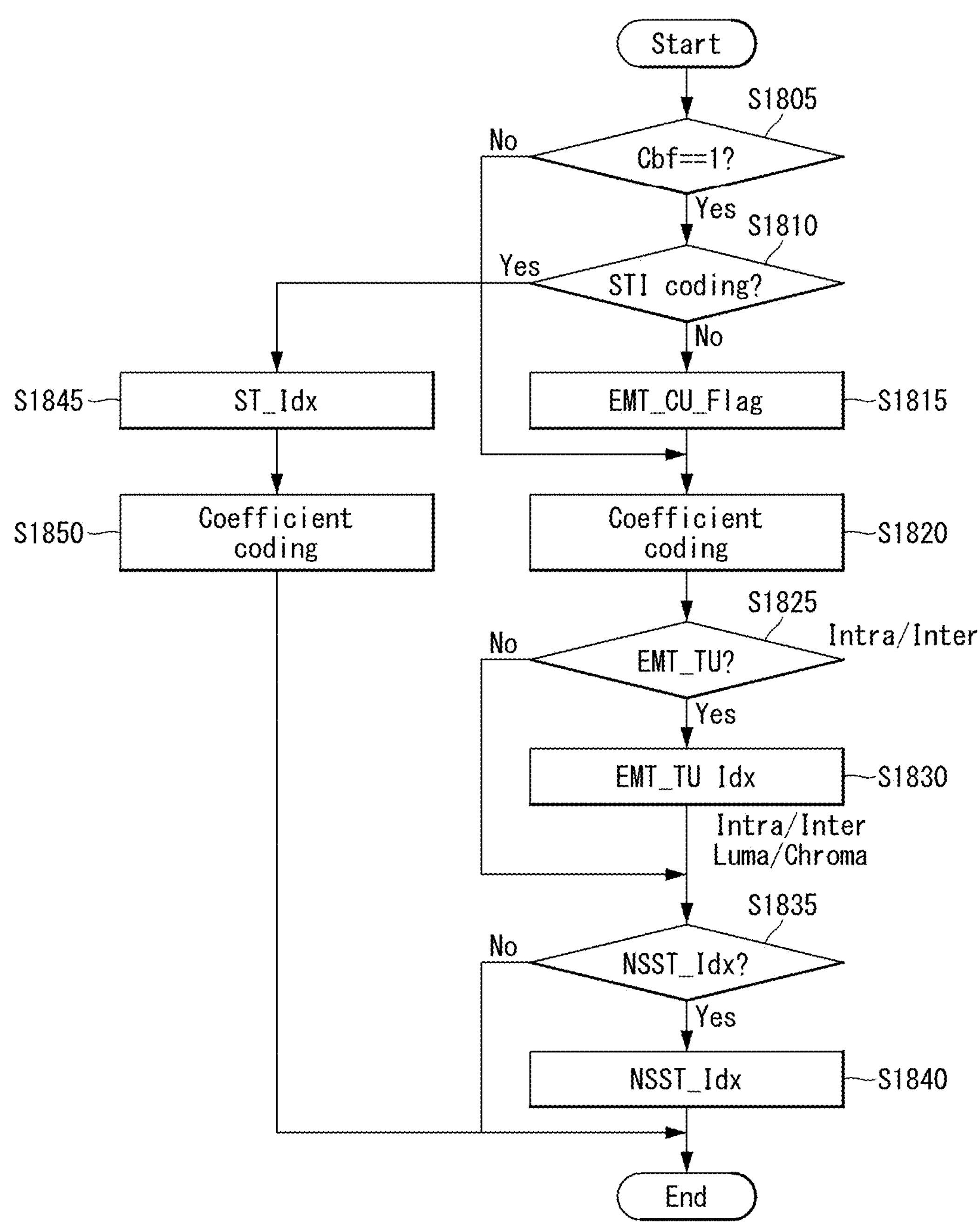

【FIG. 19】
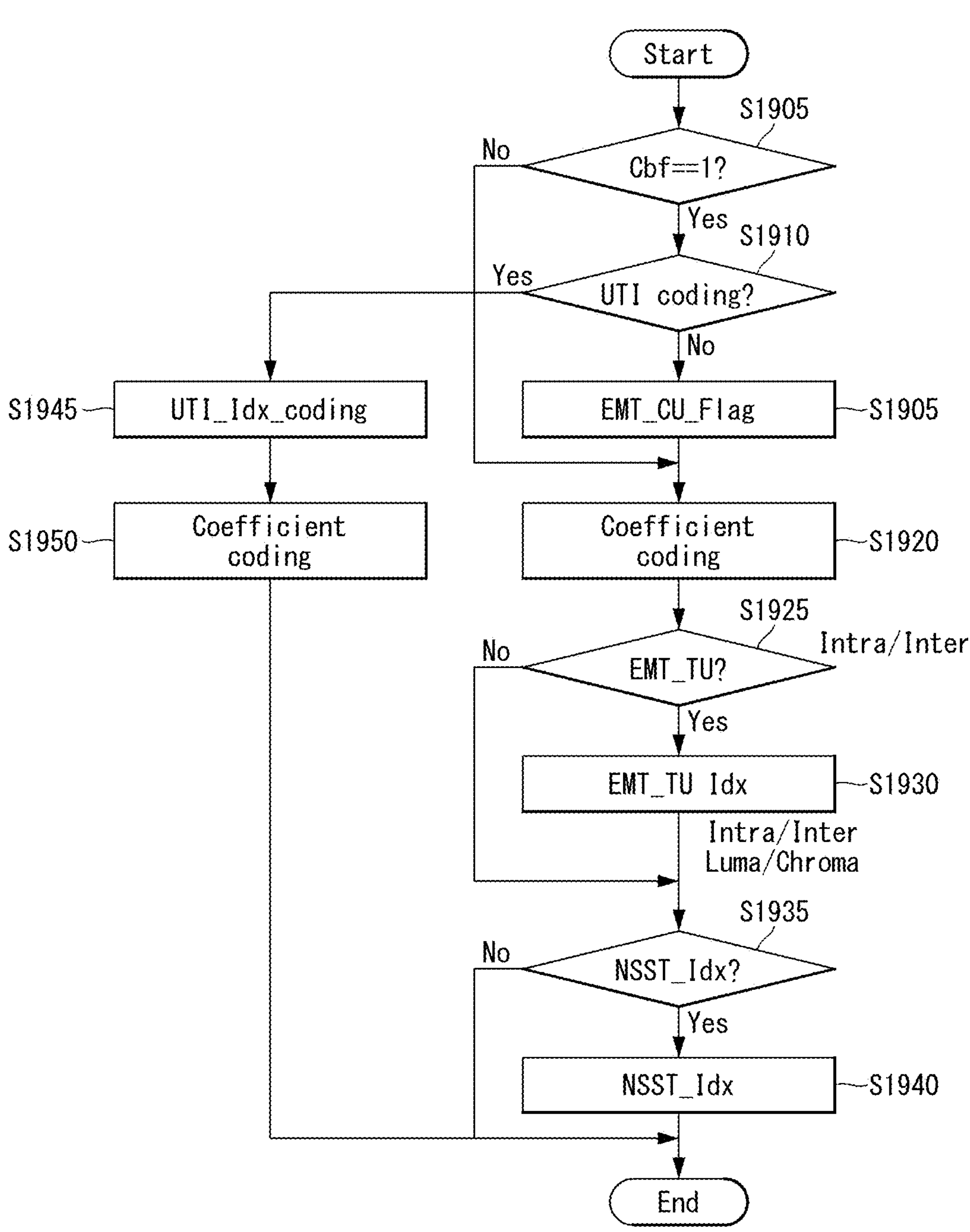

【FIG. 20A】
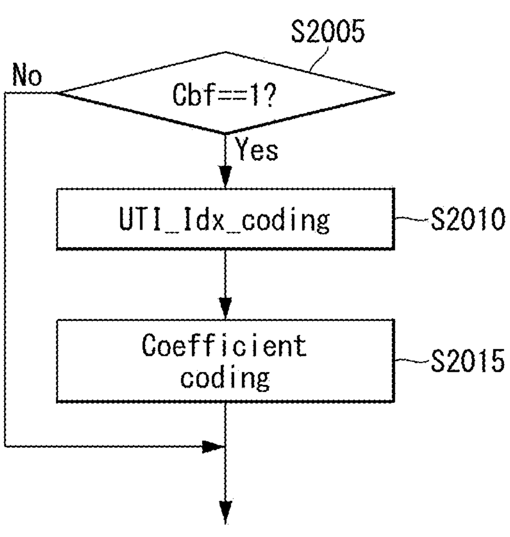

【FIG. 20B】
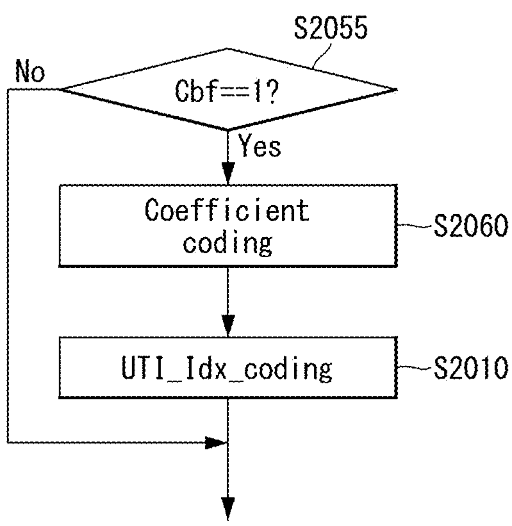

【FIG. 21】
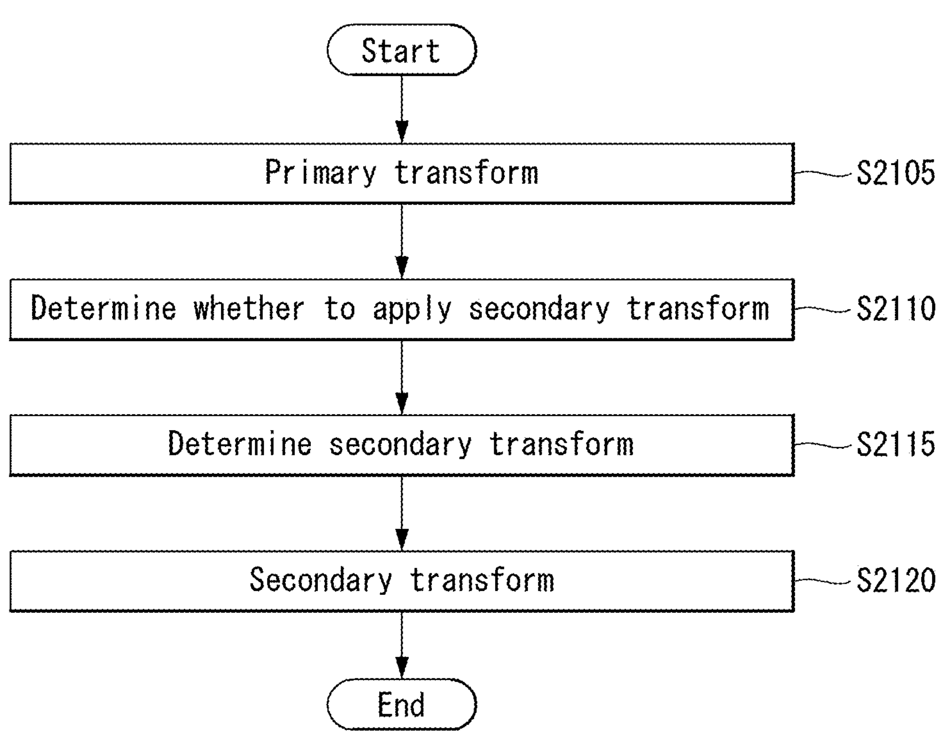

【FIG. 22】
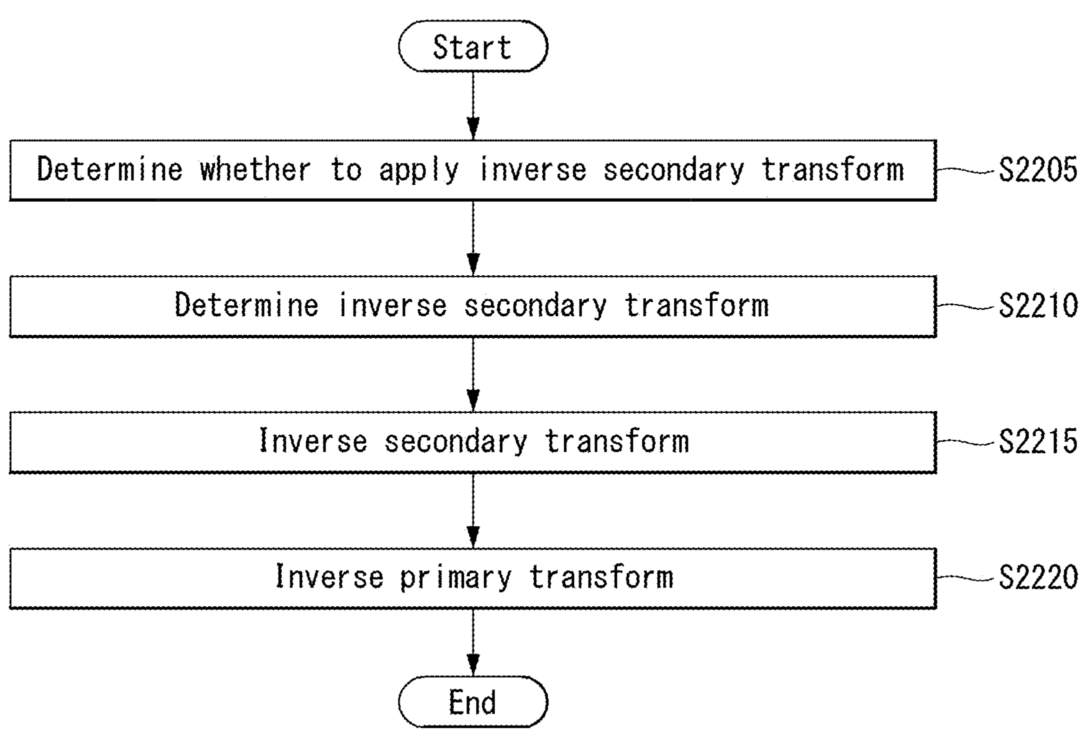

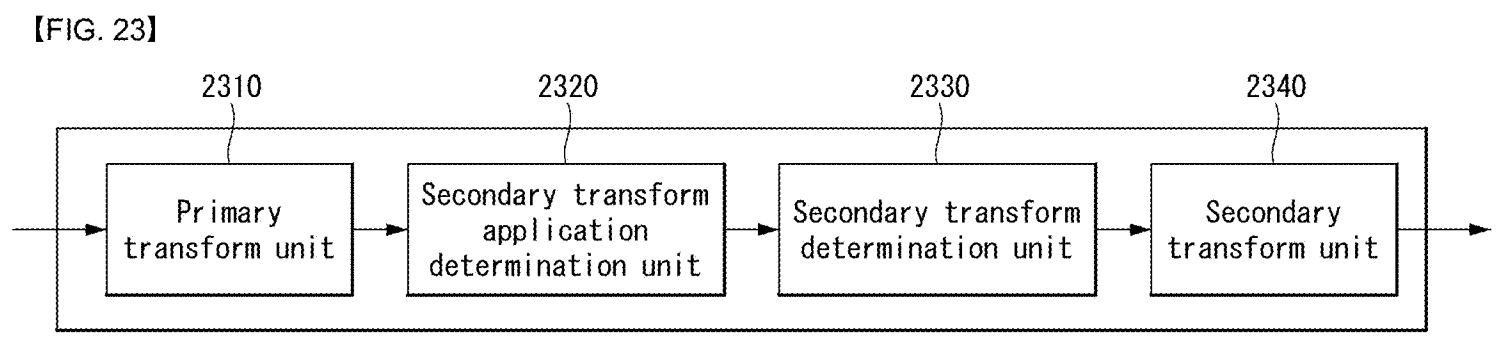

【FIG. 23】

2310 Primary transform unit

2320 Secondary transform application determination unit

2330 Secondary transform determination unit

2340 Secondary transform unit

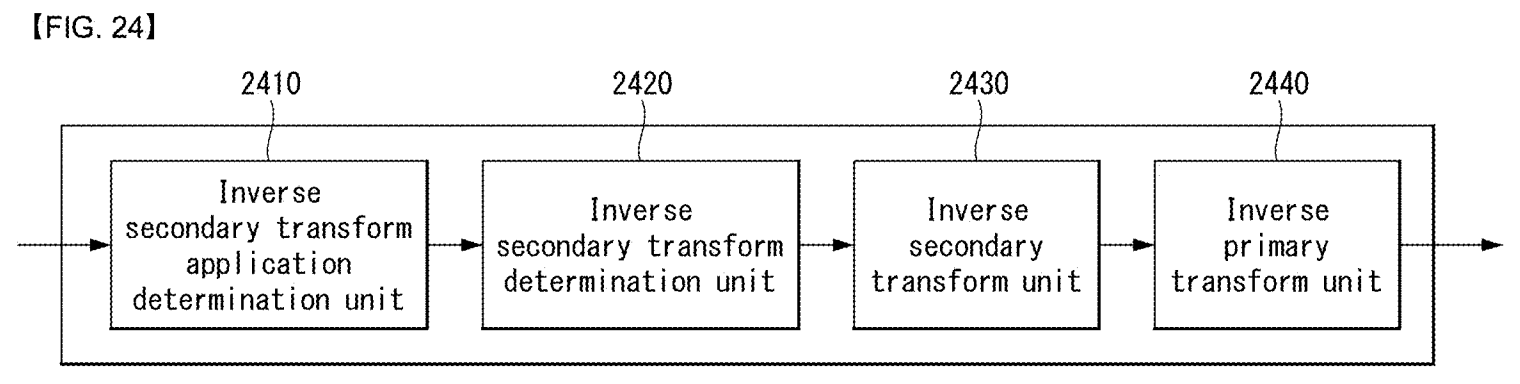

【FIG. 24】

2410 Inverse secondary transform application determination unit

2420 Inverse secondary transform determination unit

2430 Inverse secondary transform unit

2440 Inverse primary transform unit

【FIG. 25】
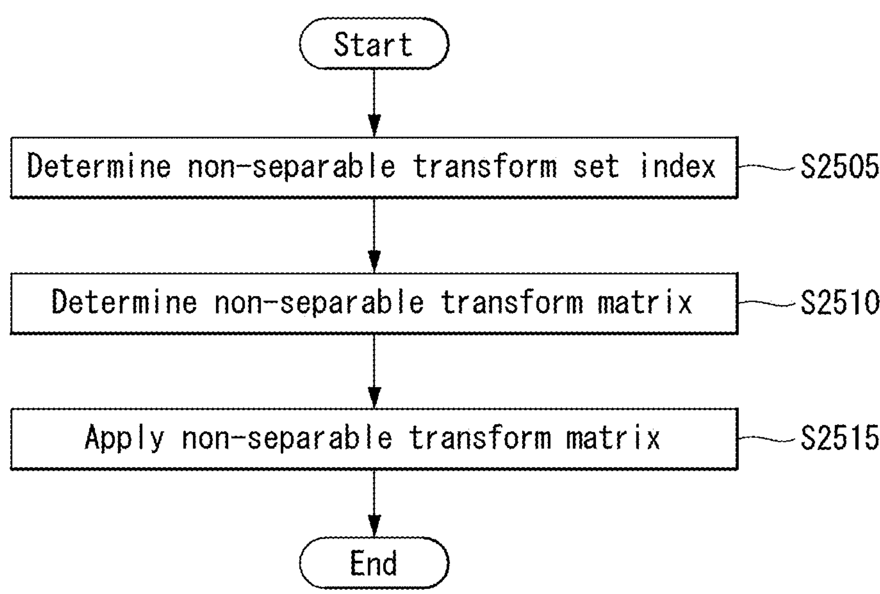

【FIG. 26】
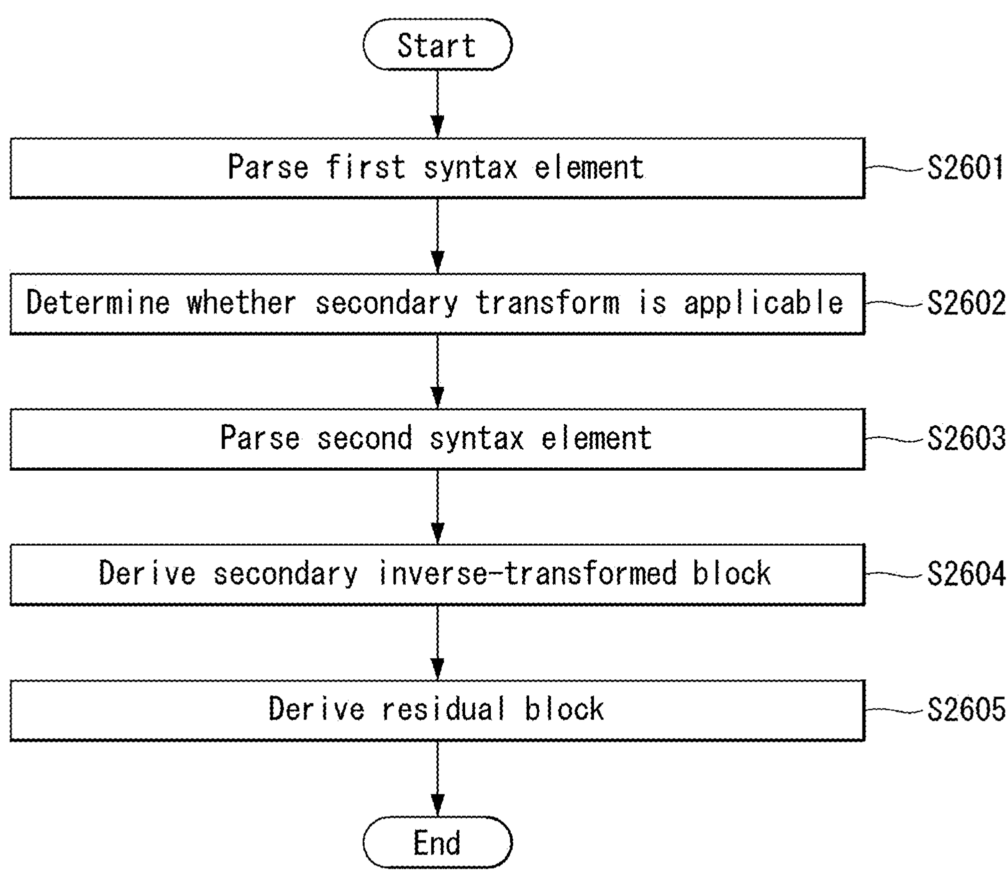

【FIG. 27】
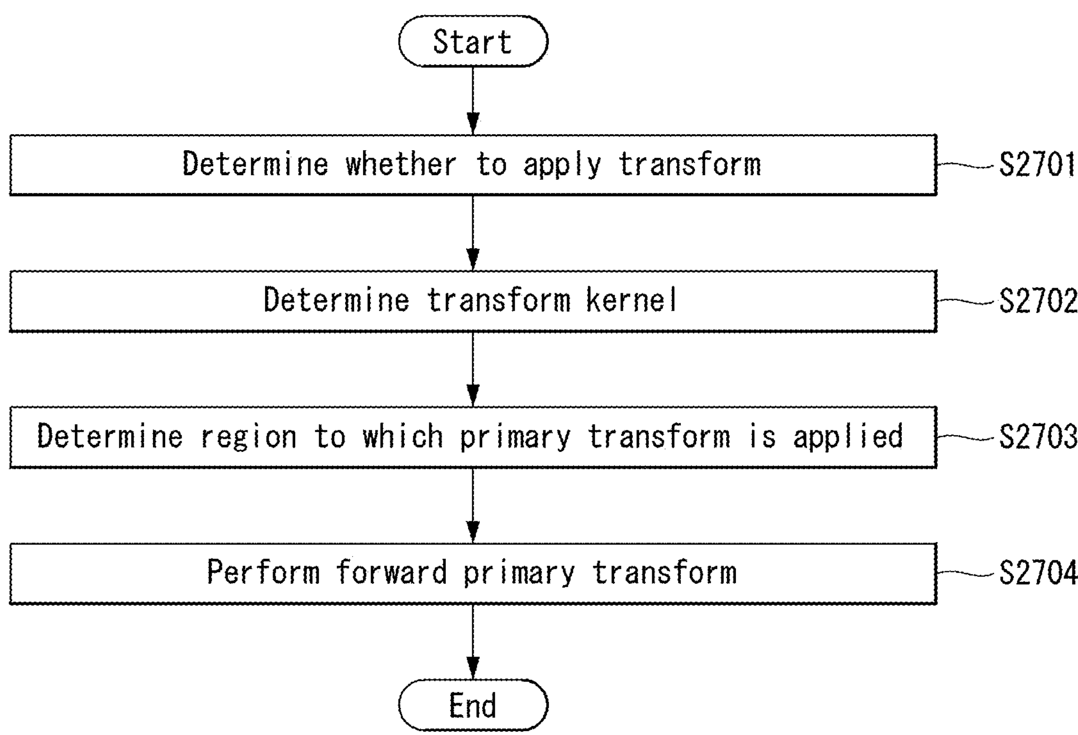

【FIG. 28】
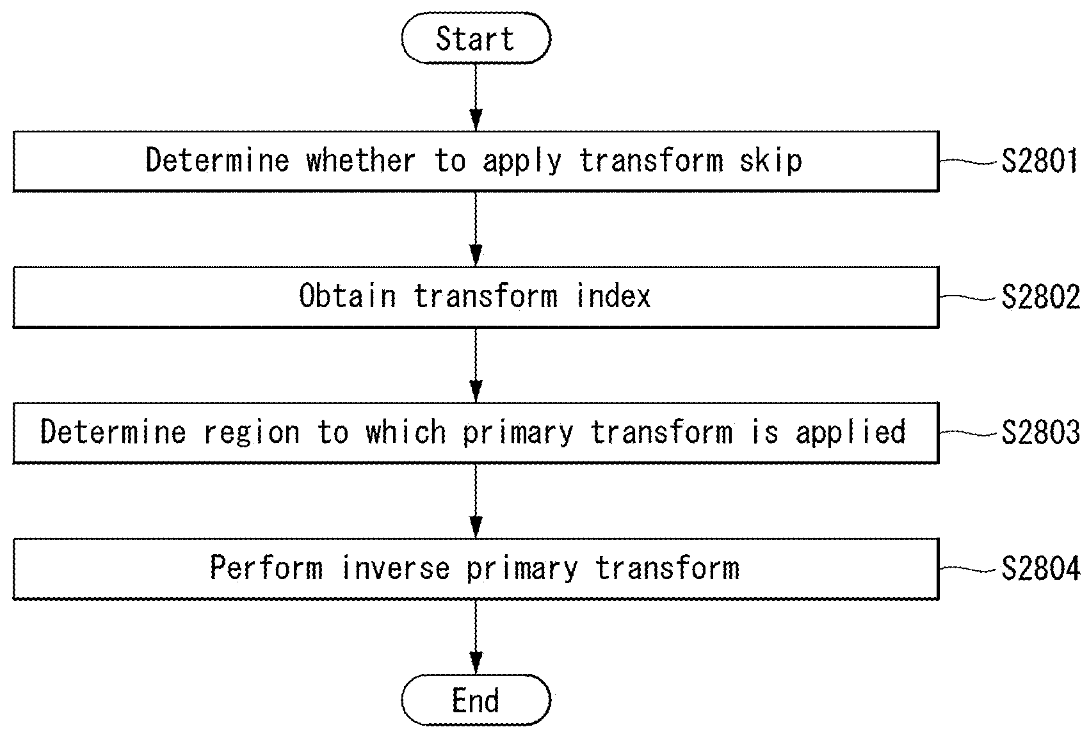

【FIG. 29】
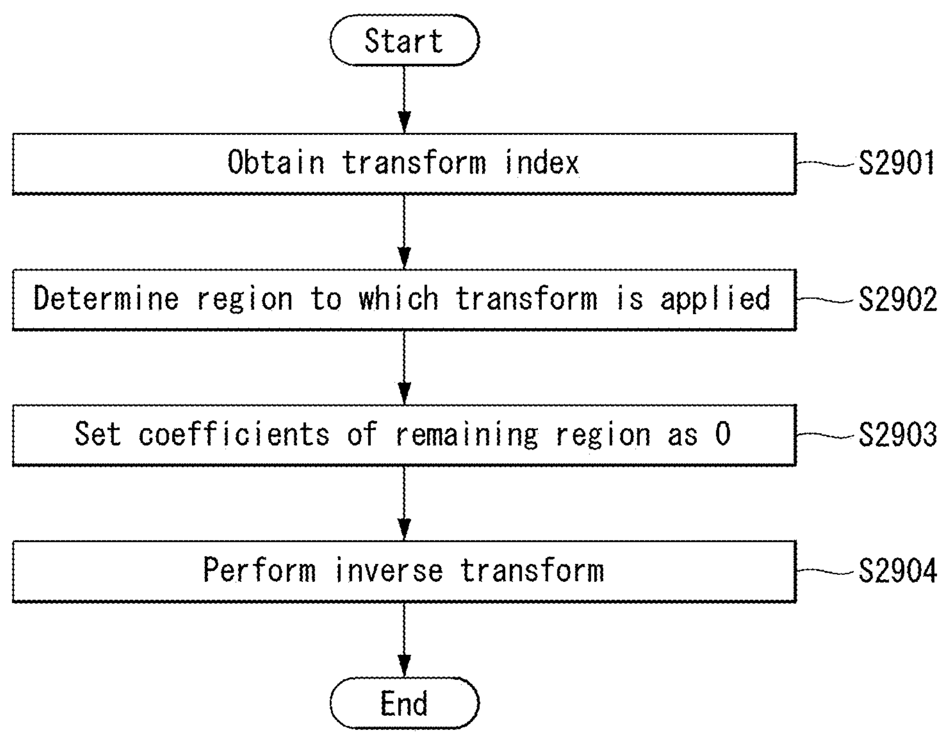

【FIG. 30】
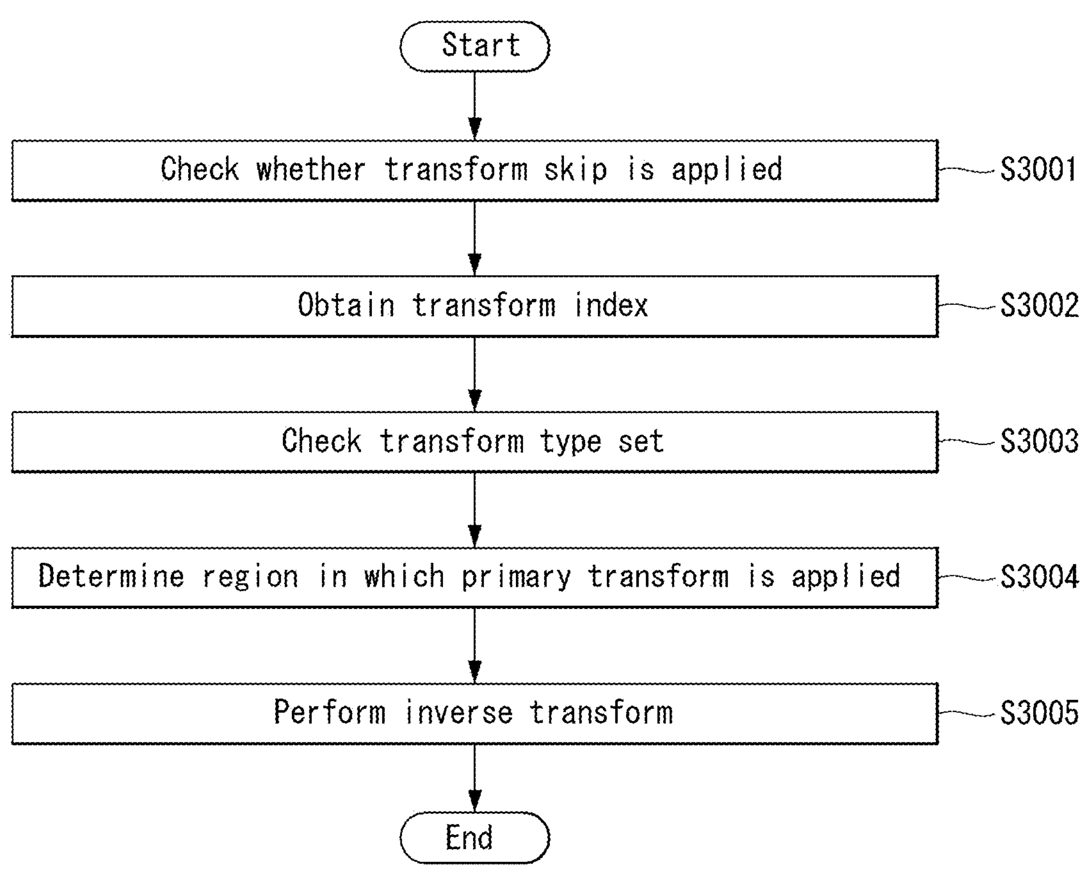

【FIG. 31】
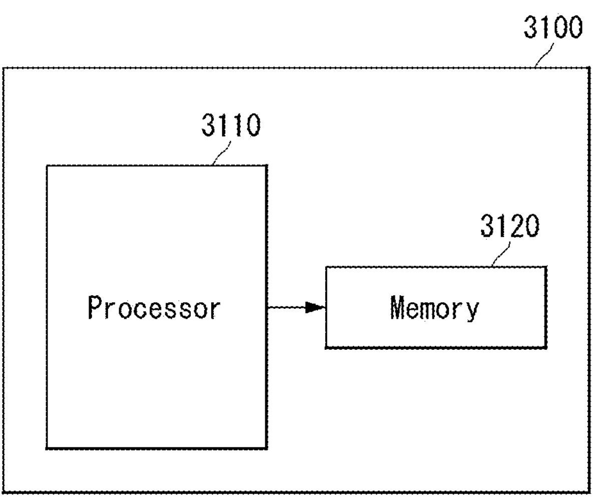

【FIG. 32】
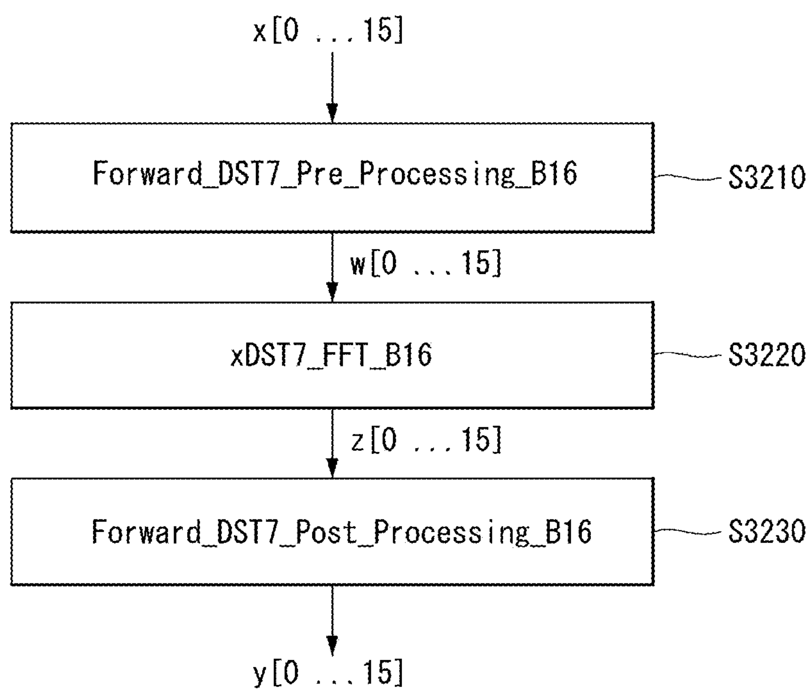

【FIG. 33】
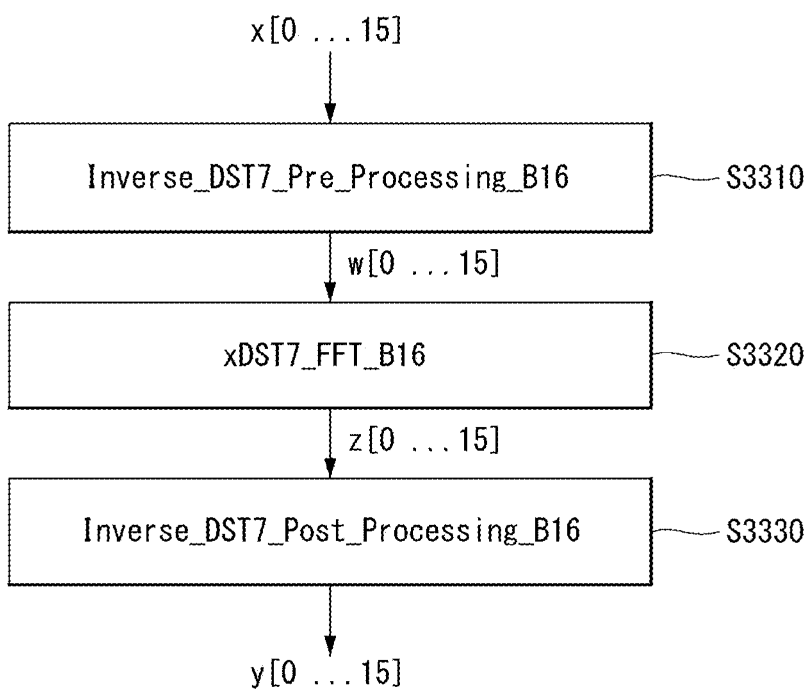

【FIG. 34】
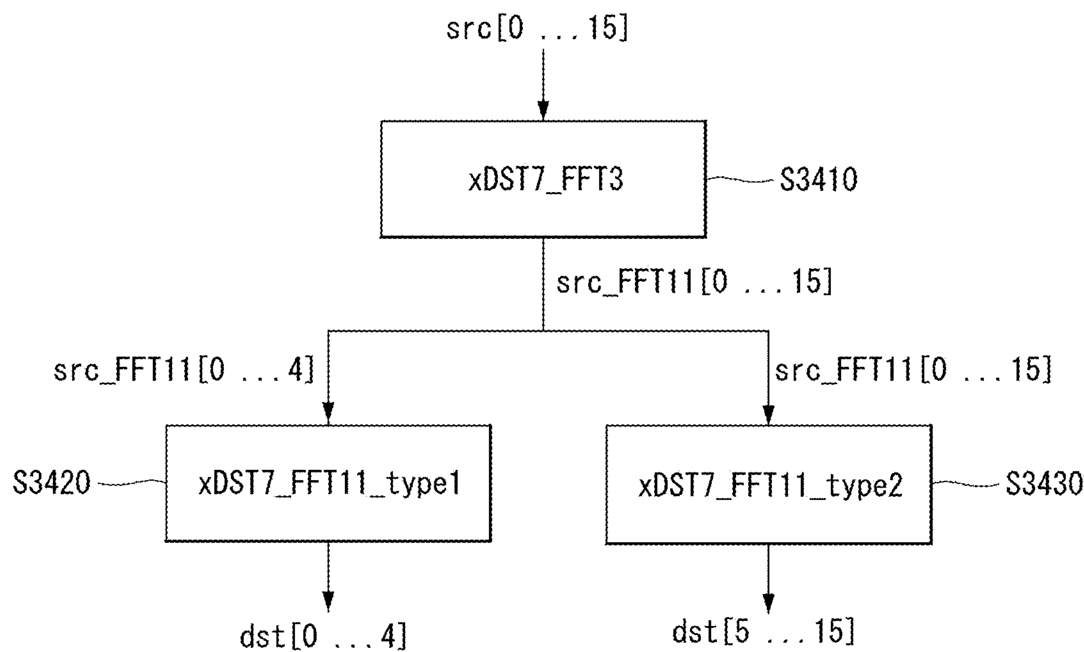

【FIG. 35】
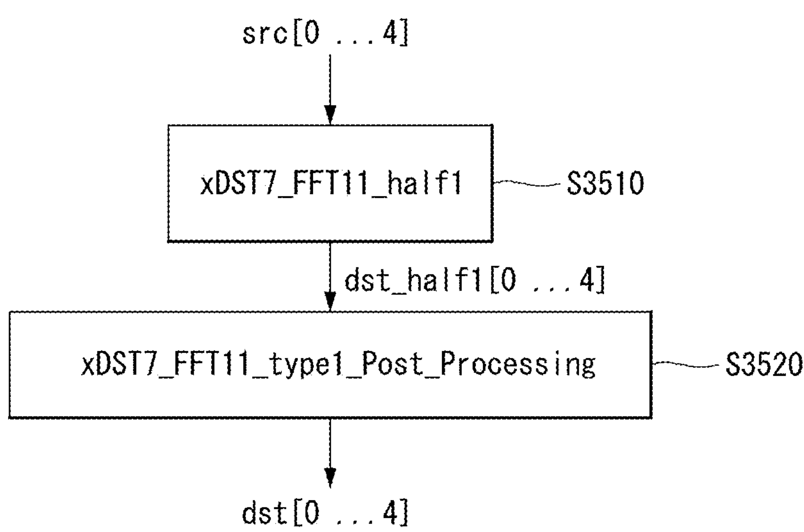

【FIG. 36】
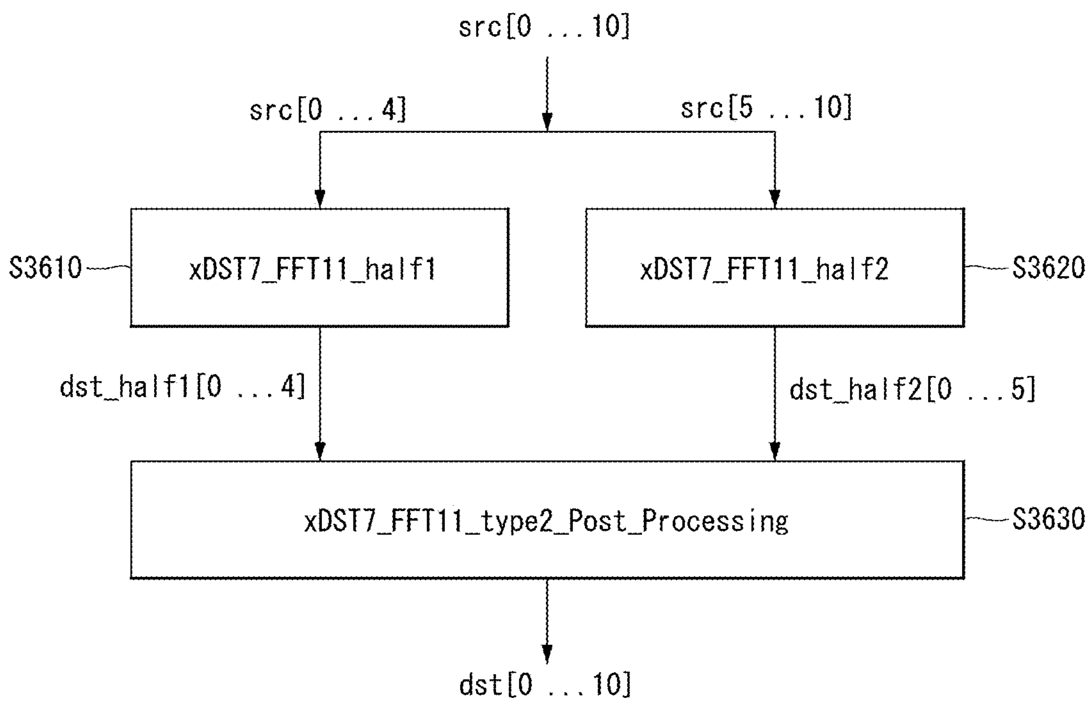

【FIG. 37】
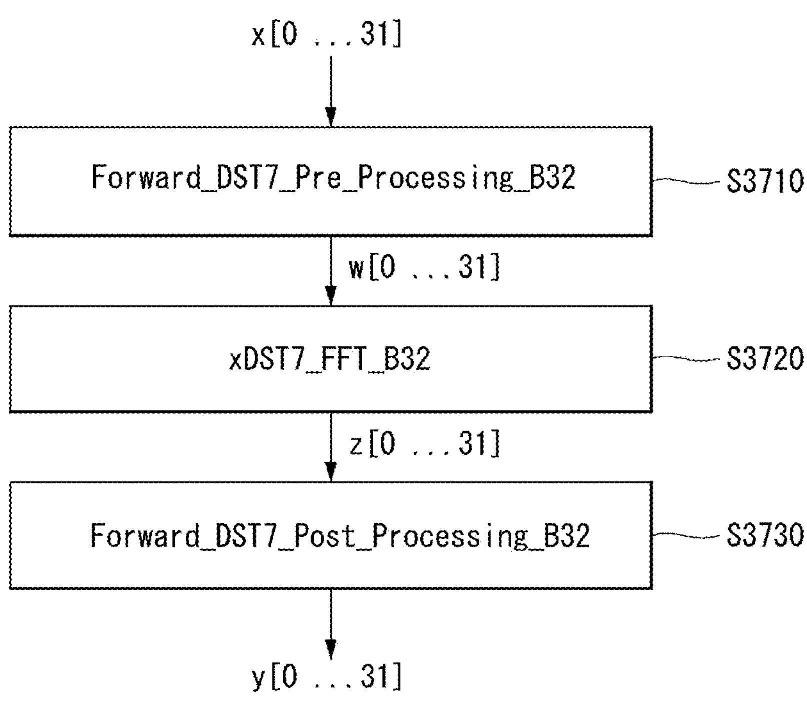

【FIG. 38】
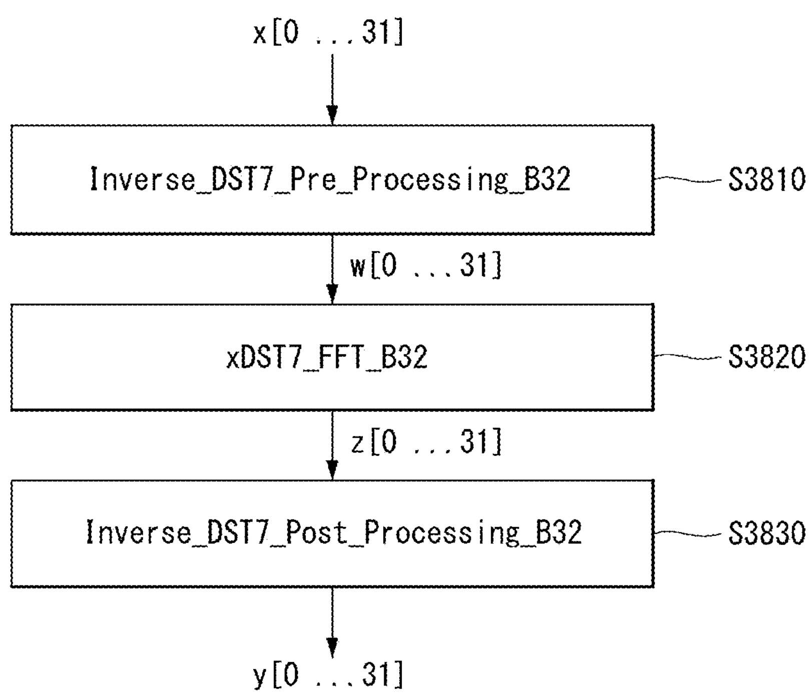

【FIG.39】
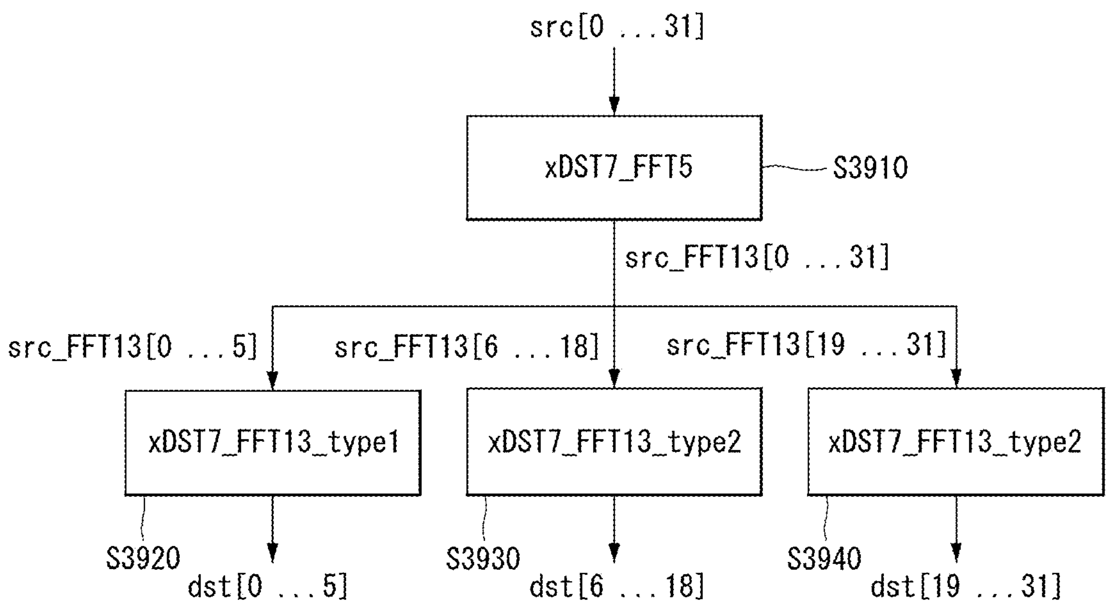

【FIG. 40】
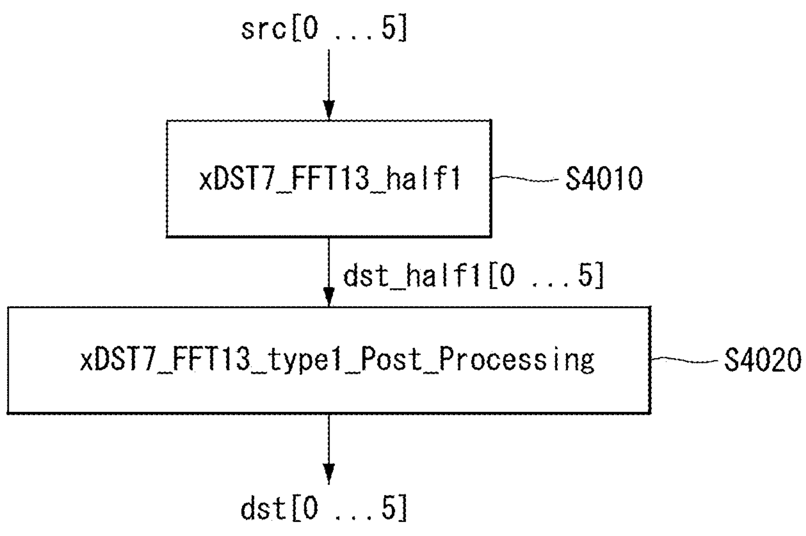

【FIG. 41】
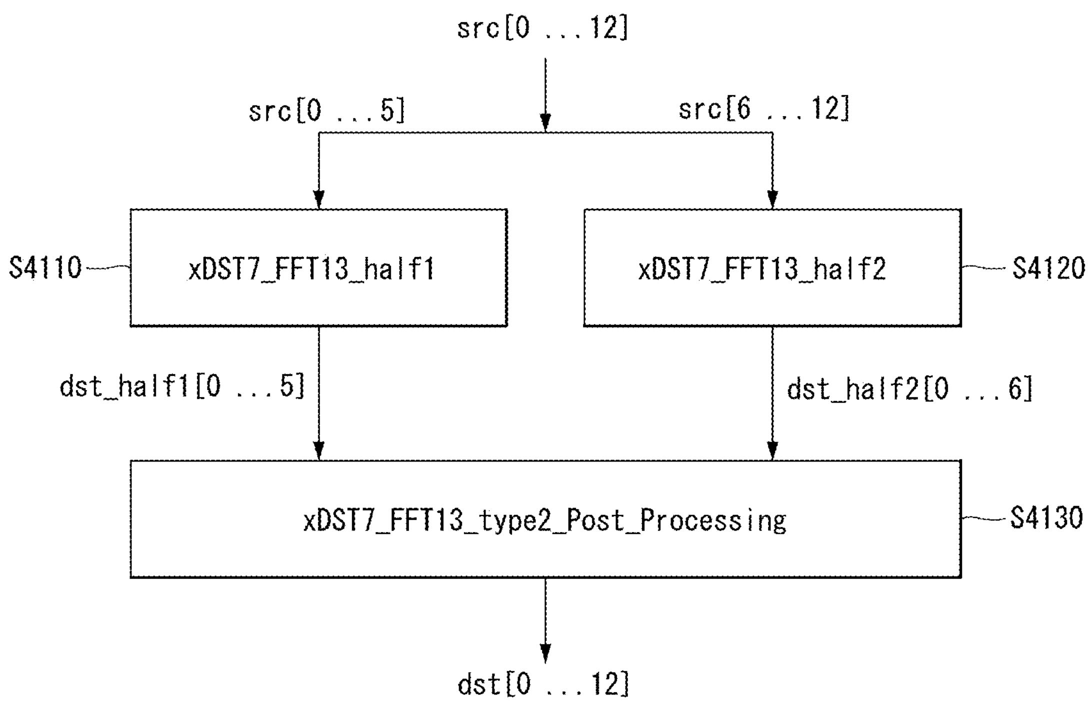

【FIG. 42】
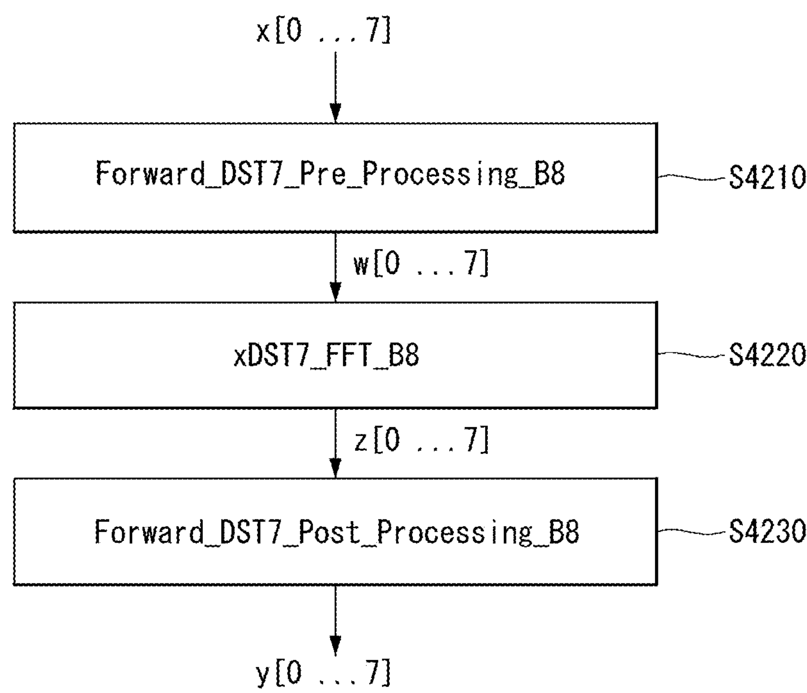

【FIG. 43】
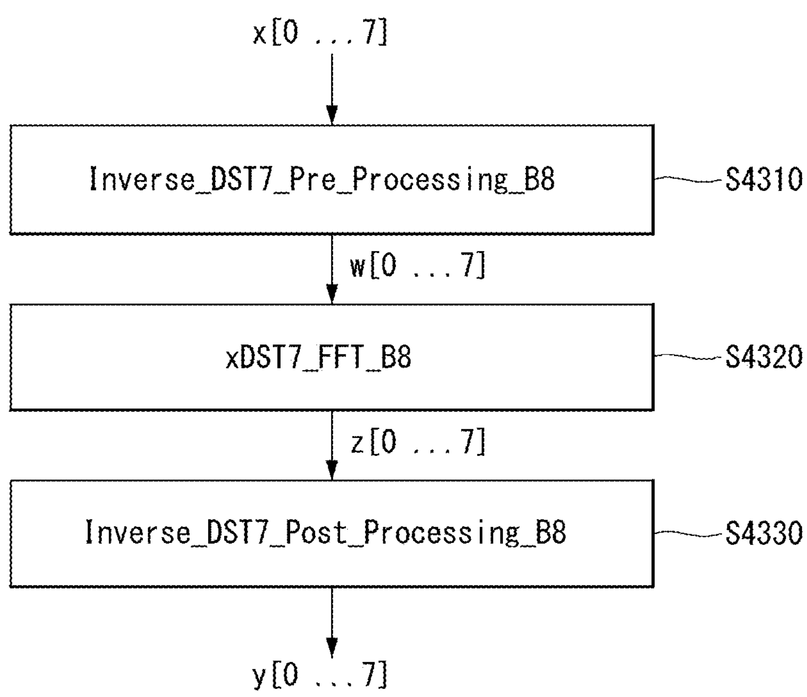

【FIG. 44】
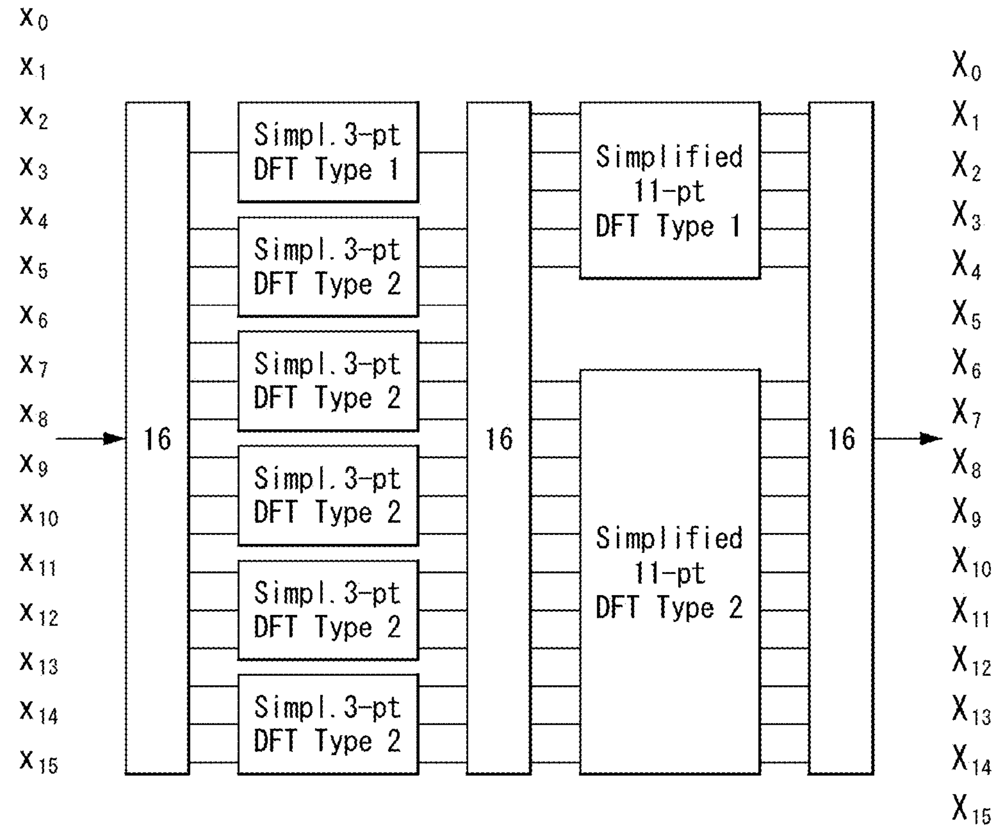

【FIG. 45】
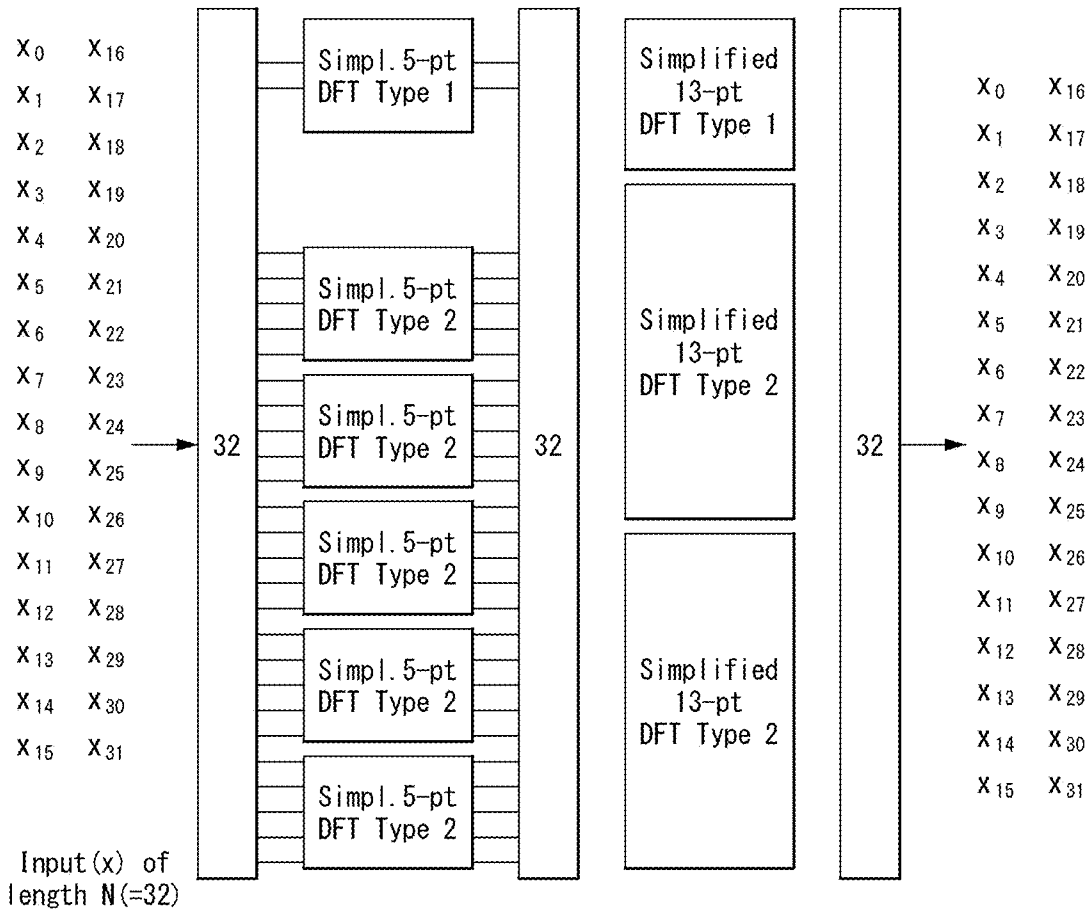

【FIG. 46】
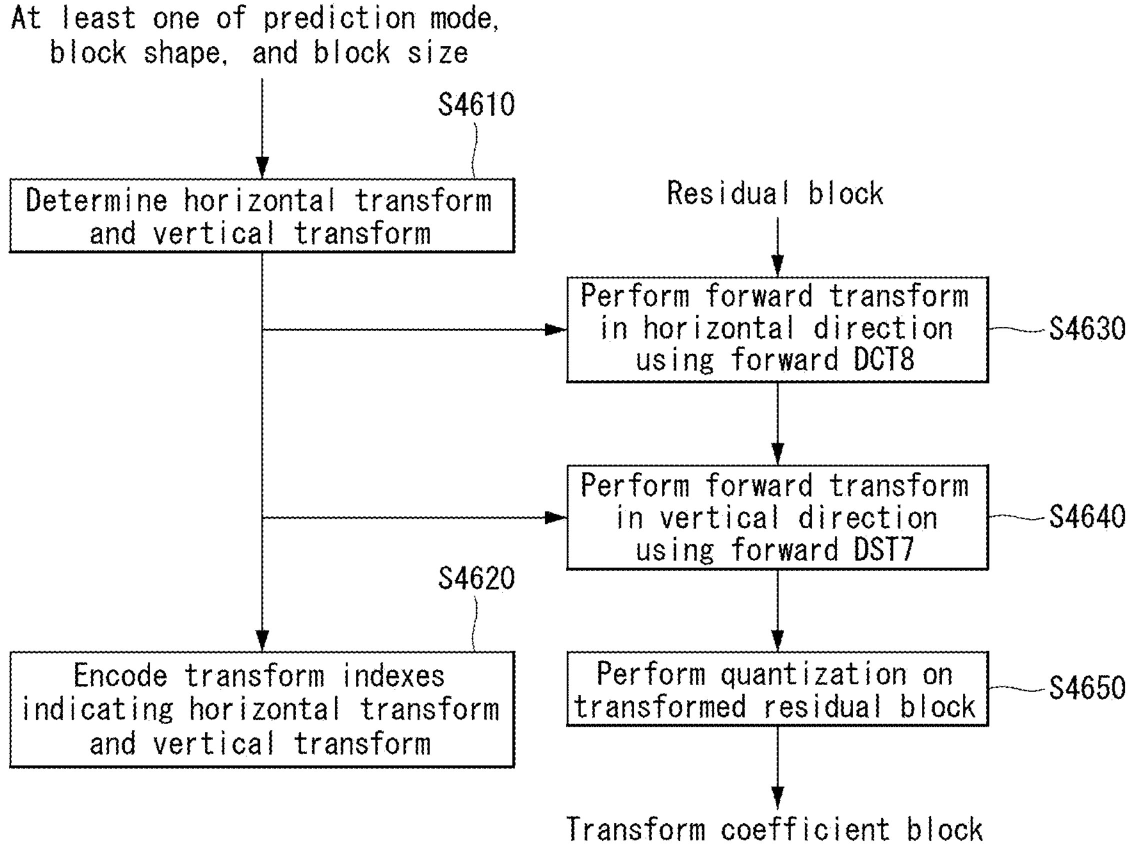

【FIG. 47】
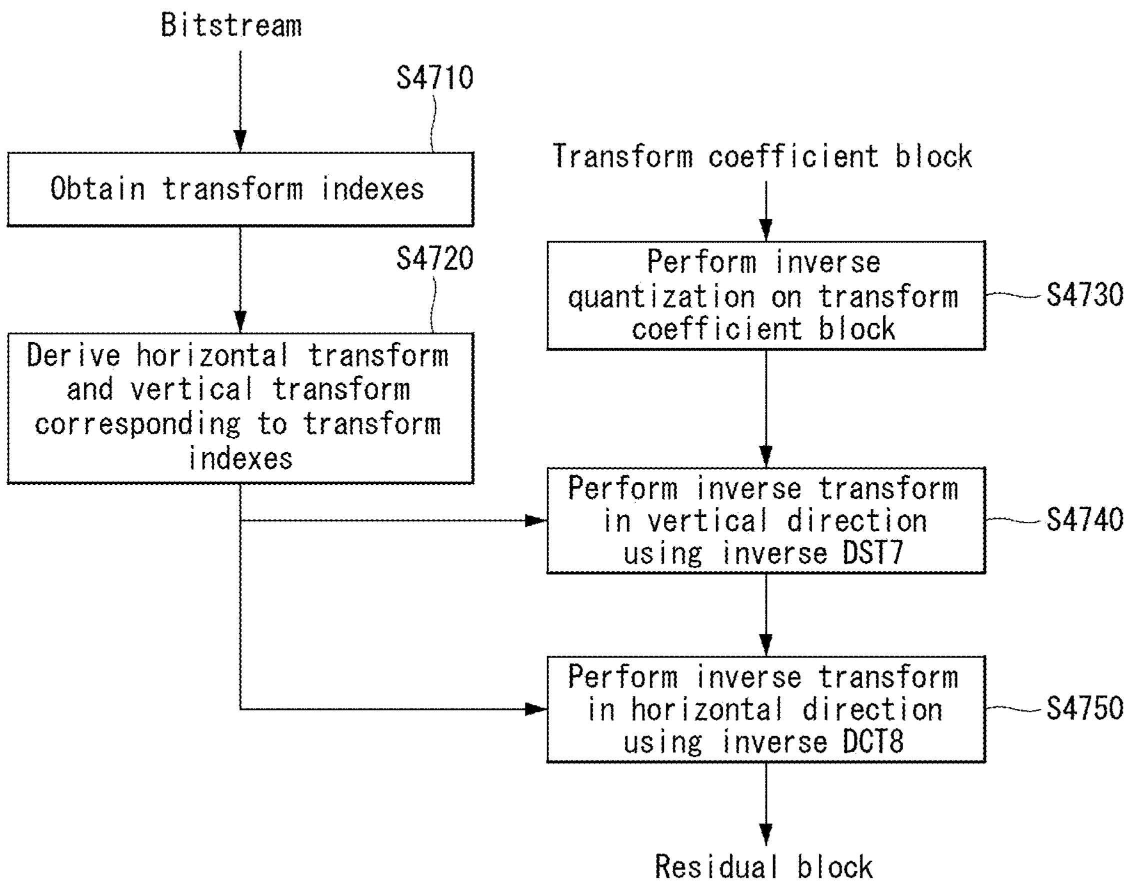

ENCODING/DECODING METHOD FOR VIDEO SIGNAL AND DEVICE THEREFOR

CROSS-REFERENCE TO RELATED APPLICATIONS

This application is a continuation of U.S. application Ser. No. 18/231,662, filed on Aug. 8, 2023, which is a continuation of U.S. application Ser. No. 18/094,047, filed on Jan. 6, 2023, now U.S. Pat. No. 11,770,560, which is a continuation of U.S. application Ser. No. 17/282,120, filed on Apr. 1, 2021, now U.S. Pat. No. 11,589,075, which is a National Stage filing under 35 U.S.C. 371 of International Application No. PCT/KR2019/012840, filed on Oct. 1, 2019, which claims the benefit of U.S. Provisional Application No. 62/739,800, filed on Oct. 1, 2018, the contents of which are all hereby incorporated by reference herein in their entirety.

TECHNICAL FIELD

Embodiments of the present disclosure relate to a method and an apparatus for processing video signals and, more specifically, to a method and an apparatus for encoding/decoding video signals by performing a transform based on reduced transform.

BACKGROUND ART

Compression coding refers to a signal processing technique for transmitting digitalized information through a communication line or storing the same in an appropriate form in a storage medium. Media such as video, images and audio can be objects of compression coding and, particularly, a technique of performing compression coding on images is called video image compression.

Next-generation video content will have features of a high spatial resolution, a high frame rate and high dimensionality of scene representation. To process such content, memory storage, a memory access rate and processing power will significantly increase.

Therefore, it is necessary to design a coding tool for processing next-generation video content more efficiently. Particularly, video codec standards after the high efficiency video coding (HEVC) standard require an efficient transform technique for transforming a spatial domain video signal into a frequency domain signal along with a prediction technique with higher accuracy.

DISCLOSURE

Technical Problem

An object of embodiments of the present disclosure is to provide a method for performing primary transform on a predefined region according to specific conditions.

Technical objects to be achieved by the present disclosure are not limited to the aforementioned technical objects, and other technical objects not described above may be evidently understood by a person having ordinary skill in the art to which the present disclosure pertains from the following description.

Technical Solution

In one aspect of embodiments of the present disclosure, a method for decoding a video signal may include: checking whether a transform skip is applied to a current block; obtaining, from the video signal, a transform index indicating a transform type set applied to the current block when the transform skip is not applied to the current block, wherein the transform type set includes transform types applied to the current block in horizontal and vertical directions; checking whether the transform type set includes DCT2; determining a region to which a primary transform is applied based on a checking result; and performing an inverse transform on the region to which the primary transform is applied in the horizontal and vertical directions using the transform types included in the transform type set.

Preferably, the method may further include deriving coefficients of a region other than the region to which the primary transform is applied as 0 within the current block.

Preferably, when the transform type set includes DCT2, a width of the region to which the primary transform is applied may be determined as a smaller value between a width of the current block and 32 and a height of the region to which the primary transform is applied may be determined as a smaller value between a height of the current block and 32.

Preferably, when the transform type set is any one of a plurality of transform type sets including combinations of DST7 and/or DCT8, the width of the region to which the primary transform is applied may be determined as a smaller value between the width of the current block and 16 and the height of the region to which the primary transform is applied may be determined as a smaller value between the height of the current block and 16.

Preferably, the method may further include obtaining a syntax element indicating a position of a last significant coefficient in scan order within the current block, wherein coefficients to which the inverse transform is applied may be obtained from the video signal based on the position of the last significant coefficient.

Preferably, the syntax element may be binarized according to a truncated unary method, and a maximum length of code for the syntax element may be determined based on the region derived as 0.

In another aspect of embodiments of the present disclosure, an apparatus for decoding a video signal may include: a memory configured to store the video signal; and a processor connected to the memory, wherein the processor may be configured to: check whether a transform skip is applied to a current block; obtain, from the video signal, a transform index indicating a transform type set applied to the current block when the transform skip is not applied to the current block, wherein the transform type set includes transform types applied to the current block in horizontal and vertical directions; check whether the transform type set includes DCT2; determine a region to which a primary transform is applied based on a checking result; and perform an inverse transform on the region to which the primary transform is applied in the horizontal and vertical directions using the transform types included in the transform type set.

Advantageous Effects

According to embodiments of the present disclosure, it is possible to considerably reduce complexity by performing a transform only on a predefined region according to specific conditions.

Effects which may be obtained by the present disclosure are not limited to the aforementioned effects, and other technical effects not described above may be evidently understood by a person having ordinary skill in the art to which the present disclosure pertains from the following description.

DESCRIPTION OF DRAWINGS

The accompanying drawings, which are included herein as a part of the description for help understanding the present disclosure, provide embodiments of the present disclosure, and describe the technical features of the present disclosure with the description below.

FIG. 1 shows an example of a video coding system as an embodiment to which the present disclosure is applied.

FIG. 2 is a schematic block diagram of an encoding apparatus which encodes video/image signals as an embodiment to which the present disclosure is applied.

FIG. 3 is a schematic block diagram of a decoding apparatus which decodes image signals as an embodiment to which the present disclosure is applied.

FIG. 4 is a configuration diagram of a content streaming system an embodiment to which the present disclosure is applied.

FIGS. 5A to 5D show embodiments to which the present disclosure is applicable, FIG. 5A is a diagram for describing a block segmentation structure according to QT (Quad Tree), FIG. 5B is a diagram for describing a block segmentation structure according to BT (Binary Tree), FIG. 5C is a diagram for describing a block segmentation structure according to TT (Ternary Tree), and FIG. 5D is a diagram for describing a block segmentation structure according to AT (Asymmetric Tree).

FIGS. 6 and 7 show embodiments to which the present disclosure is applied, FIG. 6 is a schematic block diagram of a transform and quantization unit, and an inverse quantization and inverse transform unit in an encoding apparatus and FIG. 7 is a schematic block diagram of an inverse quantization and inverse transform unit in a decoding apparatus.

FIG. 8 is a flowchart showing a process in which adaptive multiple transform (AMT) is performed.

FIG. 9 is a flowchart showing a decoding process in which AMT is performed.

FIG. 10 is a flowchart showing an inverse transform process on the basis of MTS according to an embodiment of the present disclosure.

FIG. 11 is a block diagram of an apparatus for performing decoding on the basis of MTS according to an embodiment of the present disclosure.

FIGS. 12 and 13 are flowcharts showing encoding/decoding to which secondary transform is applied as an embodiment to which present disclosure is applied.

FIGS. 14 and 15 show an embodiment to which the present disclosure is applied, FIG. 14 is a diagram for describing Givens rotation and FIG. 15 shows a configuration of one round in 4×4 non-separable secondary transform (NSST) composed of Givens rotation layers and permutations.

FIGS. 16A and 16B show operation of reduced secondary transform (RST) as an embodiment to which the present disclosure is applied.

FIG. 17 is a diagram showing a process of performing reverse scanning from the sixty-fourth coefficient to the seventeenth coefficient in reverse scan order as an embodiment to which the present disclosure is applied.

FIG. 18 is an exemplary flowchart showing encoding using a single transform indicator (STI) as an embodiment to which the present disclosure is applied.

FIG. 19 is an exemplary flowchart showing encoding using a unified transform indicator (UTI) as an embodiment to which the present disclosure is applied.

FIGS. 20A and 20B illustrate two exemplary flowcharts showing encoding using a UTI as an embodiment to which the present disclosure is applied.

FIG. 21 is an exemplary flowchart showing encoding for performing transform as an embodiment to which the present disclosure is applied.

FIG. 22 is an exemplary flowchart showing decoding for performing transform as an embodiment to which the present disclosure is applied.

FIG. 23 is a detailed block diagram showing an example of a transform unit 120 in an encoding apparatus 100 as an embodiment to which the present disclosure is applied.

FIG. 24 is a detailed block diagram showing an example of an inverse transform unit 230 in a decoding apparatus 200 as an embodiment to which the present disclosure is applied.

FIG. 25 is a flowchart for processing a video signal as an embodiment to which the present disclosure is applied.

FIG. 26 is a flow chart illustrating a method for transforming a video signal according to an embodiment to which the present disclosure is applied.

FIG. 27 is a diagram illustrating a method for encoding a video signal using reduced transform as an embodiment to which the present disclosure is applied.

FIG. 28 is a diagram illustrating a method for decoding a video signal using reduced transform as an embodiment to which the present disclosure is applied.

FIG. 29 is a flowchart illustrating a method for decoding a video signal based on reduced transform according to an embodiment of the present disclosure.

FIG. 30 is a flowchart illustrating a method for decoding a video signal according to an embodiment of the present disclosure.

FIG. 31 is an exemplary block diagram of an apparatus for processing a video signal as an embodiment to which the present disclosure is applied.

FIG. 32 is a flowchart illustrating a design of forward DST7 with a length of 16 using discrete Fourier transform (DFT) as an embodiment to which the present disclosure is applied.

FIG. 33 is a flowchart illustrating a design of inverse DST7 with a length of 16 using discrete Fourier transform (DFT) as an embodiment to which the present disclosure is applied.

FIGS. 34 to 36 are flowcharts illustrating application of xDST7_FFT_B16 of FIGS. 15 and 16 as an embodiment to which the present disclosure is applied.

FIG. 37 is a flowchart illustrating a design of forward DST7 with a length of 32 using discrete Fourier transform (DFT) as an embodiment to which the present disclosure is applied.

FIG. 38 is a flowchart illustrating a design of inverse DST7 with a length of 32 using discrete Fourier transform (DFT) as an embodiment to which the present disclosure is applied.

FIGS. 39 to 41 are flowcharts illustrating application of xDST7_FFT_B16 of FIGS. 15 and 16 as an embodiment to which the present disclosure is applied.

FIG. 42 is a flowchart illustrating a design of forward DST7 with a length of 8 using discrete Fourier transform (DFT) as an embodiment to which the present disclosure is applied.

FIG. 43 is a flowchart illustrating a design of inverse DST7 with a length of 8 using discrete Fourier transform (DFT) as an embodiment to which the present disclosure is applied.

FIG. 44 is a block diagram illustrating 16×16 DST7 to which 33-point DFT is applied as an embodiment to which the present disclosure is applied.

FIG. 45 is a block diagram illustrating 32×32 DST7 to which 65-point DFT is applied as an embodiment to which the present disclosure is applied.

FIG. 46 is a flowchart illustrating encoding of performing forward discrete sine transform-7 (DST7) and forward discrete cosine transform-8 (DCT8) through discrete Fourier transform (DFT) as an embodiment to which the present disclosure is applied.

FIG. 47 is a flowchart illustrating decoding of performing inverse discrete sine transform-7 (DST7) and inverse discrete cosine transform-8 (DCT8) through discrete Fourier transform (DFT) as an embodiment to which the present disclosure is applied.

MODE FOR DISCLOSURE

Some embodiments of the present disclosure are described in detail with reference to the accompanying drawings. A detailed description to be disclosed along with the accompanying drawings are intended to describe some embodiments of the present disclosure and are not intended to describe a sole embodiment of the present disclosure. The following detailed description includes more details in order to provide full understanding of the present disclosure. However, those skilled in the art will understand that the present disclosure may be implemented without such more details.

In some cases, in order to avoid that the concept of the present disclosure becomes vague, known structures and devices are omitted or may be shown in a block diagram form based on the core functions of each structure and device.

Although most terms used in the present disclosure have been selected from general ones widely used in the art, some terms have been arbitrarily selected by the applicant and their meanings are explained in detail in the following description as needed. Thus, the present disclosure should be understood with the intended meanings of the terms rather than their simple names or meanings.

Specific terms used in the following description have been provided to help understanding of the present disclosure, and the use of such specific terms may be changed in various forms without departing from the technical sprit of the present disclosure. For example, signals, data, samples, pictures, frames, blocks and the like may be appropriately replaced and interpreted in each coding process.

In the present description, a “processing unit” refers to a unit in which an encoding/decoding process such as prediction, transform and/or quantization is performed. Further, the processing unit may be interpreted into the meaning including a unit for a luma component and a unit for a chroma component. For example, the processing unit may correspond to a block, a coding unit (CU), a prediction unit (PU) or a transform unit (TU).

In addition, the processing unit may be interpreted into a unit for a luma component or a unit for a chroma component. For example, the processing unit may correspond to a coding tree block (CTB), a coding block (CB), a PU or a transform block (TB) for the luma component. Further, the processing unit may correspond to a CTB, a CB, a PU or a TB for the chroma component. Moreover, the processing unit is not limited thereto and may be interpreted into the meaning including a unit for the luma component and a unit for the chroma component.

In addition, the processing unit is not necessarily limited to a square block and may be configured as a polygonal shape having three or more vertexes.

Furthermore, in the present description, a pixel is called a sample. In addition, using a sample may mean using a pixel value or the like.

FIG. 1 shows an example of a video coding system as an embodiment to which the present disclosure is applied.

The video coding system may include a source device 10 and a receive device 20. The source device 10 can transmit encoded video/image information or data to the receive device 20 in the form of a file or streaming through a digital storage medium or a network.

The source device 10 may include a video source 11, an encoding apparatus 12, and a transmitter 13. The receive device 20 may include a receiver, a decoding apparatus 22 and a renderer 23. The encoding apparatus 12 may be called a video/image encoding apparatus and the decoding apparatus 20 may be called a video/image decoding apparatus. The transmitter 13 may be included in the encoding apparatus 12. The receiver 21 may be included in the decoding apparatus 22. The renderer 23 may include a display and the display may be configured as a separate device or an external component.

The video source can acquire a video/image through video/image capturing, combining or generating process. The video source may include a video/image capture device and/or a video/image generation device. The video/image capture device may include, for example, one or more cameras, a video/image archive including previously captured videos/images, and the like. The video/image generation device may include, for example, a computer, a tablet, a smartphone, and the like and (electronically) generate a video/image. For example, a virtual video/image can be generated through a computer or the like and, in this case, a video/image capture process may be replaced with a related data generation process.

The encoding apparatus 12 can encode an input video/image. The encoding apparatus 12 can perform a series of procedures such as prediction, transform and quantization for compression and coding efficiency. Encoded data (encoded video/image information) can be output in the form of a bitstream.

The transmitter 13 can transmit encoded video/image information or data output in the form of a bitstream to the receiver of the receive device in the form of a file or streaming through a digital storage medium or a network. The digital storage medium may include various storage media such as a USB, an SD, a CD, a DVD, Blueray, an HDD, and an SSD. The transmitter 13 may include an element for generating a media file through a predetermined file format and an element for transmission through a broadcast/communication network. The receiver 21 can extract a bitstream and transmit the bitstream to the decoding apparatus 22.

The decoding apparatus 22 can decode a video/image by performing a series of procedures such as inverse quantization, inverse transform and prediction corresponding to operation of the encoding apparatus 12.

The renderer 23 can render the decoded video/image. The rendered video/image can be display through a display.

FIG. 2 is a schematic block diagram of an encoding apparatus which encodes a video/image signal as an embodiment to which the present disclosure is applied. The encoding apparatus 100 may correspond to the encoding apparatus 12 of FIG. 1.

An image partitioning unit 110 can divide an input image (or a picture or a frame) input to the encoding apparatus 100 into one or more processing units. For example, the processing unit may be called a coding unit (CU). In this case, the coding unit can be recursively segmented from a coding tree unit (CTU) or a largest coding unit (LCU) according to a quad-tree binary-tree (QTBT) structure. For example, a single coding unit can be segmented into a plurality of coding units with a deeper depth on the basis of the quad-tree structure and/or the binary tree structure. In this case, the quad-tree structure may be applied first and then the binary tree structure may be applied. Alternatively, the binary tree structure may be applied first. A coding procedure according to the present disclosure can be performed on the basis of a final coding unit that is no longer segmented. In this case, a largest coding unit may be directly used as the final coding unit or the coding unit may be recursively segmented into coding units with a deeper depth and a coding unit having an optimal size may be used as the final coding unit as necessary on the basis of coding efficiency according to image characteristics. Here, the coding procedure may include procedures such as prediction, transform and reconstruction which will be described later. Alternatively, the processing unit may further include a prediction unit (PU) or a transform unit (TU). In this case, the prediction unit and the transform unit can be segmented or partitioned from the aforementioned final coding unit. The prediction unit may be a unit of sample prediction and the transform unit may be a unit of deriving a transform coefficient and/or a unit of deriving a residual signal from a transform coefficient.

A unit may be interchangeably used with the term "block" or "area". Generally, an M×N block represents a set of samples or transform coefficients in M columns and N rows. A sample can generally represent a pixel or a pixel value and may represent only a pixel/pixel value of a luma component or only a pixel/pixel value of a chroma component. The sample can be used as a term corresponding to a picture (image), a pixel or a pel.

The encoding apparatus 100 may generate a residual signal (a residual block or a residual sample array) by subtracting a predicted signal (a predicted block or a predicted sample array) output from an inter-prediction unit 180 or an intra-prediction unit 185 from an input video signal (an original block or an original sample array), and the generated residual signal is transmitted to the transform unit 120. In this case, a unit which subtracts the predicted signal (predicted block or predicted sample array) from the input video signal (original block or original sample array) in the encoder 100 may be called a subtractor 115, as shown. A predictor can perform prediction on a processing target block (hereinafter referred to as a current block) and generate a predicted block including predicted samples with respect to the current block. The predictor can determine whether intra-prediction or inter-prediction is applied to the current block or units of CU. The predictor can generate various types of information about prediction, such as prediction mode information, and transmit the information to an entropy encoding unit 190 as described later in description of each prediction mode. Information about prediction can be encoded in the entropy encoding unit 190 and output in the form of a bitstream.

The intra-prediction unit 185 can predict a current block with reference to samples in a current picture. Referred samples may neighbor the current block or may be separated therefrom according to a prediction mode. In intra-prediction, prediction modes may include a plurality of nondirectional modes and a plurality of directional modes. The nondirectional modes may include a DC mode and a planar mode, for example. The directional modes may include, for example, 33 directional prediction modes or 65 directional prediction modes according to a degree of minuteness of prediction direction. However, this is exemplary and a number of directional prediction modes equal to or greater than 65 or equal to or less than 33 may be used according to settings. The intra-prediction unit 185 may determine a prediction mode to be applied to the current block using a prediction mode applied to neighbor blocks.

The inter-prediction unit 180 can derive a predicted block with respect to the current block on the basis of a reference block (reference sample array) specified by a motion vector on a reference picture. Here, to reduce the quantity of motion information transmitted in an inter-prediction mode, motion information can be predicted in units of block, subblock or sample on the basis of correlation of motion information between a neighboring block and the current block. The motion information may include a motion vector and a reference picture index. The motion information may further include inter-prediction direction (L0 prediction, L1 prediction, Bi prediction, etc.) information. In the case of inter-prediction, neighboring blocks may include a spatial neighboring block present in a current picture and a temporal neighboring block present in a reference picture. The reference picture including the reference block may be the same as or different from the reference picture including the temporal neighboring block. The temporal neighboring block may be called a collocated reference block or a collocated CU (colCU) and the reference picture including the temporal neighboring block may be called a collocated picture (colPic). For example, the inter-prediction unit 180 may form a motion information candidate list on the basis of neighboring blocks and generate information indicating which candidate is used to derive a motion vector and/or a reference picture index of the current block. Inter-prediction can be performed on the basis of various prediction modes, and in the case of a skip mode and a merge mode, the inter-prediction unit 180 can use motion information of a neighboring block as motion information of the current block. In the case of the skip mode, a residual signal may not be transmitted differently from the merge mode. In the case of a motion vector prediction (MVP) mode, the motion vector of the current block can be indicated by using a motion vector of a neighboring block as a motion vector predictor and signaling a motion vector difference.

A predicted signal generated through the inter-prediction unit 180 or the intra-prediction unit 185 can be used to generate a reconstructed signal or a residual signal.

The transform unit 120 can generate transform coefficients by applying a transform technique to a residual signal. For example, the transform technique may include at least one of DCT (Discrete Cosine Transform), DST (Discrete Sine Transform), KLT (Karhunen-Loeve Transform), GBT (Graph-Based Transform) and CNT (Conditionally Nonlinear Transform). Here, GBT refers to transform obtained from a graph representing information on relationship between pixels. CNT refers to transform obtained on the basis of a predicted signal generated using all previously reconstructed pixels. Further, the transform process may be applied to square pixel blocks having the same size or applied to non-square blocks having variable sizes.

A quantization unit 130 may quantize transform coefficients and transmit the quantized transform coefficients to the entropy encoding unit 190, and the entropy encoding unit 190 may encode a quantized signal (information about the quantized transform coefficients) and output the encoded signal as a bitstream. The information about the quantized transform coefficients may be called residual information. The quantization unit 130 may rearrange the quantized transform coefficients in the form of a block into the form of a one-dimensional vector on the basis of a coefficient scan order and generate information about the quantized transform coefficients on the basis of the quantized transform coefficients in the form of a one-dimensional vector. The entropy encoding unit 190 can execute various encoding methods such as exponential Golomb, CAVLC (context-adaptive variable length coding) and CABAC (context-adaptive binary arithmetic coding), for example. The entropy encoding unit 190 may encode information necessary for video/image reconstruction (e.g., values of syntax elements and the like) along with or separately from the quantized transform coefficients. Encoded information (e.g., video/image information) may be transmitted or stored in the form of a bitstream in network abstraction layer (NAL) unit. The bitstream may be transmitted through a network or stored in a digital storage medium. Here, the network may include a broadcast network and/or a communication network and the digital storage medium may include various storage media such as a USB, an SD, a CD, a DVD, Blueray, an HDD and an SSD. A transmitter (not shown) which transmits the signal output from the entropy encoding unit 190 and/or a storage (not shown) which stores the signal may be configured as internal/external elements of the encoding apparatus 100, and the transmitter may be a component of the entropy encoding unit 190.

The quantized transform coefficients output from the quantization unit 130 can be used to generate a predicted signal. For example, a residual signal can be reconstructed by applying inverse quantization and inverse transform to the quantized transform coefficients through an inverse quantization unit 140 and an inverse transform unit 150 in the loop. An adder 155 can add the reconstructed residual signal to the predicted signal output from the inter-prediction unit 180 or the intra-prediction unit 185 such that a reconstructed signal (reconstructed picture, reconstructed block or reconstructed sample array) can be generated. When there is no residual with respect to a processing target block as in a case in which the skip mode is applied, a predicted block can be used as a reconstructed block. The adder 155 may also be called a reconstruction unit or a reconstructed block generator. The generated reconstructed signal can be used for intra-prediction of the next processing target block in the current picture or used for inter-prediction of the next picture through filtering which will be described later.

A filtering unit 160 can improve subjective/objective picture quality by applying filtering to the reconstructed signal. For example, the filtering unit 160 can generate a modified reconstructed picture by applying various filtering methods to the reconstructed picture and transmit the modified reconstructed picture to a decoded picture buffer 170. The various filtering methods may include, for example, deblocking filtering, sample adaptive offset, adaptive loop filtering, and bilateral filtering. The filtering unit 160 can generate various types of information about filtering and transmit the information to the entropy encoding unit 190 as will be described later in description of each filtering method. Information about filtering may be encoded in the entropy encoding unit 190 and output in the form of a bitstream.

The modified reconstructed picture transmitted to the decoded picture buffer 170 can be used as a reference picture in the inter-prediction unit 180. Accordingly, the encoding apparatus can avoid mismatch between the encoding apparatus 100 and the decoding apparatus and improve encoding efficiency when inter-prediction is applied.

The decoded picture buffer 170 can store the modified reconstructed picture such that the modified reconstructed picture is used as a reference picture in the inter-prediction unit 180.

FIG. 3 is a schematic block diagram of a decoding apparatus which performs decoding of a video signal as an embodiment to which the present disclosure is applied. The decoding apparatus 200 of FIG. 3 corresponds to the decoding apparatus 22 of FIG. 1.

Referring to FIG. 3, the decoding apparatus 200 may include an entropy decoding unit 210, an inverse quantization unit 220, an inverse transform unit 230, an adder 235, a filtering unit 240, a decoded picture buffer (DPB) 250, an inter-prediction unit 260, and an intra-prediction unit 265. The inter-prediction unit 260 and the intra-prediction unit 265 may be collectively called a predictor. That is, the predictor can include the inter-prediction unit 180 and the intra-prediction unit 185. The inverse quantization unit 220 and the inverse transform unit 230 may be collectively called a residual processor. That is, the residual processor can include the inverse quantization unit 220 and the inverse transform unit 230. The aforementioned entropy decoding unit 210, inverse quantization unit 220, inverse transform unit 230, adder 235, filtering unit 240, inter-prediction unit 260 and intra-prediction unit 265 may be configured as a single hardware component (e.g., a decoder or a processor) according to an embodiment. Further, the decoded picture buffer 250 may be configured as a single hardware component (e.g., a memory or a digital storage medium) according to an embodiment.

When a bitstream including video/image information is input, the decoding apparatus 200 can reconstruct an image through a process corresponding to the process of processing the video/image information in the encoding apparatus 100 of FIG. 2. For example, the decoding apparatus 200 can perform decoding using a processing unit applied in the encoding apparatus 100. Accordingly, a processing unit of decoding may be a coding unit, for example, and the coding unit can be segmented from a coding tree unit or a largest coding unit according to a quad tree structure and/or a binary tree structure. In addition, a reconstructed video signal decoded and output by the decoding apparatus 200 can be reproduced through a reproduction apparatus.

The decoding apparatus 200 can receive a signal output from the encoding apparatus 100 of FIG. 2 in the form of a bitstream, and the received signal can be decoded through the entropy decoding unit 210. For example, the entropy decoding unit 210 can parse the bitstream to derive information (e.g., video/image information) necessary for image reconstruction (or picture reconstruction). For example, the entropy decoding unit 210 can decode information in the bitstream on the basis of a coding method such as exponential Golomb, CAVLC or CABAC and output syntax element values necessary for image reconstruction and quantized values of transform coefficients with respect to residual. More specifically, the CABAC entropy decoding method receives a bin corresponding to each syntax element in the bitstream, determines a context model using decoding target syntax element information and decoding information of neighboring and decoding target blocks or information on symbols/bins decoded in a previous stage, predicts bin generation probability according to the determined context model and performs arithmetic decoding of bins to generate a symbol corresponding to each syntax element value. Here, the CABAC entropy decoding method can update the context model using information on symbols/bins decoded for the next symbol/bin context model after the context model is determined. Information about prediction among the information decoded in the entropy decoding unit 210 can be provided to the predictor (inter-prediction unit 260 and the intra-prediction unit 265) and residual values on which entropy decoding has been performed in the entropy decoding unit 210, that is, quantized transform coefficients, and related parameter information can be input to the inverse quantization unit 220. Further, information about filtering among the information decoded in the entropy decoding unit 210 can be provided to the filtering unit 240. Meanwhile, a receiver (not shown) which receives a signal output from the encoding apparatus 100 may be additionally configured as an internal/external element of the decoding apparatus 200 or the receiver may be a component of the entropy decoding unit 210.

The inverse quantization unit 220 can inversely quantize the quantized transform coefficients to output transform coefficients. The inverse quantization unit 220 can rearrange the quantized transform coefficients in the form of a two-dimensional block. In this case, rearrangement can be performed on the basis of the coefficient scan order in the encoding apparatus 100. The inverse quantization unit 220 can perform inverse quantization on the quantized transform coefficients using a quantization parameter (e.g., quantization step size information) and acquire transform coefficients.

The inverse transform unit 230 inversely transforms the transform coefficients to obtain a residual signal (residual block or residual sample array).

The predictor can perform prediction on a current block and generate a predicted block including predicted samples with respect to the current block. The predictor can determine whether intra-prediction or inter-prediction is applied to the current block on the basis of the information about prediction output from the entropy decoding unit 210 and determine a specific intra/inter-prediction mode.

The intra-prediction unit 265 can predict the current block with reference to samples in a current picture. The referred samples may neighbor the current block or may be separated from the current block according to a prediction mode. In intra-prediction, prediction modes may include a plurality of nondirectional modes and a plurality of directional modes. The intra-prediction 265 may determine a prediction mode applied to the current block using a prediction mode applied to neighboring blocks.

The inter-prediction unit 260 can derive a predicted block with respect to the current block on the basis of a reference block (reference sample array) specified by a motion vector on a reference picture. Here, to reduce the amount of motion information transmitted in the inter-prediction mode, the motion information can be predicted in units of block, subblock or sample on the basis of correlation of the motion information between a neighboring block and the current block. The motion information may include a motion vector and a reference picture index. The motion information may further include inter-prediction direction (L0 prediction, L1 prediction, Bi prediction, etc.) information. In the case of inter-prediction, neighboring blocks may include a spatial neighboring block present in a current picture and a temporal neighboring block present in a reference picture. For example, the inter-prediction unit 260 may form a motion information candidate list on the basis of neighboring blocks and derive the motion vector and/or the reference picture index of the current block on the basis of received candidate selection information. Inter-prediction can be performed on the basis of various prediction modes and the information about prediction may include information indicating the inter-prediction mode for the current block.

The adder 235 can generate a reconstructed signal (reconstructed picture, reconstructed block or reconstructed sample array) by adding the obtained residual signal to the predicted signal (predicted block or predicted sample array) output from the inter-prediction unit 260 or the intra-prediction unit 265. When there is no residual with respect to the processing target block as in a case in which the skip mode is applied, the predicted block may be used as a reconstructed block.

The adder 235 may also be called a reconstruction unit or a reconstructed block generator. The generated reconstructed signal can be used for intra-prediction of the next processing target block in the current picture or used for inter-prediction of the next picture through filtering which will be described later.

The filtering unit 240 can improve subjective/objective picture quality by applying filtering to the reconstructed signal. For example, the filtering unit 240 can generate a modified reconstructed picture by applying various filtering methods to the reconstructed picture and transmit the modified reconstructed picture to a decoded picture buffer 250. The various filtering methods may include, for example, deblocking filtering, sample adaptive offset (SAO), adaptive loop filtering (ALF), and bilateral filtering.

The modified reconstructed picture transmitted to the decoded picture buffer 250 can be used as a reference picture by the inter-prediction unit 260.

In the present description, embodiments described in the filtering unit 160, the inter-prediction unit 180 and the intra-prediction unit 185 of the encoding apparatus 100 can be applied to the filtering unit 240, the inter-prediction unit 260 and the intra-prediction unit 265 of the decoding apparatus equally or in a corresponding manner.

FIG. 4 is a configuration diagram of a content streaming system as an embodiment to which the present disclosure is applied.

The content streaming system to which the present disclosure is applied may include an encoding server 410, a streaming server 420, a web server 430, a media storage 440, a user equipment 450, and multimedia input devices 460.

The encoding server 410 serves to compress content input from multimedia input devices such as a smartphone, a camera and a camcorder into digital data to generate a bitstream and transmit the bitstream to the streaming server 420. As another example, when the multimedia input devices 460 such as a smartphone, a camera and a camcorder directly generate bitstreams, the encoding server 410 may be omitted.

The bitstream may be generated by an encoding method or a bitstream generation method to which the present disclosure is applied and the streaming server 420 can temporarily store the bitstream in the process of transmitting or receiving the bitstream.

The streaming server 420 transmits multimedia data to the user equipment 450 on the basis of a user request through the web server 430 and the web server 430 serves as a medium that informs a user of services. When the user sends a request for a desired service to the web server 430, the web server 430 delivers the request to the streaming server 420 and the streaming server 420 transmits multimedia data to the user. Here, the content streaming system may include an additional control server, and in this case, the control server serves to control commands/responses between devices in the content streaming system.

The streaming server 420 may receive content from the media storage 440 and/or the encoding server 410. For example, when content is received from the encoding server 410, the streaming server 420 can receive the content in real time. In this case, the streaming server 420 may store bitstreams for a predetermined time in order to provide a smooth streaming service.

Examples of the user equipment 450 may include a cellular phone, a smartphone, a laptop computer, a digital broadcast terminal, a PDA (personal digital assistant), a PMP (portable multimedia player), a navigation device, a slate PC, a tablet PC, an ultrabook, a wearable device (e.g., a smartwatch, a smart glass and an HMD (head mounted display)), a digital TV, a desktop computer, a digital signage, etc.

Each server in the content streaming system may be operated as a distributed server, and in this case, data received by each server can be processed in a distributed manner.

FIGS. 5A to 5D show embodiments to which the present disclosure is applicable, FIG. 5A is a diagram for describing a block segmentation structure according to QT (Quad Tree), FIG. 5B is a diagram for describing a block segmentation structure according to BT (Binary Tree), FIG. 5C is a diagram for describing a block segmentation structure according to TT (Ternary Tree), FIG. 5D is a diagram for describing a block segmentation structure according to AT (Asymmetric Tree).

In video coding, a single block can be segmented on the basis of QT. Further, a single subblock segmented according to QT can be further recursively segmented using QT. A leaf block that is no longer segmented according to QT can be segmented using at least one of BT, TT and AT. BT may have two types of segmentation: horizontal BT (2N×N, 2N×N); and vertical BT (N×2N, N×2N). TT may have two types of segmentation: horizontal TT (2N×1/2N, 2N×N, 2N×1/2N); and vertical TT (1/2N×2N, N×2N, 1/2N×2N). AT may have four types of segmentation: horizontal-up AT (2N×1/2N, 2N×3/2N); horizontal-down AT (2N×3/2N, 2N×1/2N); vertical-left AT (1/2N×2N, 3/2N×2N); and vertical-right AT (3/2N×2N, 1/2N×2N). Each type of BT, TT and AT can be further recursively segmented using BT, TT and AT.

FIG. 5A shows an example of QT segmentation. A block A can be segmented into four subblocks A0, A1, A2 and A3 according to QT. The subblock A1 can be further segmented into four subblocks B0, B1, B2 and B3 according to QT.

FIG. 5B shows an example of BT segmentation. The block B3 that is no longer segmented according to QT can be segmented into vertical BT (C0 and C1) or horizontal BT (D0 and D1). Each subblock such as the block C0 can be further recursively segmented into horizontal BT (E0 and E1) or vertical BT (F0 and F1).

FIG. 5C shows an example of TT segmentation. The block B3 that is no longer segmented according to QT can be segmented into vertical TT (C0, C1 and C2) or horizontal TT (D0, D1 and D2). Each subblock such as the block C1 can be further recursively segmented into horizontal TT (E0, E1 and E2) or vertical TT (F0, F1 and F2).

FIG. 5D shows an example of AT segmentation. The block B3 that is no longer segmented according to QT can be segmented into vertical AT (C0 and C1) or horizontal AT (DO and D1). Each subblock such as the block C1 can be further recursively segmented into horizontal AT (E0 and E1) or vertical TT (F0 and F1).

Meanwhile, BT, TT and AT segmentation may be used in a combined manner. For example, a subblock segmented according to BT may be segmented according to TT or AT. Further, a subblock segmented according to TT may be segmented according to BT or AT. A subblock segmented according to AT may be segmented according to BT or TT. For example, each subblock may be segmented into vertical BT after horizontal BT segmentation or each subblock may be segmented into horizontal BT after vertical BT segmentation. In this case, finally segmented shapes are identical although segmentation orders are different.

Further, when a block is segmented, a block search order can be defined in various manners. In general, search is performed from left to right and top to bottom, and block search may mean the order of determining whether each segmented subblock will be additionally segmented, an encoding order of subblocks when the subblocks are no longer segmented, or a search order when a subblock refers to information of neighboring other blocks.

Transform may be performed on processing units (or transform blocks) segmented according to the segmentation structures as shown in FIGS. 5A to 5D, and particularly, segmentation may be performed in a row direction and a column direction and a transform matrix may be applied. According to an embodiment of the present disclosure, different transform types may be used according to the length of a processing unit (or transform block) in the row direction or column direction.

Transform is applied to residual blocks in order to decorrelate the residual blocks as much as possible, concentrate coefficients on a low frequency and generate a zero tail at the end of a block. A transform part in JEM software includes two principal functions (core transform and secondary transform). Core transform is composed of discrete cosine transform (DCT) and discrete sine transform (DST) transform families applied to all rows and columns of a residual block. Thereafter, secondary transform may be additionally applied to a top left corner of the output of core transform. Similarly, inverse transform may be applied in the order of inverse secondary transform and inverse core transform. First, inverse secondary transform can be applied to a left top corner of a coefficient block. Then, inverse core transform is applied to rows and columns of the output of inverse secondary transform. Core transform or inverse transform may be referred to as primary transform or inverse transform.

FIGS. 6 and 7 show embodiments to which the present disclosure is applied, FIG. 6 is a schematic block diagram of a transform and quantization unit 120/130, and an inverse quantization and inverse transform unit 140/150 in the encoding apparatus 100 and FIG. 7 is a schematic block diagram of an inverse quantization and inverse transform unit 220/230 in the decoding apparatus 200.

Referring to FIG. 6, the transform and quantization unit 120/130 may include a primary transform unit 121, a secondary transform unit 122 and a quantization unit 130. The inverse quantization and inverse transform unit 140/150 may include an inverse quantization unit 140, an inverse secondary transform unit 151 and an inverse primary transform unit 152.

Referring to FIG. 7, the inverse quantization and inverse transform unit 220/230 may include an inverse quantization unit 220, an inverse secondary transform unit 231 and an inverse primary transform unit 232.

In the present disclosure, transform may be performed through a plurality of stages. For example, two states of primary transform and secondary transform may be applied as shown in FIG. 6 or more than two transform stages may be used according to algorithms. Here, primary transform may be referred to core transform.

The primary transform unit 121 can apply primary transform to a residual signal. Here, primary transform may be predefined as a table in an encoder and/or a decoder.

The secondary transform unit 122 can apply secondary transform to a primarily transformed signal. Here, secondary transform may be predefined as a table in the encoder and/or the decoder.

In an embodiment, non-separable secondary transform (NSST) may be conditionally applied as secondary transform. For example, NSST is applied only to intra-prediction blocks and may have a transform set applicable per prediction mode group.

Here, a prediction mode group can be set on the basis of symmetry with respect to a prediction direction. For example, prediction mode 52 and prediction mode 16 are symmetrical on the basis of prediction mode 34 (diagonal direction), and thus one group can be generated and the same transform set can be applied thereto. Here, when transform for prediction mode 52 is applied, input data is transposed and then transform is applied because a transform set of prediction mode 52 is the same as that of prediction mode 16.

In the case of the planar mode and the DC mode, there is no symmetry with respect to directions and thus they have respective transform sets and a corresponding transform set may be composed of two transforms. Each transform set may be composed of three transforms for the remaining directional modes.

The quantization unit 130 can perform quantization on a secondarily transformed signal.

The inverse quantization and inverse transform unit 140/150 performs the reverse of the aforementioned procedure and redundant description is omitted.

FIG. 7 is a schematic block diagram of the inverse quantization and inverse transform unit 220/230 in the decoding apparatus 200.

Referring to FIG. 7, the inverse quantization and inverse transform unit 220/230 may include the inverse quantization unit 220, the inverse secondary transform unit 231 and the inverse primary transform unit 232.

The inverse quantization unit 220 obtains transform coefficients from an entropy-decoded signal using quantization step size information.

The inverse secondary transform unit 231 performs inverse secondary transform on the transform coefficients. Here, inverse secondary transform refers to inverse transform of secondary transform described in FIG. 6.

The inverse primary transform unit 232 performs inverse primary transform on the inversely secondarily transformed signal (or block) and obtains a residual signal. Here, inverse primary transform refers to inverse transform of primary transform described in FIG. 6.

In addition to DCT-2 and 4×4 DST-4 applied to HEVC, adaptive multiple transform or explicit multiple transform) (AMT or EMT) is used for residual coding for inter- and intra-coded blocks. A plurality of transforms selected from DCT/DST families is used in addition to transforms in HEVC. Transform matrices newly introduced in JEM are DST-7, DCT-8, DST-1, and DCT-5. The following table 1 shows basic functions of selected DST/DCT.

TABLE 1

| Transform Type | Basis function $T_i(j)$, i, j = 0, 1, . . . , N − 1 |
|---|---|
| DCT-II | $T_i(j) = \omega_0 \cdot \sqrt{\frac{2}{N}} \cdot \cos\left(\frac{\pi \cdot i \cdot (2j+1)}{2N}\right)$ where $\omega_0 = \begin{cases} \sqrt{\frac{2}{N}} & i = 0 \\ 1 & i \neq 0 \end{cases}$ |
| DCT-V | $T_i(j) = \omega_0 \cdot \omega_1 \cdot \sqrt{\frac{2}{2N-1}} \cdot \cos\left(\frac{2\pi \cdot i \cdot j}{2N-1}\right),$ where $\omega_0 = \begin{cases} \sqrt{\frac{2}{N}} & i = 0 \\ 1 & i \neq 0 \end{cases},$ $\omega_1 = \begin{cases} \sqrt{\frac{2}{N}} & j = 0 \\ 1 & j \neq 0 \end{cases}$ |
| DCT-VIII | $T_i(j) = \sqrt{\frac{4}{2N+1}} \cdot \cos\left(\frac{\pi \cdot (2i+1) \cdot (2j+1)}{4N+2}\right)$ |
| DST-I | $T_i(j) = \sqrt{\frac{2}{N+1}} \cdot \sin\left(\frac{\pi \cdot (i+1) \cdot (j+1)}{N+1}\right)$ |
| DST-VII | $T_i(j) = \sqrt{\frac{4}{2N+1}} \cdot \sin\left(\frac{\pi \cdot (2i+1) \cdot (j+1)}{2N+1}\right)$ |

EMT can be applied to CUs having a width and height equal to or less than 64 and whether EMT is applied can be controlled by a CU level flag. When the CU level flag is 0, DCT-2 is applied to CUs in order to encode residue. Two additional flags are signaled in order to identify horizontal and vertical transforms to be used for a luma coding block in a CU to which EMT is applied. As in HEVC, residual of a block can be coded in a transform skip mode in JEM. For intra-residual coding, a mode-dependent transform candidate selection process is used due to other residual statistics of other intra-prediction modes. Three transform subsets are defined as shown in the following table 2 and a transform subset is selected on the basis of an intra-prediction mode as shown in Table 3.

TABLE 2

| Transform Set | Transform Candidates |
|---|---|
| 0 | DST-VII, DCT-VIII |
| 1 | DST-VII, DST-I |
| 2 | DST-VII, DCT-VIII |

Along with the subset concept, a transform subset is initially confirmed on the basis of Table 2 by using the intra-prediction mode of a CU having a CU-level EMT_CU_ flag of 1. Thereafter, for each of horizontal EMT_TU_horizontal_flag) and vertical (EMT_TU_vertical_ flag) transforms, one of two transform candidates in the confirmed transform subset is selected on the basis of explicit signaling using flags according to Table 3.

TABLE 3

| Intra Mode | 0 | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|
| V | 2 | 1 | 0 | 1 | 0 | 1 | 0 | 1 | 0 | 1 | 0 | 1 | 0 | 1 | 0 | 0 | 0 |
| H | 2 | 1 | 0 | 1 | 0 | 1 | 0 | 1 | 0 | 1 | 0 | 1 | 0 | 1 | 2 | 2 | 2 |
| Intra Mode | 17 | 18 | 19 | 20 | 21 | 22 | 23 | 24 | 25 | 26 | 27 | 28 | 29 | 30 | 31 | 32 | 33 |
| V | 0 | 0 | 0 | 0 | 0 | 0 | 1 | 0 | 1 | 0 | 1 | 0 | 1 | 0 | 1 | 0 | 1 |
| H | 2 | 2 | 2 | 2 | 2 | 2 | 1 | 0 | 1 | 0 | 1 | 0 | 1 | 0 | 1 | 0 | 1 |
| Intra Mode | 34 | 35 | 36 | 37 | 38 | 39 | 40 | 41 | 42 | 43 | 44 | 45 | 46 | 47 | 48 | 49 | 50 |
| V | 0 | 1 | 0 | 1 | 0 | 1 | 0 | 1 | 0 | 1 | 0 | 1 | 2 | 2 | 2 | 2 | 2 |
| H | 0 | 1 | 0 | 1 | 0 | 1 | 0 | 1 | 0 | 1 | 0 | 1 | 0 | 0 | 0 | 0 | 0 |
| Intra Mode | 51 | 52 | 53 | 54 | 55 | 56 | 57 | 58 | 59 | 60 | 61 | 62 | 63 | 64 | 65 | 66 | |
| V | 2 | 2 | 2 | 2 | 1 | 0 | 1 | 0 | 1 | 0 | 1 | 0 | 1 | 0 | 1 | 0 | |
| H | 0 | 0 | 0 | 0 | 1 | 0 | 1 | 0 | 1 | 0 | 1 | 0 | 1 | 0 | 1 | 0 | |

TABLE 4

| Configuration Group | | Horizontal (row) transform | Vertical (column) transform | 35 intra Prediction modes | 67 intra Prediction modes |
|---|---|---|---|---|---|
| Group 0 (G0) | 0 | DST7 | DST7 | 0 | 0 |
| | 1 | DCT5 | DST7 | | |
| | 2 | DST7 | DCT5 | | |
| | 3 | DCT5 | DCT5 | | |
| Group 1 (G1) | 0 | DST7 | DST7 | 1, 3, 5, 7, 13, 15, 17, 19, 21, 23, 29, 31, 33 | 1, 3, 5, 7, 9, 11, 13, 23, 25, 27, 29, 31, 33, 35, 37, 39, 41, 43, 45, 55, 57, 59, 61, 63, 65 |
| | 1 | DST1 | DST7 | | |
| | 2 | DST7 | DST1 | | |
| | 3 | DST1 | DST1 | | |
| Group 2 (G2) | 0 | DST7 | DST7 | 2, 4, 6, 14, 16, 18, 20, 22, 30, 32, 34 | 2, 4, 6, 8, 10, 12, 24, 26, 28, 30, 32, 34, 36, 38, 40, 42, 44, 56, 58, 60, 64, 66 |
| | 1 | DCT8 | DST7 | | |
| | 2 | DST7 | DCT8 | | |
| | 3 | DCT8 | DCT8 | | |
| Group 3 (G3) | 0 | DST7 | DST7 | 8, 9, 10, 11, 12 (Neighboring angles to horizontal directions) | 14, 15, 16, 17, 18, 19, 20, 21, 22 (Neighboring angles to horizontal directions) |
| | 1 | DCT5 | DST7 | | |
| | 2 | DST7 | DCT8 | | |
| | 3 | DCT5 | DCT8 | | |
| Group 4 (G4) | 0 | DST7 | DST7 | 24, 25, 26, 27, 28 (Neighboring angles to vertical directions) | 46, 47, 48, 49, 50, 51, 52, 53, 54 (Neighboring angles to vertical directions) |
| | 1 | DCT8 | DST7 | | |
| | 2 | DST7 | DCT5 | | |
| | 3 | DCT8 | DCT5 | | |
| Group 5 (G5) | 0 | DCT8 | DCT8 | Inter prediction | Inter prediction |
| | 1 | DST7 | DCT8 | | |
| | 2 | DCT8 | DST7 | | |
| | 3 | DST7 | DST7 | | |

Table 4 shows a transform configuration group to which adaptive multiple transform (AMT) is applied as an embodiment to which the present disclosure is applied.

Referring to Table 4, transform configuration groups are determined on the basis of a prediction mode and the number of groups may be 6 (G0 to G5). In addition, G0 to G4 correspond to a case in which intra-prediction is applied and G5 represents transform combinations (or transform set or transform combination set) applied to a residual block generated according to inter-prediction.

One transform combination may be composed of horizontal transform (or row transform) applied to rows of a corresponding 2D block and vertical transform (or column transform) applied to columns thereof.

Here, each of the transform configuration groups may have four transform combination candidates. The four transform combination candidates may be selected or determined using transform combination indexes 0 to 3 and a transform combination index may be encoded and transmitted from an encoder to a decoder.

In an embodiment, residual data (or residual signal) obtained through intra-prediction may have different statistical characteristics according to intra-prediction modes. Accordingly, transforms other than normal cosine transform may be applied for respective intra-predictions as shown in Table 4. In the present description, a transform type may be represented as DCT-Type 2, DCT-II or DCT-2, for example.

Referring to Table 4, a case in which 35 intra-prediction modes are used and a case in which 67 intra-prediction modes are used are shown. A plurality of transform combinations may be applied for each transform configuration group classified in each intra-prediction mode column. For example, a plurality of transform combinations may be composed of four combinations (of transforms in the row direction and transforms in the column direction). As a specific example, DST-7 and DCT-5 can be applied to group 0 in both the row (horizontal) direction and the column (vertical) direction and thus a total of four groups can be applied.

Since a total of four transform kernel combinations can be applied to each intra-prediction mode, a transform combination index for selecting one therefrom can be transmitted per transform unit. In the present description, a transform combination index may be referred to as an AMT index and may be represented by amt_idx.

Furthermore, a case in which DCT-2 is optimal for both the row direction and the column direction may be generated due to characteristics of a residual signal in addition to the transform kernels shown in Table 4. Accordingly, transform can be adaptively applied by defining an AMT flag for each coding unit. Here, DCT-2 can be applied to both the row direction and the column direction when the AMT flag is 0 and one of four combinations can be selected or determined through an AMT index when the AMT flag is 1.

In an embodiment, if the number of transform coefficients is less than 3 for one transform unit when the AMT flag is 0, the transform kernels of Table 4 is not applied and DST-7 may be applied to both the row direction and the column direction.

In an embodiment, if transform coefficient values are previously parsed and thus the number of transform coefficients is less than 3, an AMT index is not parsed and DST-7 is applied and thus the amount of transmission of additional information can be reduced.

In an embodiment, AMT can be applied only when both the width and height of a transform unit are equal to or less than 32.

In an embodiment, Table 4 can be preset through off-line training.

In an embodiment, the AMT index can be defined as one index that can indicate a combination of horizontal transform and vertical transform. Alternatively, the AMT index can be defined as separate horizontal transform index and vertical transform index.

FIG. 8 is a flowchart showing a process of performing adaptive multiple transform (AMT).

Although an embodiment with respect to separable transform that is separately applied in the horizontal direction and the vertical direction is basically described in the present description, a transform combination may be composed of non-separable transforms.

Alternatively, a transform combination may be configured as a mixture of separable transforms and non-separable transforms. In this case, row/column-wise transform selection or selection in the horizontal/vertical direction is unnecessary when separable transform is used and the transform combinations of Table 4 can be used only when separable transform is selected.

In addition, methods proposed in the present description can be applied irrespective of primary transform and secondary transform. That is, the methods can be applied to both the transforms. Here, primary transform can refer to transform for initially transforming a residual block and secondary transform can refer to transform for applying transform to a block generated as a result of primary transform.

First, the encoding apparatus 100 can determine a transform group corresponding to a current block (S805). Here, the transform group may refer to a transform group of Table 4 but the present disclosure is not limited thereto and the transform group may be composed of other transform combinations.

The encoding apparatus 100 can perform transform on available candidate transform combinations in the transform group (S810). As a result of transform, the encoding apparatus 100 can determine or select a transform combination with a lowest rate distortion (RD) cost (S815). The encoding apparatus 100 can encode a transform combination index corresponding to the selected transform combination (S820).

FIG. 9 is a flowchart showing a decoding process of performing AMT.

First, the decoding apparatus 200 can determine a transform group for the current block (S905). The decoding apparatus 200 can parse a transform combination index, and the transform combination index can correspond to one of a plurality of transform combinations in the transform group (S910). The decoding apparatus 200 can derive a transform combination corresponding to the transform combination index (S915). Here, although the transform combination may refer to a transform combination shown in Table 4, the present disclosure is not limited thereto. That is, the transform combination may be configured as other transform combinations.

The decoding apparatus 200 can perform inverse transform on the current block on the basis of the transform combination (S920). When the transform combination is composed of row transform and column transform, row transform may be applied and then column transform may be applied. However, the present disclosure is not limited thereto, and row transform may be applied after column transform is applied, and when the transform combination is composed of non-separable transforms, a non-separable transform can be immediately applied.

In another embodiment, the process of determining a transform group and the process of parsing a transform combination index may be simultaneously performed.

In the embodiment of the present disclosure, the aforementioned term "AMT" may be redefined as "multiple transform set or multiple transform selection (MTS)". MTS related syntaxes and semantics described below are summarized in Versatile Video coding (VVC) JVET-K1001-v4.

In an embodiment of the present disclosure, two MTS candidates can be used for directional modes and four MTS candidates can be used for nondirectional modes as follows.

A) Nondirectional Modes (DC and Planar)

DST-7 is used for horizontal and vertical transforms when MTS index is 0.

DST-7 is used for vertical transform and DCT-8 is used for horizontal transforms when MTS index is 1.

DCT-8 is used for vertical transform and DST-7 is used for horizontal transforms when MTS index is 2.

DCT-8 is used for horizontal and vertical transforms when MTS index is 3.

B) Modes Belonging to Horizontal Group Modes

DST-7 is used for horizontal and vertical transforms when MTS index is 0.

DCT-8 is used for vertical transform and DST-7 is used for horizontal transforms when MTS index is 1.

C) Modes Belonging to Vertical Group Modes

DST-7 is used for horizontal and vertical transforms when MTS index is 0.

DST-7 is used for vertical transform and DCT-8 is used for horizontal transforms when MTS index is 1.

Here (In VTM 2.0 in which 67 modes are used), horizontal group modes include intra-prediction modes 2 to 34 and vertical modes include intra-prediction modes 35 to 66.

In another embodiment of the present disclosure, three MTS candidates are used for all intra-prediction modes.

DST-7 is used for horizontal and vertical transforms when MTS index is 0.

DST-7 is used for vertical transform and DCT-8 is used for horizontal transforms when MTS index is 1.

DCT-8 is used for vertical transform and DST-7 is used for horizontal transforms when MTS index is 2.

In another embodiment of the present disclosure, two MTS candidates are used for directional prediction modes and three MTS candidates are used for nondirectional modes.

A) Nondirectional Modes (DC and Planar)

DST-7 is used for horizontal and vertical transforms when MTS index is 0.

DST-7 is used for vertical transform and DCT-8 is used for horizontal transforms when MTS index is 1.

DCT-8 is used for vertical transform and DST-7 is used for horizontal transforms when MTS index is 2.

B) Prediction Modes Corresponding to Horizontal Group Modes

DST-7 is used for horizontal and vertical transforms when MTS index is 0.

DCT-8 is used for vertical transform and DST-7 is used for horizontal transforms when MTS index is 1.

C) Prediction Modes Corresponding to Vertical Group Modes

DST-7 is used for horizontal and vertical transforms when MTS index is 0.

DST-7 is used for vertical transform and DCT-8 is used for horizontal transforms when MTS index is 1.

In another embodiment of the present disclosure, one MTS candidate (e.g., DST-7) can be used for all intra-modes. In this case, encoding time can be reduced by 40% with some minor coding loss. In addition, one flag may be used to indicate between DCT-2 and DST-7.

FIG. 10 is a flowchart showing an inverse transform process on the basis of MTS according to an embodiment of the present disclosure.

The decoding apparatus 200 to which the present disclosure is applied can obtain sps_mts_intra_enabled_flag or sps_mts_inter_enabled_flag (S1005). Here, sps_mts_intra_enabled_flag indicates whether cu_mts_flag is present in a residual coding syntax of an intra-coding unit. For example, cu_mts_flag is not present in the residual coding syntax of the intra-coding unit if sps_mts_intra_enabled_flag=0 and cu_mts_flag is present in the residual coding syntax of the intra-coding unit if, sps_mts_intra_enabled_flag=1. In addition, sps_mts_inter_enabled_flag indicates whether cu_mts_flag is present in a residual coding syntax of an inter-coding unit. For example, cu_mts_flag is not present in the residual coding syntax of the inter-coding unit if sps_mts_inter_enabled_flag=0 and cu_mts_flag is present in the residual coding syntax of the inter-coding unit if sps_mts_inter_enabled_flag=1.

The decoding apparatus 200 can obtain cu_mts_flag on the basis of sps_mts_intra_enabled_flag or sps_mts_inter_enabled_flag (S1010). For example, the decoding apparatus 200 can obtain cu_mts_flag when sps_mts_intra_enabled-_flag=1 or sps_mts_inter_enabled_flag=1. Here, cu_mts-_flag indicates whether MTS is applied to a residual sample of a luma transform block. For example, MTS is not applied to the residual sample of the luma transform block if cu_mts_flag=0 and MTS is applied to the residual sample of the luma transform block if cu_mts_flag=1.

The decoding apparatus 200 can obtain mts_idx on the basis of cu_mts_flag (S1015). For example, when cu_mts_flag=1, the decoding apparatus 200 can obtain mts_idx. Here, mts_idx indicates which transform kernel is applied to luma residual samples of a current transform block in the horizontal direction and/or the vertical direction.

For example, at least one of embodiments described in the present description can be applied to mts_idx.

The decoding apparatus 200 can derive a transform kernel corresponding to mts_idx (S1020). For example, the transform kernel corresponding to mts_idx can be separately defined as horizontal transform and vertical transform.

For example, when MTS is applied to the current block (i.e., cu_mts_flag=1), the decoding apparatus 200 can configure MTS candidates on the basis of the intra-prediction mode of the current block. In this case, the decoding flowchart of FIG. 10 may further include a step of configuring MTS candidates. Then, the decoding apparatus 200 can determine an MTS candidate to be applied to the current block from among the configured MTS candidates using mts_idx.

As another example, different transform kernels can be applied to horizontal transform and vertical transform. However, the present disclosure is not limited thereto and the same transform kernel may be applied to the horizontal transform and vertical transform.

The decoding apparatus 200 can perform inverse transform on the basis of the transform kernel (S1025).

Furthermore, in the specification, MTS may be represented as AMT or EMT and mts_idx may be represented as AMT_idx, EMT_idx, AMT_TU_idx EMT_TU_idx, or the like but the present disclosure is not limited thereto.

The present disclosure is described by being divided into a case in which the MTS is applied and a case in which the MTS is not applied based on the MTS flag, but is not limited to such an expression. For example, whether or not the MTS is applied may be the same meaning as whether to use other transform types (or transform kernels) other than a predefined specific transform type (which may be referred to as a basic transform type, a default transform type, etc.). If the MTS is applied, a transform type (e.g., any one transform type or a combined transform type of two or more transform types among a plurality of transform types) other than a basic transform type may be used for a transform. Further, if the MTS is not applied, the basic transform type may be used for the transform. In an embodiment, the basic transform type may be configured (or defined) as DCT2.

As an example, when a MTS flag syntax indicating whether or not the MTS is applied to a current transform block and the MTS are applied, a MTS index syntax indicating a transform type applied to the current transform block may also be individually transmitted from an encoder to a decoder. As another example, when whether or not the MTS is applied to a current transform block and the MTS are applied, a syntax (e.g., MTS index) including all of transform types applied to the current transform block may also be transmitted from an encoder to a decoder. That is, in the latter example, a syntax (or syntax element) indicating a transform type applied to the current transform block (or unit) may be transmitted from the encoder to the decoder within all of transform type groups (or transform type sets) including the above-described basic transform type.

Accordingly, in spite of the expression, a syntax (MTS index) indicating a transform type applied to the current transform block may include information about whether or not the MTS is applied. In other words, in the latter example, only the MTS index may be signaled without the MTS flag, and in this case, it may be understood that DCT2 is included in the MTS. However, in the present disclosure, it may be described that the application of DCT2 means that the MTS is not applied. Nevertheless, the technical range with respect to the MTS is not limited to the corresponding definition.

FIG. 11 is a block diagram of an apparatus that performs decoding on the basis of MTS according to an embodiment of the present disclosure.

The decoding apparatus 200 to which the present disclosure is applied may include a sequence parameter acquisition unit 1105, an MTS flag acquisition unit 1110, an MTS index acquisition unit 1115, and a transform kernel derivation unit 1120.

The sequent parameter acquisition unit 1105 can acquire sps_mts_intra_enabled_flag or sps_mts_inter_enabled_flag. Here, sps_mts_intra_enabled_flag indicates whether cu_mts_flag is present in a residual coding syntax of an intra-coding unit and sps_mts_inter_enabled_flag indicates whether cu_mts_flag is present in a residual coding syntax of an inter-coding unit. Description with reference to FIG. 10 may be applied to a specific example.

The MTS flag acquisition unit 1110 can acquire cu_mts_flag on the basis of sps_mts_intra_enabled_flag or sps_mts_inter_enabled_flag. For example, the MTS flag acquisition unit 1110 can acquire cu_mts_flag when sps_mts_intra_enabled_flag=1 or sps_mts_inter_enabled_flag=1. Here, cu_mts_flag indicates whether MTS is applied to a residual sample of a luma transform block. Description with reference to FIG. 10 may be applied to a specific example.

The MTS index acquisition unit 1115 can acquire mts_idx on the basis of cu_mts_flag. For example, the MTS index acquisition unit 1115 can acquire mts_idx when cu_mts_flag=1. Here, mts_idx indicates which transform kernel is applied to luma residual samples of the current transform block in the horizontal direction and/or the vertical direction. Description with reference to FIG. 10 may be applied to a specific example.

The transform kernel derivation unit 1120 can derive a transform kernel corresponding to mts_idx. Then, the decoding apparatus 200 can perform inverse transform on the basis of the derived transform kernel.

Mode-dependent non-separable secondary transform (MDNSST) is introduced. To maintain low complexity, MDNSST is applied to only low-frequency coefficients after primary transform. Further, non-separable transform chiefly applied to low-frequency coefficients may be called LFNST (low frequency non-separable transform). If both the width (W) and height (H) of a transform coefficient block are equal to or greater than 8, 8×8 non-separable secondary transform is applied to an 8×8 left top region of the transform coefficient block. 4×4 non-separable secondary transform is applied if the width or height is less than 8, and the 4×4 non-separable secondary transform can be performed on left top min(8, W)×min(8, H) of the transform coefficient block. Here, min(A, B) is a function of outputting a smaller value between A and B. Further, W×H is the block size, W represents the width and H represents the height.

A total of 35×3 non-separable secondary transforms may be present for block sizes 4×4 and 8×8. Here, 35 is the number of transform sets specified by intra-prediction modes and 3 is the number of NSST candidates for each prediction mode. Mapping from intra-prediction modes to transform sets may be defined in the following table 5.

TABLE 5

| intra mode | 0 | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|
| Set | 0 | 1 | 2 | 3 | 4 | 5 | 6 | 7 | 8 | 9 | 10 | 11 | 12 | 13 | 14 | 15 | 16 |
| intra mode | 17 | 18 | 19 | 20 | 21 | 22 | 23 | 24 | 25 | 26 | 27 | 28 | 29 | 30 | 31 | 32 | 33 |
| Set | 17 | 18 | 19 | 20 | 21 | 22 | 23 | 24 | 25 | 26 | 27 | 28 | 29 | 30 | 31 | 32 | 33 |
| intra mode | 34 | 35 | 36 | 37 | 38 | 39 | 40 | 41 | 42 | 43 | 44 | 45 | 46 | 47 | 48 | 49 | 50 |
| Set | 34 | 33 | 32 | 31 | 30 | 29 | 28 | 27 | 26 | 25 | 24 | 23 | 22 | 21 | 20 | 19 | 18 |
| intra mode | 50 | 51 | 52 | 54 | 55 | 56 | 57 | 58 | 59 | 60 | 61 | 62 | 63 | 64 | 65 | 66 | 67(LM) |
| Set | 17 | 16 | 15 | 14 | 13 | 12 | 11 | 10 | 9 | 8 | 7 | 6 | 5 | 4 | 3 | 2 | NULL |

In order to indicate a transform kernel among transform sets, an NSST index (NSST idx) can be coded. When NSST is not applied, NSST index equal to 0 is signalled.

FIGS. 12 and 13 are flowcharts showing encoding/decoding to which secondary transform is applied as an embodiment to which present disclosure is applied.

In JEM, secondary transform (MDNSST) is not applied for a block coded with transform skip mode. When the MDNSST index is signalled for a CU and not equal to zero, MDNSST is not used for a block of a component that is coded with transform skip mode in the CU. The overall coding structure including coefficient coding and NSST index coding is shown in FIGS. 12 and 13. A CBF flag is encoded to determine whether coefficient coding and NSST coding are performed. In FIGS. 12 and 13, the CBF flag can represent a luma block cbg flag (cbf_luma flag) or a chroma block cbf flag (cbf_cb flag or cbf_cr flag). When the CBF flag is 1, transform coefficients are coded.

Referring to FIG. 12, the encoding apparatus 100 checks whether CBF is 1 (S1205). If CBF is 0, the encoding apparatus 100 does not perform transform coefficient encoding and NSST index encoding. If CBF is 1, the encoding apparatus 100 performs encoding on transform coefficients (S1210). Thereafter, the encoding apparatus 100 determines whether to perform NSST index coding (S1215) and performs NSST index coding (S1220). When NSST index coding is not applied, the encoding apparatus 100 can end the transform procedure without applying NSST and perform the subsequent step (e.g., quantization).

Referring to FIG. 13, the decoding apparatus 200 checks whether CBF is 1 (S1305). If CBF is 0, the decoding apparatus 200 does not perform transform coefficient decoding and NSST index decoding. If CBF is 1, the decoding apparatus 200 performs decoding on transform coefficients (S1310). Thereafter, the decoding apparatus 200 determines whether to perform NSST index coding (S1315) and parse an NSST index (S1320).

NSST can be applied to an 8×8 or 4×4 left top region instead of being applied to the entire block (TU in the case of HEVC) to which primary transform has been applied. For example, 8×8 NSST can be applied when a block size is 8×8 or more (that is, both of the width and height of a block is greater than or equal to 8) and 4×4 NSST can be applied when a block size is less than 8×8 (that is, both of the width and height is less than 8). Further, when 8×8 NSST is applied (that is, when a block size is 8×8 or more), 4×4 NSST can be applied per 4×4 block (that is, top left 8×8 region is divided into 4×4 blocks and 4×4 NSST is applied to each 4×4 block). Both 8×8 NSST and 4×4 NSST can be determined according to the above-described transform set configuration, and 8×8 NSST may have 64 pieces of input data and 64 pieces of output data and 4×4 NSST may have 16 inputs and 16 outputs because they are non-separable transforms.

FIGS. 14 and 15 show an embodiment to which the present disclosure is applied, FIG. 14 is a diagram for describing Givens rotation and FIG. 15 shows a configuration of one round in 4×4 NSST composed of Givens rotation layers and permutations.

Both 8×8 NSST and 4×4 NSST can be configured as hierarchical combinations of Givens rotations. A matrix corresponding to one Givens rotation is represented as Equation 1 and a matrix product is represented as FIG. 14.

$$R_\theta = \begin{bmatrix} \cos\theta & -\sin\theta \\ \sin\theta & \cos\theta \end{bmatrix} \quad \text{[Equation 1]}$$

In FIG. 14, $t_m$ and $t_n$ output according to Givens rotation can be calculated as represented by Equation 2.

$$t_m = x_m\cos\theta - x_n\sin\theta \quad \text{[Equation 2]}$$

$$t_n = x_m\sin\theta + x_n\cos\theta$$

Since Givens rotation rotates two pieces of data as shown in FIG. 14, 32 or 8 Givens rotations are required to process 64 (in the case of 8×8 NSST) or 16 (in the case of 4×4 NSST) pieces of data. Accordingly, a group of 32 or 8 Givens rotations can form a Givens rotation layer. As shown in FIG. 15, output data for one Givens rotation layer is transmitted as input data for the next Givens rotation layer through permutation (shuffling). A pattern permuted as shown in FIG. 15 is regularly defined, and in the case of 4×3 NSST, four Givens rotation layers and corresponding permutations form one round. 4×4 NSST is performed by two rounds and 8×8 NSST is performed by four rounds. Although different rounds use the same permutation pattern, applied Givens rotation angles are different. Accordingly, angle data for all Givens rotations constituting each permutation needs to be stored.

As a final step, one more permutation is finally performed on data output through Givens rotation layers, and information about corresponding permutation is separately stored for each permutation. Corresponding permutation is performed at the end of forward NSST and corresponding reverse permutation is initially applied in inverse NSST.

Reverse NSST reversely performs Givens rotation layers and permutations applied to forward NSST and performs rotation by taking a negative value for each Given rotation angle.

RST (Reduced Secondary Transform)

FIGS. 16A and 16B show operation of RST as an embodiment to which the present disclosure is applied.

When an orthogonal matrix representing a transform is N×N, a reduced transform (RT) leaves only R of N transform basic vectors (R<N). A matrix with respect to forward RT that generates transform coefficients can be defined by Equation 3.

$$T_{RXN} = \begin{bmatrix} t_{11} & \cdots & t_{1N} \\ \vdots & \ddots & \vdots \\ t_{R1} & \cdots & t_{RN} \end{bmatrix} \quad \text{[Equation 3]}$$

Since a matrix with respect to reverse RT is a transpose matrix of a forward RT matrix, application of forward RT and reverse RT is schematized as shown in FIGS. 16A and 16B.

RT applied to an 8×8 left top block of a transform coefficient block to which primary transform has been applied can be referred to as 8×8 RST. When R is set to 16 in Equation 3, forward 8×8 RST has a form of 16×64 matrix and reverse 8×8 RST has a form of 64×16 matrix. In this case, an M×N matrix may consist of M rows and N columns. Further, the transform set configuration as shown in Table 5 can be applied to 8×8 RST. That is, 8×8 RST can be determined on the basis of transform sets according to intra-prediction modes as shown in Table 5. Since one transform set is composed of two or three transforms according to an intra-prediction mode, one of a maximum of four transforms including a case in which secondary transform is not applied can be selected (one transform can correspond to an anisotropic matrix). When indices 0, 1, 2 and 3 are assigned to the four transforms, a transform to be applied can be designated by signaling a syntax element corresponding to an NSST index for each transform coefficient block. For example, the index 9 can assigned to an anisotropic matrix, that is, a case in which secondary transform is not applied. Consequently, 8×8 NSST can be designated according to JEM NSST and 8×8 RST can be designated according to RST configuration for an 8×8 left top block through the NSST index.

FIG. 17 is a diagram showing a process of performing reverse scanning from the sixty-fourth coefficient to the seventeenth coefficient in reverse scan order as an embodiment to which the present disclosure is applied.

When 8×8 RST as represented by Equation 3 is applied, 16 valid transform coefficients are generated and thus 64 pieces of input data constituting an 8×8 region are reduced to 16 pieces of output data and only a quarter region is filled with valid transform coefficients according to the viewpoint of two-dimensional region. Accordingly, the 16 pieces of output data obtained by applying forward 8×8 RST fill a left top region of FIG. 17.

In FIG. 17, a 4×4 left top region becomes a region of interest (ROI) filled with valid transform coefficients and the remaining region is vacant. The vacant region may be filled with 0 as a default value. If non-zero valid transform coefficients are discovered in regions other than the ROI of FIG. 17, 8×8 RST has not been definitely applied and thus corresponding coding may be omitted for corresponding NSST index. On the other hand, if non-zero valid transform coefficients are not discovered in regions other than the ROI of FIG. 17 (8×8 RST is applied or regions other than the ROI are filled with 0), the NSST index may be coded because 8×8 RST might be applied. Such conditional NSST index coding requires checking presence or absence of a non-zero transform coefficient and thus can be performed after the residual coding process.

FIG. 18 is an exemplary flowchart showing encoding using a single transform indicator as an embodiment to which the present disclosure is applied.

In an embodiment of the present disclosure, the single transform indicator (STI) is introduced. A single transform can be applied when the STI is enabled (STI coding==1) instead of sequentially used two transforms (primary transform and secondary transform). Here, the single transform may be any type of transform. For example, the single transform may be a separable transform or a non-separable transform. The single transform may be a transform approximated from a non-separable transform. A single transform index (ST_idx in FIG. 18) can be signaled when the STI has been enabled. Here, the single transform index can indicate a transform to be applied form among available transform candidates.

Referring to FIG. 18, the encoding apparatus 100 determines whether CBF is 1 (S1805). When CBF is 1, the encoding apparatus 100 determines whether STI coding is applied (S1810). When STI coding is applied, the encoding apparatus 100 encodes an STI index STI_idx (S1845) and performs coding on transform coefficient (S1850). When STI coding is not applied, the encoding apparatus 100 encodes a flag EMT_CU_Flag indicating whether EMT (or MTS) is applied at a CU level (S1815). Thereafter, the encoding apparatus 100 performs coding on the transform coefficients (S1820). Then, the encoding apparatus 100 determines whether EMT is applied to a transform unit (TU) (S1825). When EMT is applied to the TU, the encoding apparatus 100 encodes a primary transform index EMT_TU Idx applied to the TU (S1830). Subsequently, the encoding apparatus 100 determines whether NSST is applied (S1835). When NSST is applied, the encoding apparatus 100 encodes an index NSST_Idx indicating NSST to be applied (S1840).

In an example, if single transform coding conditions are satisfied/enabled (e.g., STI_coding==1), the single transform index ST_Idx may be implicitly derived instead of being signaled. ST_idx can be implicitly determined on the basis of a block size and an intra-prediction mode. Here, ST_Idx can indicate a transform (or transform kernel) applied to the current transform block.

The STI can be enabled if one or more of the following conditions are satisfied (STI_coding==1).

1) The block size corresponds to a predetermined value such as 4 or 8.
2) Block width==Block height (square block)
3) The intra-prediction mode is one of predetermined modes such as DC and planar modes.

In another example, the STI coding flag can be signaled in order to indicate whether the single transform is applied. The STI coding flag can be signaled on the basis of an STI coding value and CBF. For example, the STI coding flag can be signaled when CBF is 1 and STI coding is enabled. Furthermore, the STI coding flag can be conditionally signaled in consideration of a block size, a block shape (square block or non-square block) or an intra-prediction mode.

To use information acquired during coefficient coding, ST_idx may be determined after coefficient coding. In an example, ST_idx can be implicitly determined on the basis of a block size, an intra-prediction mode and the number of non-zero coefficients. In another example, ST_idx can be conditionally encoded/decoded on the basis of a block size, a block shape, an intra-prediction mode and/or the number of non-zero coefficients. In another example, ST_idx signaling may be omitted depending on a distribution of non-zero coefficients (i.e., positions of non-zero coefficients). Particularly, when non-zero coefficients are discovered in a region other than a 4×4 left top region, ST_idx signaling can be omitted.

FIG. 19 is an exemplary flowchart showing encoding using a unified transform indicator (UTI) as an embodiment to which the present disclosure is applied.

In an embodiment of the present disclosure, the unified transform indicator is introduced. The UTI includes a primary transform indicator and a secondary transform indicator.

Referring to FIG. 19, the encoding apparatus 100 determines whether CBF is 1 (S1905). When CBF is 1, the encoding apparatus 100 determines whether UTI coding is applied (S1910). When UTI coding is applied, the encoding apparatus 100 encodes a UTI index UTI_idx (S1945) and performs coding on transform coefficient (S1950). When UTI coding is not applied, the encoding apparatus 100 encodes the flag EMT_CU_Flag indicating whether EMT (or MTS) is applied at the CU level (S1915). Thereafter, the encoding apparatus 100 performs coding on the transform coefficients (S1920). Then, the encoding apparatus 100 determines whether EMT is applied to a transform unit (TU) (S1925). When EMT is applied to the TU, the encoding apparatus 100 encodes a primary transform index EMT_TU Idx applied to the TU (S1930). Subsequently, the encoding apparatus 100 determines whether NSST is applied (S1935). When NSST is applied, the encoding apparatus 100 encodes an index NSST_Idx indicating NSST to be applied (S1940).

The UTI may be coded for each predetermined unit (CTU or CU).

The UTI coding mode may be dependent on the following conditions.

1) Block size
2) Block shape
3) Intra-prediction mode

How to derive/extract a core transform index from the UTI is defined in advance. How to derive/extract a secondary transform index from the UTI is defined in advance.

A syntax structure for the UTI can be optionally used. The UTI can depend on a CU (TU) size. For example, a smaller CU (TU) may have a UTI index in a narrower range. In an example, the UTI can indicate only the core transform index if a predefined condition (e.g., a block size is less than a predefined threshold value) is satisfied.

TABLE 6

| UTI-Index | Binalization (FLC) | Core Transform Idx | Secondary Transform Idx |
|---|---|---|---|
| 0 | 00000 | 0 | 0 |
| 1 | 00001 | 0 | 1 |
| 2 | 00010 | 0 | 2 |
| 3 | 00011 | 0 | 3 |
| 4 | 00100 | 1 | 0 |
| 5 | 00101 | 1 | 1 |
| 6 | 00110 | 1 | 2 |
| 7 | 00111 | 1 | 3 |
| . . . | . . . | . . . | . . . |
| 31 | 11111 | 5 | 3 |

In another example, UTI index may be considered as the core transform index when secondary transform is not indicated to be used (e.g., secondary transform index==0 or secondary transform is already predetermined). In the same manner, UTI index may be considered as a secondary transform index when the core transform index is considered to be known. Specifically, considering the intra prediction mode and the block size, a predetermined core transform may be used.

FIGS. 20A and 20B illustrate two exemplary flowcharts showing encoding using the UTI as an embodiment to which the present disclosure is applied.

In another example, the transform coding structure may use UTI index coding as shown in FIGS. 20 and 20B. Here, the UTI index may be coded earlier than coefficient coding or later than coefficient coding.

Referring to FIG. 20A, the encoding apparatus 100 checks whether CBF is 1 (S2005). When CBF is 1, the encoding apparatus 100 codes the UTI index UTI_idx (S2010) and performs coding on transform coefficients (S2015).

Referring to FIG. 20B, the encoding apparatus 100 checks whether CBF is 1 (S2055). When CBF is 1, the encoding apparatus 100 performs coding on the transform coefficients (S2060) and codes the UTI index UTI_idx (S2065).

In another embodiment of the present disclosure, data hiding and implicit coding methods for transform indicators are introduced. Here, transform indicators may include ST_idx, UTI_idx, EMT_CU_Flag, EMT_TU_Flag, NSST_Idx and any sort of transform related index which may be used to indicate a transform kernel. The above-mentioned transform indicator may not be signaled but the corresponding information may be inserted in a coefficient coding process (it can be extracted during a coefficient coding process). The coefficient coding process may include the following parts.

Last_position_x, Last_position_y
Group flag
Significance map
Greather_than_1 flag
Greather_than_2 flag
Remaining level coding
Sign coding For example, transform indicator information may be inserted in one or more of above-mentioned coefficient coding processes. In order to insert transform indicator information, the followings may be considered jointly.

Pattern of sing coding
The absolute value of remaining level
The number of Greather_than_1 flag
The values of Last_position_X and Last_position_Y The above-mentioned data hiding method may be considered conditionally. For example, the data hiding method may be dependent on the number of non-zero coefficients.

In another example, NSST_idx and EMT_idx may be dependent. For example, NSST_idx may not be zero when EMT_CU_Flag is equal to zero (or one). In this case, NSST_idx−1 may be signaled instead of NSST_idx.

In another embodiment of the present disclosure, NSST transform set mapping based on intra-prediction mode is introduced as shown in the following table 7. Although NSST is described below as an example of non-separable transform, another known terminology (e.g., LFNST) may be used for non-separable transform. For example, NSST set and NSST index may be replaced with LFNST set and LFNST index. Further, RST described in this specification may also be replaced with LFNST as an example of non-separable transform (e.g., LFNST) using a non-square transform matrix having a reduced input length and/or a reduced output length in a square non-separable transform matrix applied to an at least a region (4×4 or 8×8 left top region or a region other than a 4×4 right bottom region in an 8×8 block) of a transform block.

TABLE 7

| intra mode | 0 | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|
| NSST Set | 0 | 0 | 2 | 2 | 2 | 2 | 2 | 2 | 2 | 2 | 2 | 2 | 2 | 18 | 18 | 18 | 16 |
| intra mode | 17 | 18 | 19 | 20 | 21 | 22 | 23 | 24 | 25 | 26 | 27 | 28 | 29 | 30 | 31 | 32 | 33 |
| NSST Set | 18 | 18 | 18 | 18 | 18 | 18 | 18 | 34 | 34 | 34 | 34 | 34 | 34 | 34 | 34 | 34 | 34 |
| intra mode | 34 | 35 | 36 | 37 | 38 | 39 | 40 | 41 | 42 | 43 | 44 | 45 | 46 | 47 | 48 | 49 | 50 |
| NSST Set | 34 | 34 | 34 | 34 | 34 | 34 | 34 | 34 | 34 | 34 | 34 | 18 | 18 | 18 | 18 | 18 | 18 |
| intra mode | 51 | 52 | 53 | 54 | 55 | 56 | 57 | 58 | 59 | 60 | 61 | 62 | 63 | 64 | 65 | 66 | |
| NSST Set | 18 | 18 | 18 | 18 | 18 | 2 | 2 | 2 | 2 | 2 | 2 | 2 | 2 | 2 | 2 | 2 | |

The NSST Set number may be rearranged from 0 to 3 as shown in Table 8.

TABLE 8

| intra mode | 0 | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|
| NSST Set | 0 | 0 | 1 | 1 | 1 | 1 | 1 | 1 | 1 | 1 | 1 | 1 | 1 | 2 | 2 | 2 | 2 |
| intra mode | 17 | 18 | 19 | 20 | 21 | 22 | 23 | 24 | 25 | 26 | 27 | 28 | 29 | 30 | 31 | 32 | 33 |
| NSST Set | 2 | 2 | 2 | 2 | 2 | 2 | 2 | 3 | 3 | 3 | 3 | 3 | 3 | 3 | 3 | 3 | 3 |
| intra mode | 34 | 35 | 36 | 37 | 38 | 39 | 40 | 41 | 42 | 43 | 44 | 45 | 46 | 47 | 48 | 49 | 50 |
| NSST Set | 3 | 3 | 3 | 3 | 3 | 3 | 3 | 3 | 3 | 3 | 3 | 2 | 2 | 2 | 2 | 2 | 2 |

TABLE 8-continued

| intra mode | 51 | 52 | 53 | 54 | 55 | 56 | 57 | 58 | 59 | 60 | 61 | 62 | 63 | 64 | 65 | 66 |
|---|---|---|---|---|---|---|---|---|---|---|---|---|---|---|---|---|
| NSST Set | 2 | 2 | 2 | 2 | 2 | 1 | 1 | 1 | 1 | 1 | 1 | 1 | 1 | 1 | 1 | 1 |

In the NSST transform set, only four transform sets (instead of 35) are used so that the required memory space can be reduced.

In addition, various numbers of transform kernels per transform set may be used as follows.

Case A: Two available transform kernels for each transform set are used so that the NSST index range is from 0 to 2. For example, when the NSST index is 0, secondary transform (inverse secondary transform based on a decoder) may not be applied. When the NSST index is 1 or 2, secondary transform may be applied. The transform set may include two transform kernels to which an index 1 or 2 may be mapped.

TABLE 9

| NSST Set | 0 (DC, Planar) | 1 | 2 | 3 |
|---|---|---|---|---|
| # of transform kernels | 2 | 2 | 2 | 2 |

Referring to Table 9, two transform kernels are used for each of non-separable transform (NSST or LFNST) sets 0 to 3.

Case B: Two available transform kernels are used for transform set 0 and one is used for others. Available NSST indices for transform set 0 (DC and Planar) are 0 to 2. However, NSST indices for other modes (transform sets 1, 2 and 3) are 0 to 1.

TABLE 10

| NSST Set | 0 (DC, Planar) | 1 | 2 | 3 |
|---|---|---|---|---|
| # of transform kernels | 2 | 1 | 1 | 1 |

Referring to Table 10, two non-separable transform kernels are set for a non-separable transform (NSST) set corresponding to index 0 and one non-separable transform kernel is set for each of non-separable transform (NSST) sets corresponding to indices 1, 2 and 3.

Case C: One transform kernel is used per transform kernel and the NSST index range is 0 to 1.

TABLE 11

| NSST Set | 0 (DC, Planar) | 1 | 2 | 3 |
|---|---|---|---|---|
| # of transform kernels | 1 | 1 | 1 | 1 |

FIG. 21 is an exemplary flowchart showing encoding for performing transform as an embodiment to which the present disclosure is applied.

The encoding apparatus 100 performs primary transform on a residual block (S2105). The primary transform may be referred to as core transform. As an embodiment, the encoding apparatus 100 may perform the primary transform using the above-mentioned MTS. Further, the encoding apparatus 100 may transmit an MTS index indicating a specific MTS from among MTS candidates to the decoding apparatus 200. Here, the MTS candidates may be configured on the basis of the intra-prediction mode of the current block.

The encoding apparatus 100 determines whether to apply secondary transform (S2110). For example, the encoding apparatus 100 may determine whether to apply the secondary transform on the basis of transform coefficients of the primarily transformed residual block. For example, the secondary transform may be NSST or RST.

The encoding apparatus 100 determines the secondary transform (S2115). Here, the encoding apparatus 100 may determine the secondary transform on the basis of an NSST (or RST) transform set designated according to the intra-prediction mode.

For example, the encoding apparatus 100 may determine a region to which the secondary transform will be applied on the basis of the size of the current block prior to step S2115.

The encoding apparatus 100 performs the secondary transform determined in step S2115 (S2120).

FIG. 22 is an exemplary flowchart showing decoding for performing transform as an embodiment to which the present disclosure is applied.

The decoding apparatus 200 determines whether to apply inverse secondary transform (S2205). For example, the inverse secondary transform may be NSST or RST. For example, the decoding apparatus 200 may determine whether to apply the inverse secondary transform on the basis of a secondary transform flag received from the encoding apparatus 100.

The decoding apparatus 200 determines the inverse secondary transform (S2210). Here, the decoding apparatus 200 may determine the inverse secondary transform applied to the current block on the basis of the NSST (or RST) transform set designated according to the aforementioned intra-prediction mode.

Further, for example, the decoding apparatus 200 may determine a region to which the inverse secondary transform will be applied on the basis of the size of the current block prior to step S2210.

The decoding apparatus 200 performs inverse secondary transform on an inversely quantized residual block using the inverse secondary transform determined in step S2210 (S2215).

The decoding apparatus performs inverse primary transform on the inversely secondarily transformed residual block (S2220). The inverse primary transform may be called inverse core transform. In an embodiment, the decoding apparatus 200 may perform the inverse primary transform using the aforementioned MTS. Further, as an example, the decoding apparatus 200 may determine whether MTS is applied to the current block prior to step S2220. In this case, the decoding flowchart of FIG. 22 may further include a step of determining whether MTS is applied.

For example, when MTS is applied to the current block (i.e., cu_mts_flag=1), the decoding apparatus 200 may configure MTS candidates on the basis of the intra-prediction mode of the current block. In this case, the decoding flowchart of FIG. 22 may further include a step of configuring MTS candidates. In addition, the decoding apparatus 200 may determine inverse primary transform applied to the current block using mtx_idx indicating a specific MTS from among the configured MTS candidates.

FIG. 23 is a detailed block diagram of the transform unit 120 in the encoding apparatus 100 as an embodiment to which the present disclosure is applied.

The encoding apparatus 100 to which an embodiment of the present disclosure is applied may include a primary transform unit 2310, a secondary transform application determination unit 2320, a secondary transform determination unit 2330, and a secondary transform unit 2340.

The primary transform unit 2310 can perform primary transform on a residual block. The primary transform may be referred to as core transform. As an embodiment, the primary transform unit 2310 may perform the primary transform using the above-mentioned MTS. Further, the primary transform unit 2310 may transmit an MTS index indicating a specific MTS from among MTS candidates to the decoding apparatus 200. Here, the MTS candidates may be configured on the basis of the intra-prediction mode of the current block.

The secondary transform application determination unit 2320 can determine whether to apply secondary transform. For example, the secondary transform application determination unit 2320 may determine whether to apply the secondary transform on the basis of transform coefficients of the primarily transformed residual block. For example, the secondary transform may be NSST or RST.

The secondary transform determination unit 2330 determines the secondary transform. Here, the secondary transform determination unit 2330 may determine the secondary transform on the basis of an NSST (or RST) transform set designated according to the intra-prediction mode as described above.

For example, the secondary transform determination unit 2330 may determine a region to which the secondary transform will be applied on the basis of the size of the current block.

The secondary transform unit 2340 can perform the determined secondary transform.

FIG. 24 is a detailed block diagram of the inverse transform unit 230 in the decoding apparatus 200 as an embodiment to which the present disclosure is applied.

The decoding apparatus 200 to which the present disclosure is applied includes an inverse secondary transform application determination unit 2410, an inverse secondary transform determination unit 2420, an inverse secondary transform unit 2430, and an inverse primary transform unit 2440.

The inverse secondary transform application determination unit 2410 can determine whether to apply inverse secondary transform. For example, the inverse secondary transform may be NSST or RST. For example, the inverse secondary transform application determination unit 2410 may determine whether to apply the inverse secondary transform on the basis of a secondary transform flag received from the encoding apparatus 100.

The inverse secondary transform determination unit 2420 can determine the inverse secondary transform. Here, the inverse secondary transform determination unit 2420 may determine the inverse secondary transform applied to the current block on the basis of the NSST (or RST) transform set designated according to the intra-prediction mode.

Further, for example, the inverse secondary transform determination unit 2420 may determine a region to which the inverse secondary transform will be applied on the basis of the size of the current block.

The inverse secondary transform unit 2430 can perform inverse secondary transform on an inversely quantized residual block using the determined inverse secondary transform.

The inverse primary transform unit 2440 can perform inverse primary transform on the inversely secondarily transformed residual block. In an embodiment, the inverse primary transform unit 2440 may perform the inverse primary transform using the aforementioned MTS. Further, as an example, the inverse primary transform unit 2440 may determine whether MTS is applied to the current block.

For example, when MTS is applied to the current block (i.e., cu_mts_flag=1), the inverse primary transform unit 2440 may configure MTS candidates on the basis of the intra-prediction mode of the current block. In addition, the inverse primary transform unit 2440 may determine inverse primary transform applied to the current block using mtx_idx indicating a specific MTS from among the configured MTS candidates.

FIG. 25 is a flowchart for processing a video signal as an embodiment to which the present disclosure is applied. The process of the flowchart of FIG. 25 can be executed by the decoding apparatus 200 or the inverse transform unit 230.

First, the decoding apparatus 200 can determine whether reverse non-separable transform is applied to the current block on the basis of a non-separable transform index and the width and height of the current block. For example, if the non-separable transform index is not 0 and the width and height of the current block are equal to or greater than 4, the decoding apparatus 200 can determine that the non-separable transform is applied. If the non-separable transform index is 0 or the width or the height of the current block is less than 4, the decoding apparatus 200 can omit the reverse non-separable transform and perform inverse primary transform.

In step S2505, the decoding apparatus 200 determines a non-separable transform set index indicating a non-separable transform set used for non-separable transform of the current block from among non-separable transform sets predefined on the basis of the intra-prediction mode of the current block. A non-separable transform set index can be set such that it is allocated to each of four transform sets configured according to the range of the intra-prediction mode, as shown in Table 7 or Table 8. That is, the non-separable transform set index can be determined as a first index value when the intra-prediction mode is 0 and 1, determined as a second index value when the intra-prediction mode is 2 to 12 or 56 to 66, determined as a third index value when the intra-prediction mode is 13 to 23 or 45 to 55, and determined as a fourth index value when the intra-prediction mode is 24 to 44, as shown in Table 7 or Table 8.

Here, each of the predefined non-separable transform sets may include two transform kernels, as shown in Table 9. Further, each of the predefined non-separable transform sets may include one or two transform kernels, as shown in Table 10 or 11.

In step S2510, the decoding apparatus 200 determines, as a non-separable transform matrix, a transform kernel indicated by the non-separable transform index for the current block from among transform kernels included in the non-separable transform set indicated by the non-separable transform set index. For example, two non-separable transform kernels may be configured for each non-separable transform set index value and the decoding apparatus 200 may determine a non-separable transform matrix on the basis of the transform kernel indicated by the non-separable transform index between two transform matrix kernels corresponding to the non-separable transform set index.

In step S2515, the decoding apparatus 200 applies the non-separable transform matrix to a left top region of the current block determined on the basis of the width and height of the current block. For example, non-separable transform may be applied to an 8×8 left top region of the current block if both the width and height of the current block are equal to or greater than 8 and non-separable transform may be applied to a 4×4 region of the current block if the width or height of the current block is less than 8. The size of non-separable transform may also be set to a size (e.g. 48×16, 16×16) corresponding to 8×8 or 4×4 in response to a region to which non-separable transform will be applied.

Furthermore, the decoding apparatus 200 may apply horizontal transform and vertical transform to the current block to which non-separable transform has been applied. Here, the horizontal transform and vertical transform may be determined on the basis of an MTS index for selection of the prediction mode and transform matrix applied to the current block.

Hereinafter, a method of applying a primary transform and a secondary transform in a combined manner is described. That is, an embodiment of the present disclosure proposes a method of efficiently designing a transform used in the primary transform and the secondary transform. In this instance, the methods illustrated in FIGS. 1 to 25 can be applied, and the redundant description is omitted.

As described above, the primary transform represents a transform that is first applied to a residual block in an encoder. If the secondary transform is applied, the encoder may perform the secondary transform on the primary transformed residual block. If the secondary transform was applied, a secondary inverse transform may be performed before a primary inverse transform in a decoder. The decoder may perform the primary inverse transform on a secondary inverse transformed transform coefficient block to derive a residual block.

In addition, as described above, a non-separable transform may be used as the secondary transform, and the secondary transform may be applied only to coefficients of a low frequency of a top-left specific region in order to maintain low complexity. The secondary transform applied to these coefficients of the low frequency may be referred to as a non-separable secondary transform (NSST), a low frequency non-separable transform (LFNST), or a reduced secondary transform (RST). The primary transform may be referred to as a core transform.

In an embodiment of the present disclosure, a primary transform candidate used in the primary transform and a secondary transform kernel used in the secondary transform may be predefined as various combinations. In the present disclosure, the primary transform candidate used in the primary transform may be referred to as a MTS candidate, but is not limited to the name. For example, the primary transform candidate may be a combination of transform kernels (or transform types) respectively applied to horizontal and vertical directions, and the transform kernel may be one of DCT2, DST7 and/or DCT8. In other words, the primary transform candidate may be at least one combination of DCT2, DST7 and/or DCT8. The following description is given with detailed examples.

Combination A

In a combination A, as illustrated in the following Table 12, a primary transform candidate and a secondary transform kernel may be defined according to an intra prediction mode.

TABLE 12

| | | |
|---|---|---|
| Case 1 | 2 MTS candidates for angular mode | 2 transform kernels for angular mode |
| | 4 MTS candidates for non-angular | 2 transform kernels for non-angular mode |
| Case 2 | 2 MTS candidates for angular mode | 1 transform kernels for angular mode |
| | 4 MTS candidates for non-angular | 2 transform kernels for non-angular mode |
| Case 3 | 2 MTS candidates for angular mode | 1 transform kernels for angular mode |
| | 4 MTS candidates for non-angular | 1 transform kernels for non-angular mode |

Referring to the above Table 12, as an example (Case 1), two primary transform candidates may be used if the intra prediction mode has directionality, and four primary transform candidates may be used if the intra prediction mode has no directionality (e.g., DC mode, planar mode). In this instance, a secondary transform candidate may include two transform kernels irrespective of the directionality of the intra prediction mode. That is, as described above, a plurality of secondary transform kernel sets may be predefined according to the intra prediction mode, and each of the plurality of predefined secondary transform kernel sets may include two transform kernels.

Further, as an example (Case 2), two primary transform candidates may be used if the intra prediction mode has directionality, and four primary transform candidates may be used if the intra prediction mode has no directionality. In this instance, a secondary transform candidate may include one transform kernel if the intra prediction mode has directionality, and a secondary transform candidate may include two transform kernels if the intra prediction mode has no directionality.

Further, as an example (Case 3), two primary transform candidates may be used if the intra prediction mode has directionality, and four primary transform candidates may be used if the intra prediction mode has no directionality. In this instance, a secondary transform candidate may include one transform kernel irrespective of the directionality of the intra prediction mode.

Combination B

In a combination B, as illustrated in the following Table 13, a primary transform candidate and a secondary transform kernel may be defined according to an intra prediction mode.

TABLE 13

| | | |
|---|---|---|
| Case 1 | 3 MTS candidates for angular mode | 2 transform kernels for angular mode |
| | 3 MTS candidates for non-angular | 2 transform kernels for non-angular mode |

TABLE 13-continued

| | | |
|---|---|---|
| Case 2 | 3 MTS candidates for angular mode<br>3 MTS candidates for non-angular | 1 transform kernels for angular mode<br>2 transform kernels for non-angular mode |
| Case 3 | 3 MTS candidates for angular mode<br>3 MTS candidates for non-angular | 1 transform kernels for angular mode<br>1 transform kernels for non-angular mode |

Referring to the above Table 13, as an example (Case 1), three primary transform candidates may be used irrespective of the directionality of the intra prediction mode. In this instance, a secondary transform candidate may include two transform kernels irrespective of the directionality of the intra prediction mode. That is, as described above, a plurality of secondary transform kernel sets may be predefined according to the intra prediction mode, and each of the plurality of predefined secondary transform kernel sets may include two transform kernels.

Further, as an example (Case 2), three primary transform candidates may be used irrespective of the directionality of the intra prediction mode. In this instance, a secondary transform candidate may include one transform kernel if the intra prediction mode has directionality, and the secondary transform candidate may include two transform kernels if the intra prediction mode has no directionality.

Further, as an example (Case 3), three primary transform candidates may be used irrespective of the directionality of the intra prediction mode. In this instance, a secondary transform candidate may include one transform kernel irrespective of the directionality of the intra prediction mode.

Combination C

In a combination C, as illustrated in the following Table 14, a primary transform candidate and a secondary transform kernel may be defined according to an intra prediction mode.

TABLE 14

| | Primary transform | Secondary Transform |
|---|---|---|
| Case 1 | 2 MTS candidates for angular mode<br>3 MTS candidates for non-angular | 2 transform kernels for angular mode<br>2 transform kernels for non-angular mode |
| Case 2 | 2 MTS candidates for angular mode<br>3 MTS candidates for non-angular | 1 transform kernels for angular mode<br>2 transform kernels for non-angular mode |
| Case 3 | 2 MTS candidates for angular mode<br>3 MTS candidates for non-angular | 1 transform kernels for angular mode<br>1 transform kernels for non-angular mode |

Referring to the above Table 14, as an example (Case 1), two primary transform candidates may be used if the intra prediction mode has directionality, and three primary transform candidates may be used if the intra prediction mode has no directionality (e.g., DC mode, planar mode). In this instance, a secondary transform candidate may include two transform kernels irrespective of the directionality of the intra prediction mode. That is, as described above, a plurality of secondary transform kernel sets may be predefined according to the intra prediction mode, and each of the plurality of predefined secondary transform kernel sets may include two transform kernels.

Further, as an example (Case 2), two primary transform candidates may be used if the intra prediction mode has directionality, and three primary transform candidates may be used if the intra prediction mode has no directionality. In this instance, a secondary transform candidate may include one transform kernel if the intra prediction mode has directionality, and the secondary transform candidate may include two transform kernels if the intra prediction mode has no directionality.

Further, as an example (Case 3), two primary transform candidates may be used if the intra prediction mode has directionality, and three primary transform candidates may be used if the intra prediction mode has no directionality. In this instance, a secondary transform candidate may include one transform kernel irrespective of the directionality of the intra prediction mode.

The above description was given focusing on the case of using the plurality of primary transform candidates. The following describes combinations of a primary transform and a secondary transform in case of using a fixed primary transform candidate, by way of example.

Combination D

In a combination D, as illustrated in the following Table 15, a primary transform candidate and a secondary transform kernel may be defined according to an intra prediction mode.

TABLE 15

| | Primary transform | Secondary Transform |
|---|---|---|
| Case 1 | 1 fixed MTS candidate for all modes | 2 transform kernels for angular mode<br>2 transform kernels for non-angular mode |
| Case 2 | 1 fixed MTS candidate for all modes | 1 transform kernels for angular mode<br>2 transform kernels for non-angular mode |
| Case 3 | 1 fixed MTS candidate for all modes | 1 transform kernels for angular mode<br>1 transform kernels for non-angular mode |

Referring to the above Table 15, as an embodiment, one primary transform candidate may be fixedly used irrespective of the intra prediction mode. For example, the fixed primary transform candidate may be at least one combination of DCT2, DST7 and/or DCT8.

As an example (Case 1), one primary transform candidate may be fixedly used irrespective of the intra prediction mode. In this instance, a secondary transform candidate may include two transform kernels irrespective of the directionality of the intra prediction mode. That is, as described above, a plurality of secondary transform kernel sets may be predefined according to the intra prediction mode, and each of the plurality of predefined secondary transform kernel sets may include two transform kernels.

Further, as an example (Case 2), one primary transform candidate may be fixedly used irrespective of the intra prediction mode. In this instance, a secondary transform candidate may include one transform kernel if the intra prediction mode has directionality, and the secondary transform candidate may include two transform kernels if the intra prediction mode has no directionality.

Further, as an example (Case 3), one primary transform candidate may be fixedly used irrespective of the intra prediction mode. In this instance, a secondary transform candidate may include one transform kernel irrespective of the directionality of the intra prediction mode.

Combination E

In a combination E, as illustrated in the following Table 16, a primary transform candidate and a secondary transform kernel may be defined according to an intra prediction mode.

TABLE 16

| | Primary transform (DCT2 applied) | Secondary Transform |
|---|---|---|
| Case 1 | DCT2 is applied | 2 transform kernels for angular mode<br>2 transform kernels for non-angular mode |
| Case 2 | DCT2 is applied | 1 transform kernels for angular mode<br>2 transform kernels for non-angular mode |
| Case 3 | DCT2 is applied | 1 transform kernels for angular mode<br>1 transform kernels for non-angular mode |

Referring to the above Table 16, as long as DCT2 is applied as the primary transform, a secondary transform may be defined. In other words, if MTS is not applied (i.e., if the DCT2 is applied as the primary transform), a secondary transform can be applied. As illustrated in FIG. 10 above, the present disclosure is described by being divided into a case in which the MTS is applied and a case in which the MTS is not applied, but is not limited to such an expression. For example, whether or not the MTS is applied may be the same meaning as whether to use a transform type (or transform kernel) other than a predefined specific transform type (which may be referred to as a basic transform type, a default transform type, etc.). If the MTS is applied, a transform type (e.g., any one transform type or a combined transform type of two or more transform types among a plurality of transform types) other than the basic transform type may be used for transform. Further, if the MTS is not applied, the basic transform type may be used for the transform. In an embodiment, the basic transform type may be configured (or defined) as DCT2.

As an example (Case 1), when the DCT2 is applied to a primary transform, a secondary transform can be applied. In this instance, a secondary transform candidate may include two transform kernels irrespective of the directionality of the intra prediction mode. That is, as described above, a plurality of secondary transform kernel sets may be predefined according to the intra prediction mode, and each of the plurality of predefined secondary transform kernel sets may include two transform kernels.

Further, as an example (Case 2), when the DCT2 is applied to a primary transform, a secondary transform can be applied. In this instance, a secondary transform candidate may include one transform kernel if the intra prediction mode has directionality, and the secondary transform candidate may include two transform kernels if the intra prediction mode has no directionality.

Further, as an example (Case 3), when the DCT2 is applied to a primary transform, a secondary transform can be applied. In this instance, a secondary transform candidate may include one transform kernel irrespective of the directionality of the intra prediction mode.

FIG. 26 is a flow chart illustrating a method for transforming a video signal according to an embodiment to which the present disclosure is applied.

Referring to FIG. 26, the present disclosure is described based on a decoder for the convenience of the explanation, but is not limited thereto. A transform method for a video signal according to an embodiment of the disclosure can be substantially equally applied to even an encoder. The flow chart illustrated in FIG. 26 may be performed by the decoding device 200 or the inverse transform unit 230.

The decoding device 200 parses a first syntax element indicating a primary transform kernel applied to the primary transform of a current block in S2601.

The decoding device 200 determines whether a secondary transform is applicable to the current block based on the first syntax element in S2602.

If the secondary transform is applicable to the current block, the decoding device 200 parses a second syntax element indicating a secondary transform kernel applied to the secondary transform of the current block in S2603.

The decoding device 200 derives a secondary inverse-transformed block, by performing a secondary inverse-transform for a top-left specific region of the current block using the secondary transform kernel indicated by the second syntax element in S2604.

The decoding device 200 derives a residual block of the current block, by performing a primary inverse-transform for the secondary inverse-transformed block using the primary transform kernel indicated by the first syntax element in S2605.

As described above, the step S2602 may be performed by determining that the secondary transform is applicable to the current block if the first syntax element indicates a predefined first transform kernel. In this instance, the first transform kernel may be defined as DCT2.

Further, as described above, the decoding device 200 may determine a secondary transform kernel set used for a secondary transform of the current block among predefined secondary transform kernel sets based on an intra prediction mode of the current block. The second syntax element may indicate a secondary transform kernel applied to the secondary transform of the current block in the determined secondary transform kernel set.

Further, as described above, each of the predefined secondary transform kernel sets may include two transform kernels.

In an embodiment of the present disclosure, an example of a syntax structure in which a multiple transform set (MTS) is used will be described.

For example, the following table 17 shows an example of a syntax structure of a sequence parameter set.

TABLE 17

| seq_parameter_set_rbsp( ) { | Descriptor |
|---|---|
| sps_seq_parameter_set_id | ue(v) |
| chroma_format_idc | ue(v) |
| if( chroma_format_idc = = 3 ) | |
| separate_colour_plane_flag | u(1) |
| pic_width_in_luma_samples | ue(v) |
| pic_height_in_luma_samples | ue(v) |
| bit_depth_luma_minus8 | ue(v) |
| bit_depth_chroma_minus8 | ue(v) |
| qtbtt_dual_tree_intra_flag | ue(v) |
| log2_ctu_size_minus2 | ue(v) |
| log2_min_qt_size_intra_slices_minus2 | ue(v) |
| log2_min_qt_size_inter_slices_minus2 | ue(v) |
| max_mtt_hierarchy_depth_inter_slices | ue(v) |
| max_mtt_hierarchy_depth_intra_slices | ue(v) |
| sps_cclm_enabled_flag | ue(1) |
| sps_mts_intra_enabled_flag | ue(1) |
| sps_mts_inter_enabled_flag | ue(1) |
| rbsp_trailing_bits( ) | |
| } | |

Referring to Table 17, whether the MTS according to an embodiment of the present disclosure can be used may be signaled through a sequence parameter set syntax. Here, sps_mts_intra_enabled_flag indicates presence or absence of an MTS flag or an MTS index in a lower level syntax (e.g., a residual coding syntax or a transform unit syntax) with respect to an intra-coding unit. In addition, sps_mts_inter_enabled_flag indicates presence or absence of an MTS flag or an MTS index in a lower level syntax with respect to an inter-coding unit.

As another example, the following table 18 shows an example of a transform unit syntax structure.

TABLE 18

| transform_unit( x0, y0, tbWidth, tbHeight, treeType ) { | Descriptor |
|---|---|
| if ( treeType = = SINGLE_TREE \|\| treeType = = DUAL_TREE_LUMA ) | |
| tu_cbf_luma[ x0 ][ y0 ] | ae(v) |
| if( treeType = = SINGLE_TREE \|\| treeType = = DUAL_TREE_CHROMA ) { | |
| tu_cbf_cb[ x0 ][ y0 ] | ae(v) |
| tu_cbf_cr[ x0 ][ y0 ] | ae(v) |
| } | |
| if( | |
| ( ( ( CuPredMode[ x0 ][ y0 ] = = MODE_INTRA ) && sps_mts_intra_enabled_flag ) \|\| | |
| ( ( CuPredMode[ x0 ][ y0 ] = = MODE_INTER ) && sps_mts_inter_enabled_flag ) ) | |
| && tu_cbf_luma[ x0 ][ y0 ] && treeType ! = DUAL_TREE_CHROMA | |
| && ( tbWidth <= 32 ) && ( tbHeight <= 32 ) ) | |
| cu_mts_flag[ x0 ][ y0 ] | ae(v) |
| if( tu_cbf_luma[ x0 ][ y0 ] ) | |
| residual_coding( x0, y0, log2( tbWidth ), log2( tbHeight), 0 ) | |
| if( tu_cbf_cb[ x0 ][ y0 ] ) | |
| residual_coding( x0, y0, log2( tbWidth / 2 ), log2( tbHeight / 2 ), 1 ) | |
| if( tu_cbf_cr[ x0 ][ y0 ] ) | |
| residual_coding( x0, y0, log2( tbWidth / 2 ), log2( tbHeight / 2 ), 2 ) | |
| } | |

Referring to Table 18, cu_mts_flag indicates whether MTS is applied to a residual sample of a luma transform block. For example, MTS is not applied to the residual sample of the luma transform block if cu_mts_flag=0, and MTS is applied to the residual sample of the luma transform block if cu_mts_flag=1.

Although a case in which MTS is applied and a case in which MTS is not applied based on the MTS flag are separately described in the present disclosure, as described above, the present disclosure is not limited thereto. For example, whether MTS is applied may mean whether a transform type (or transform kernel) other than a predefined specific transform type (which may be referred to as a basic transform type, a default transform type, or the like) is used. A transform type (e.g., any one of a plurality of transform types or a combination of two or more thereof) other than the default transform type may be used for a transform if MTS is applied, and the default transform type may be used if MTS is not applied. In an embodiment, the default transform type may be set (or defined) as DCT2.

For example, an MTS flag syntax indicating whether MTS is applied to a current transform block, and an MTS flag syntax indicating a transform type applied to the current block when MTS is applied can be individually transmitted from an encoder to a decoder. As another example, a syntax (e.g., MTS index) including both information on whether MTS is applied to the current transform block and a transform type applied to the current block when MTS is applied can be transmitted from the encoder to the decoder. That is, in the latter embodiment, a syntax (or syntax element) indicating a transform type applied to the current transform block (or unit) in a transform type groups (or transform type set) including the aforementioned default transform type can be transmitted from the encoder to the decoder.

Accordingly, the syntax (MTS index) indicating a transform type applied to the current transform block can include information on whether MTS is applied despite the expression. In other words, although only the MTS index can be signaled without the MTS flag in the latter embodiment and thus this case can be interpreted as a case in which MTS includes DCT2, a case in which DCT2 is applied can be described as a case in which MTS is not applied in the present disclosure, but the technical scope with respect to MTS is not limited thereto.

As another example, the following table 19 shows an example of a residual unit syntax structure.

TABLE 19

| residual_coding( x0, y0, log2TbWidth, log2TbHeight, cIdx ) { | Descriptor |
|---|---|
| if( transform_skip_enabled_flag && | |
| ( cIdx ! = 0 \| \| cu_mts_flag[ x0 ][ y0 ] = = 0 ) && | |
| ( log2TbWidth <= 2 ) && ( log2TbHeight <= 2 ) ) | |
| transform_skip_flag[ x0 ][ y0 ][ cIdx ] | ae(v) |
| last_sig_coeff_x_prefix | ae(v) |
| last_sig_coeff_y_prefix | ae(v) |
| if( last_sig_coeff_x_prefix > 3 ) | |
| last_sig_coeff_x_suffix | ae(v) |
| if( last_sig_coeff_y_prefix > 3 ) | |
| last_sig_coeff_y_suffix | ae(v) |
| log2SbSize = ( Min( log2TbWidth, log2TbHeight ) < 2 ? 1 : 2 ) | |
| numSbCoeff = 1 << ( log2SbSize << 1 ) | |
| lastScanPos = numSbCoeff | |
| lastSubBlock = ( 1 << ( log2TbWidth + log2TbHeight − 2 * log2SbSize ) ) − 1 | |
| do { | |
| if( lastScanPos = = 0 ) { | |
| lastScanPos = numSbCoeff | |
| lastSubBlock− − | |
| } | |
| lastScanPos− − | |
| xS = DiagScanOrder[ log2TbWidth − log2SbSize ][ log2TbHeight − log2SbSize ] [ lastSubBlock ][ 0 ] | |
| yS = DiagScanOrder[ log2TbWidth − log2SbSize ][ log2TbHeight − log2SbSize ] [ lastSubBlock ][ 1 ] | |
| xC = ( xS << log2SbSize ) + DiagScanOrder[ log2SbSize ][ log2SbSize ][ lastScanPos ][ 0 ] | |
| yC = ( yS << log2SbSize ) + DiagScanOrder[ log2SbSize ][ log2SbSize ][ lastScanPos ][ 1 ] | |
| } while( ( xC != LastSignificantCoeffX ) \| \| ( yC != LastSignificantCoeffY ) ) | |
| QState = 0 | |
| for( i = lastSubBlock; i >= 0; i− − ) { | |
| startQStateSb = QState | |
| xS = DiagScanOrder[ log2TbWidth − log2SbSize ][ log2TbHeight − log2 SbSize ] [ lastSubBlock ][ 0 ] | |
| yS = DiagScanOrder[ log2TbWidth − log2SbSize ][ log2TbHeight − log2SbSize ] [ lastSubBlock ][ 1 ] | |
| inferSbDcSigCoeffFlag = 0 | |
| if ( i < lastSubBlock ) && ( i > 0 ) ) { | |
| coded_sub_block_flag[ xS ][ yS ] | ae(v) |
| inferSbDcSigCoeffFlag = 1 | |
| } | |
| firstSigScanPosSb = numSbCoeff | |
| lastSigScanPosSb = −1 | |
| for( n = ( i = = lastSubBlock) ? lastScanPos − 1 : numSbCoeff − 1; n >= 0; n− − ) { | |
| xC = ( xS << log2SbSize ) + DiagScanOrder[ log2SbSize ][ log2SbSize ][ n ][ 0 ] | |
| yC = ( yS << log2SbSize ) + DiagScanOrder[ log2SbSize ][ log2SbSize ][ n ][ 1 ] | |
| if( coded_sub_block_flag[ xS ][ yS ] && ( n > 0 \| \| !inferSbDcSigCoeffFlag ) ) { | |
| sig_coeff_flag[ xC ][ yC ] | ae(v) |
| } | |
| if( sig_coeff_flag[ xC ][ yC ] ) { | |
| par_level_flag[ n ] | ae(v) |
| rem_abs_gt1_flag[ n ] | ae(v) |
| if( lastSigScanPosSb = = −1 ) | |
| lastSigScanPosSb = n | |
| firstSigScanPosSb = n | |
| } | |
| AbsLevelPass1[ xC ][ yC ] = sig_coeff_flag[ xC ][ yC ] + par_level_flag[ n ] + 2 * rem_abs_gt1_flag[ n ] | |
| if( dep_quant_enabled_flag ) | |

TABLE 19-continued

| residual_coding( x0, y0, log2TbWidth, log2TbHeight, cIdx ) { | Descriptor |
|---|---|
| QState = QStateTransTable[ QState ][ par_level_flag[ n ] ] | |
| } | |
| for( n = numSbCoeff − 1; n >= 0; n− − ) { | |
| if( rem_abs_gt1_flag[ n ] ) | |
| rem_abs_gt2_flag[ n ] | ae(v) |
| } | |
| for( n = numSbCoeff − 1; n >= 0; n− − ) { | |
| xC = ( xS << log2SbSize ) + DiagScanOrder[ log2SbSize ][ log2SbSize ][ n ][ 0 ] | |
| yC = ( yS << log2SbSize ) + DiagScanOrder[ log2SbSize ][ log2SbSize ][ n ][ 1 ] | |
| if( rem_abs_gt2_flag[ n ] ) | |
| abs_remainder[ n ] | |
| AbsLevel[ xC ][ yC ] = AbsLevelPass1[ xC ][ yC ] + 2 * ( rem_abs_gt2_flag[ n ] + abs_remainder[ n ] ) | |
| } | |
| if( dep_quant_enabled_flag \| \| !sign_data_hiding_enabled_flag ) | |
| signHidden = 0 | |
| else | |
| signHidden = ( lastSigScanPosSb − firstSigScanPosSb > 3 ? 1 : 0 ) | |
| for( n = numSbCoeff − 1; n >= 0; n− − ) { | |
| xC = ( xS << log2SbSize ) + DiagScanOrder[ log2SbSize ][ log2SbSize ][ n ][ 0 ] | |
| yC = ( yS << log2SbSize ) + DiagScanOrder[ log2SbSize ][ log2SbSize ][ n ][ 1 ] | |
| if( sig_coeff_flag )[ xC ][ yC ] && | |
| ( !signHidden \| \| ( n != firstSigScanPosSb ) ) ) | |
| coeff_sign_flag[ n ] | ae(v) |
| } | |
| if( dep_quant_enabled_flag ) { | |
| QState = startQStateSb | |
| for( n = numSbCoeff − 1; n >= 0; n− − ) { | |
| xC = ( xS << log2SbSize ) + | |
| DiagScanOrder[ log2SbSize ][ log2SbSize ][ n ][ 0 ] | |
| yC = ( yS << log2SbSize ) + | |
| DiagScanOrder[ log2SbSize ][ log2SbSize ][ n ][ 1 ] | |
| if( sig_coeff_flag[ xC ][ yC ] ) | |
| TransCoeffLevel[ x0 ][ y0 ][ cIdx ][ xC ][ yC ] = | |
| ( 2 * AbsLevel[ xC ][ yC ] − ( QState > 1 ? 1 : 0 ) ) * | |
| ( 1 − 2 * coeff_sign _flag[ n ] ) | |
| QState = QStateTransTable[ QState ][ par_level_flag[ n ] ] | |
| } else { | |
| sumAbsLevel = 0 | |
| for( n = numSbCoeff − 1; n >= 0; n− − ) { | |
| xC = ( xS << log2SbSize ) + | |
| DiagScanOrder[ log2SbSize ][ log2SbSize ][ n ][ 0 ] | |
| yC = ( yS << log2SbSize ) + | |
| DiagScanOrder[ log2SbSize ][ log2SbSize ][ n ][ 1 ] | |
| if( sig_coeff_flag[ xC ][ yC ] ) { | |
| TransCoeffLevel[ x0 ][ y0 ][ cIdx ][ xC ][ yC ] = | |
| AbsLevel[ xC ][ yC ] * ( 1 − 2 * coeff_sign_flag[ n ] ) | |
| if( signHidden ) { | |
| sumAbsLevel += AbsLevel[ xC ][ yC ] | |
| if( ( n = = firstSigScanPosSb ) && ( sumAbsLevel % 2 ) = = 1 ) ) | |
| TransCoeffLevel[ x0 ][ y0 ][ cIdx ][ xC ][ yC ] = −TransCoeffLevels[ x0 ][ y0 ][ cIdx ][ xC ][ yC ] | |
| } | |
| } | |
| } | |
| } | |
| } | |
| if( cu_mts_flag[ x0 ][ y0 ] && ( cIdx = = 0 ) && | |
| !transform_skip_flag[ x0 ][ y0 ][ cIdx ] && | |
| ( ( CuPredMode[ x0 ][ y0 ] = = MODE_INTRA && numSigCoeff > 2 ) \| \| | |
| ( CuPredMode[ x0 ][ y0 ] = = MODE_INTER ) ) ) { | |
| mts_idx[ x0 ][ y0 ] | ae(v) |
| } | |

Referring to Table 19, transform_skip_flag and/or mts_idx syntax (or syntax element) can be signaled through a residual syntax. However, this is merely an example and the present disclosure is not limited thereto. For example, transform_skip_flag and/or mts_idx syntax may be signaled through a transform unit syntax.

Hereinafter, a method for improving complexity by applying primary transform only to a predefined region is proposed. When combinations of various transforms (or transform kernels) such as MTS (e.g., DCT2, DST7, DCT8, DST1, DCT5, etc.) are selectively applied to primary transform, complexity may increase. Particularly, various transforms need to be considered as a coding block (or transform block) size increases, which may considerably increase complexity.

Accordingly, in an embodiment of the present disclosure, a method for performing a transform only on a predefined region according to specific conditions instead of performing the transform on (or applying to) all regions in order to reduce complexity is proposed.

As an embodiment, an encoder may obtain an R×R transform block instead of an M×M transform block by applying forward primary transform to an M×M pixel block based on the reduced transform (RT) method described above with respect to FIGS. 16A and 16B to 24. For example, an R×R region may be a top-left R×R region in a current block (coding block or transform block). A decoder may obtain an M×M pixel block or transform block by performing inverse primary transform only on an R×R (M≥R) region.

Consequently, non-zero coefficients may be present only in the R×R region. In this case, the decoder can zero-out coefficients present in regions other than the R×R region without performing calculation therefor. The encoder can perform forward transform such that only the R×R region remains (such that non-zero coefficients are present only in the R×R region).

Further, the decoder may apply primary transform (i.e., reverse transform) only to a predefined region determined according to the size of a coding block (or transform block) and/or transform (or transform kernel) type. The following table 20 shows Reduced Adaptive Multiple Transform (RAMT) using a predefined R value (which may be referred to as a reduced factor, a reduced transform factor, or the like) depending on the size of a transform (or the size of a transform block). In the present disclosure, Reduced Adaptive Multiple Transform (RAMT) representing reduced transform adaptively determined depending on a block size may be referred to as Reduced MTS (Multiple Transform Selection), Reduced explicit multiple transform, Reduced primary transform, and the like.

TABLE 20

| Transform size | Reduced transform 1 | Reduced transform 2 | Reduced transform 3 |
|---|---|---|---|
| 8 × 8 | 4 × 4 | 6 × 6 | 6 × 6 |
| 16 × 16 | 8 × 8 | 12 × 12 | 8 × 8 |
| 32 × 32 | 16 × 16 | 16 × 16 | 16 × 16 |
| 64 × 64 | 32 × 32 | 16 × 16 | 16 × 16 |
| 128 × 128 | 32 × 32 | 16 × 16 | 16 × 16 |

Referring to Table 20, at least one reduced transform can be defined depending on a transform size (or transform block size). In an embodiment, which reduced transform among reduced transforms shown in Table 20 will be used may be determined according to a transform (or transform kernel) applied to a current block (coding block or transform block). Although a case in which three reduced transforms are used is assumed in Table 20, the present disclosure is not limited thereto and one or more various reduced transforms may be predefined depending on transform sizes.

Further, in an embodiment of the present disclosure, a reduced transform factor (R) may be determined depending on primary transform in application of the aforementioned reduced adaptive multiple transform. For example, when the primary transform is DCT2, coding performance deterioration can be minimized by not using reduced transform for a small block or by using a relatively large R value because the computational complexity of DCT2 is lower than those of other primary transforms (e.g., a combination of DST7 and/or DCT8). The following table 21 shows Reduced Adaptive Multiple Transform (RAMT) using a predefined R value depending on a transform size (or transform block size) and a transform kernel.

TABLE 21

| Transform size | Reduced transform for DCT2 | Reduced transform except DCT2 |
|---|---|---|
| 8 × 8 | 8 × 8 | 4 × 4 |
| 16 × 16 | 16 × 16 | 8 × 8 |
| 32 × 32 | 32 × 32 | 16 × 16 |
| 64 × 64 | 32 × 32 | 32 × 32 |
| 128 × 128 | 32 × 32 | 32 × 32 |

Referring to Table 21, in a case in which a transform applied as primary transform is DCT2 and a case in which the transform applied as primary transform is a transform except DCT2 (e.g., a combination of DST7 and/or DCT8), different reduced transform factors can be used.

FIG. 27 is a diagram illustrating a method for encoding a video signal using reduced transform as an embodiment to which the present disclosure is applied.

Referring to FIG. 27, an encoder determines whether to apply a transform to a current block (S2701). The encoder may encode a transform skip flag according to a determination result. In this case, the step of encoding the transform skip flag may be included in step S2701.

When the transform is applied to the current block, the encoder determines a transform kernel applied to primary transform of the current block (S2702). The encoder may encode a transform index indicating the determined transform kernel. In this case, the step of encoding the transform index may be included in step S2702.

The encoder determines a region in which a significant coefficient is present within the current block based on the transform kernel applied to the primary transform of the current block and the size of the current block (S2703).

As an embodiment, the encoder may determine a region having a width and/or a height corresponding to a predefined size as the region in which the significant coefficient is present when the transform kernel indicated by the transform index are a predefined transform and the width and/or the height of the current block are greater than the predefined size.

For example, the predefined transform may be one of a plurality of transform combinations of DST7 and/or DCT8, and the predefined size may be 16. Alternatively, the predefined transform may be a transform except DCT2. As an example, the encoder may determine a region having a width and/or a height of 32 as the region to which the primary transform is applied when the transform kernel indicated by the transform index is DCT2 and the width and/or the height of the current block are greater than 32.

Further, as an embodiment, the encoder may determine a smaller value between the width of the current block and a first threshold value as the width of the region to which the primary transform is applied and determine a smaller value between the height of the current block and the first threshold value as the height of the region in which the significant coefficient is present when the transform kernel indicated by the transform index belongs to a first transform group. For example, the first threshold value may be 32, but the present disclosure is not limited thereto and the first threshold value may be 4, 8, or 16 as shown in Table 20 or Table 21.

In addition, the encoder may determine a smaller value between the width of the current block and a second threshold value as the width of the region to which the primary transform is applied and determine a smaller value between the height of the current block and the second threshold value as the height of the region in which the significant coefficient is present when the transform kernel indicated by the transform index belongs to a second transform group. For example, the second threshold value may be 16, but the present disclosure is not limited thereto and the second threshold value may be 4, 6, 8, 12, or 32 as shown in Table 20 or Table 21.

As an embodiment, the first transform group may include DCT2 and the second transform group may include a plurality of transform combinations of DST7 and/or DCT8.

The encoder performs forward primary transform using the transform kernel applied to the primary transform of the current block (S2704). The encoder can obtain primarily transformed transform coefficients in the region in which the significant coefficient is present by performing the forward primary transform. As an embodiment, the encoder may apply secondary transform to the primarily transformed transform coefficients. In this case, the methods described above with reference to FIG. 6 to FIG. 26 can be applied.

FIG. 28 is a diagram illustrating a method for decoding a video signal using reduced transform as an embodiment to which the present disclosure is applied.

A decoder checks whether transform skip is applied to a current block (S2801).

When transform skip is not applied to the current block, the decoder obtains a transform index indicating a transform kernel applied to the current block from a video signal (S2802).

The decoder determines a region in which primary transform (i.e., primary inverse transform) is applied to the current block based on the transform kernel indicated by the transform index and the size (i.e., the width and/or the height) of the current block (S2803).

As an embodiment, the decoder may set coefficients of the remaining region except the region to which the primary transform is applied as 0.

In addition, as an embodiment, when the transform kernel indicated by the transform index is a predefined transform and the width and/or the height of the current block are greater than a predefined size, the decoder may determine a region having a width and/or a height corresponding to the predefined size as the region to which the primary transform is applied.

For example, the predefined transform may be any one of a plurality of transform combinations of DST7 and/or DCT8, and the predefined size may be 16. Alternatively, the predefined transform may be a transform except DCT2. For example, when the transform kernel indicated by the transform index is DCT and the width and/or the height of the current block are greater than 32, the decoder may determine a region having a width and/or a height of 32 as the region to which the primary transform is applied.

Furthermore, as an embodiment, the decoder may determine a smaller value between the width of the current block and a first threshold value as the width of the region to which the primary transform is applied and determine a smaller value between the height of the current block and the first threshold value as the height of the region to which the primary transform is applied when the transform kernel indicated by the transform index belongs to a first transform group. For example, the first threshold value may be 32, but the present disclosure is not limited thereto and the first threshold value may be 4, 8, or 16 as shown in Table 20 or Table 21.

In addition, the decoder may determine a smaller value between the width of the current block and a second threshold value as the width of the region to which the primary transform is applied and determine a smaller value between the height of the current block and the second threshold value as the height of the region to which the primary transform is applied is present when the transform kernel indicated by the transform index belongs to a second transform group. For example, the second threshold value may be 16, but the present disclosure is not limited thereto and the second threshold value may be 4, 6, 8, 12, or 32 as shown in Table 20 or Table 21.

As an embodiment, the first transform group may include DCT2 and the second transform group may include a plurality of transform combinations of DST7 and/or DCT8.

The decoder performs inverse primary transform on the region to which the primary transform is applied using the transform kernel indicated by the transform index (S2804). The decoder can obtain primarily inversely transformed transform coefficients by performing the inverse primary transform. As an embodiment, the decoder may apply secondary transform to inversely quantized transform coefficients prior to the primary transform. In this case, the methods described above with reference to FIG. 6 to FIG. 26 may be applied.

According to the embodiments of the present disclosure, it is possible to considerably reduce worst case complexity by performing a transform only on a predefined region according to specific conditions.

In addition, in an embodiment of the present disclosure, when the MTS (EMT or AMT) flag is 0 (i.e., when DCT-2 transform is applied in both the horizontal (lateral) direction and the vertical (longitudinal) direction), the encoder/decoder can perform zero-out for high frequency components (i.e., derive or set the high frequency components as 0) except 32 top-left coefficients in the horizontal and vertical directions. Although the present embodiment is referred to as a first embodiment for convenience of description in embodiments which will be described later, embodiments of the present disclosure are not limited thereto.

For example, in the case of a 64×64 TU (or CU), the encoder/decoder can keep transform coefficients only for a top-left 32×32 region and perform zero-out for coefficients of the remaining region. Further, in the case of a 64×16 TU, the encoder/decoder can keep transform coefficients only for a top-left 32×16 region and perform zero-out for coefficients of the remaining region. In addition, in the case of an 8×64 TU, the encoder/decoder can keep transform coefficients only for a top-left 8×32 region and perform zero-out for coefficients of the remaining region. That is, transform coefficients can be set such that transform coefficients are present only for a maximum length of 32 in both the horizontal and vertical directions, which can improve transform efficiency.

As an embodiment, such a zero-out method may be applied to only a residual signal to which intra-prediction is applied, applied to only a residual signal to which inter-prediction is applied, or applied to both a residual signal to which intra-prediction is applied and a residual signal to which inter-prediction is applied.

In addition, in an embodiment of the present disclosure, when the MTS flag is 1 (i.e., when a transform (e.g., DST-7 or DCT-8) other than DCT-2 transform is applied in the horizontal direction and the vertical direction), the encoder/decoder can perform zero-out for high frequency components (i.e., derive or set the high frequency components as 0) except coefficients of a specific top-left region. Although the present embodiment is referred to as a second embodiment for convenience of description in embodiments which will be described later, embodiments of the present disclosure are not limited thereto.

As an embodiment, the encoder/decoder may keep only a transform coefficient region corresponding to a part of the top-left region as in the following examples. That is, the encoder/decoder can preset the length (or number) of transform coefficients in the horizontal and/or vertical directions to which primary transform is applied depending on a width and/or a height. For example, coefficients out of the length to which primary transform is applied can be zero-out.

When the width (w) is equal to or greater than $2^n$, transform coefficients only for a length of $w/2^p$ from the left side may be kept and transform coefficients of the remaining region may be fixed (or set) to 0 (zero-out).

When the height (h) is equal to or greater than $2^m$, transform coefficients only for a length of $h/2^q$ from the top may be kept and transform coefficients of the remaining region may be fixed to 0.

For example, the values m, n, p, and q may be predefined as various values. For example, the values m, n, p, and q may be set to integer values equal to or greater than 0. Alternatively, they may be set as in the following examples.

1) (m, n, p, q)=(5, 5, 1, 1)

2) (m, n, p, q)=(4, 4, 1, 1)

When the configuration of 1) is predefined, for example, transform coefficients may be kept only for a top-left 16×16 region with respect to a 32×16 TU, and transform coefficients may be kept only for a top-left 8×16 region with respect to an 8×32 TU.

As an embodiment, such a zero-out method may be applied to only a residual signal to which intra-prediction is applied, applied to only a residual signal to which inter-prediction is applied, or applied to both a residual signal to which intra-prediction is applied and a residual signal to which inter-prediction is applied.

In another embodiment of the present disclosure, when the MTS flag is 1 (i.e., when a transform (e.g., DST-7 or DCT-8) other than DCT-2 transform is applicable in the horizontal direction and the vertical direction), the encoder/decoder can perform zero-out for high frequency components (i.e., derive or set the high frequency components as 0) except coefficients of a specific top-left region. More specifically, the encoder can keep the coefficients of the specific top-left region and perform zero-out for the remaining high frequency components, and the decoder can recognize the zero-out region in advance and perform decoding using the coefficients of the non-zero-out region. However, embodiments of the present disclosure are not limited thereto, and the zero-out process from the viewpoint of the decoder can be understood as a process of deriving (recognizing or setting) the zero-out region as 0. Although the present embodiment is referred to as a third embodiment for convenience of description in embodiments which will be described later, embodiments of the present disclosure are not limited thereto.

As an embodiment, the encoder/decoder may keep only a transform coefficient region corresponding to a part of the top-left region as in the following examples. That is, the encoder/decoder can preset the length (or number) of transform coefficients in the horizontal and/or vertical directions to which primary transform is applied depending on a width and/or a height. For example, coefficients out of the length to which primary transform is applied can be zero-out.

When the height (h) is equal to or greater than the width (w) and equal to or greater than $2^n$, transform coefficients of only a top-left region $w \times (h/2^p)$ may be kept and transform coefficients of the remaining region may be fixed (or set) to 0 (zero-out).

When the width (w) is greater than the height (h) and equal to or greater than $2^m$, transform coefficients of only a top-left region $(w/2^q) \times h$ may be kept and transform coefficients of the remaining region may be fixed to 0.

Although the length in the vertical direction is reduced ($h/2^p$) when the height (h) equals the width (w) in the above-described example, the length in the horizontal direction may be reduced ($w/2^q$).

For example, the values m, n, p, and q may be predefined as various values. For example, the values m, n, p, and q may be set to integer values equal to or greater than 0. Alternatively, they may be set as in the following examples.

1) (m, n, p, q)=(4, 4, 1, 1)

2) (m, n, p, q)=(5, 5, 1, 1)

When the configuration of 1) is predefined, for example, transform coefficients may be kept only for a top-left 16×16 region with respect to a 32×16 TU, and transform coefficients may be kept only for a top-left 8×8 region with respect to an 8×16 TU.

As an embodiment, such a zero-out method may be applied to only a residual signal to which intra-prediction is applied, applied to only a residual signal to which inter-prediction is applied, or applied to both a residual signal to which intra-prediction is applied and a residual signal to which inter-prediction is applied.

The first embodiment pertaining to a method of limiting a transform coefficient region when the MTS flag is 0, and the second and third embodiments pertaining to a method of limiting a transform coefficient region when the MTS flag is 1 may be individually applied or may be applied in a combined manner.

As an embodiment, configurations combined as follows may be applied.

1) First embodiment+second embodiment

2) First embodiment+third embodiment

As mentioned in the second and third embodiments, the zero-out method may be applied to only a residual signal to which intra-prediction is applied, applied to only a residual signal to which inter-prediction is applied, or applied to both a residual signal to which intra-prediction is applied and a residual signal to which inter-prediction is applied as an embodiment. Accordingly, configurations combined as follows may be applied to a case in which the MTS flag is 1. Here, the first embodiment may be applied to a case in which the MTS flag is 0.

TABLE 22

| Config. index | Intra-prediction residual signal | Inter-prediction residual signal |
|---|---|---|
| 1 | Zero-out is not applied | Zero-out is not applied |
| 2 | Zero-out is not applied | First embodiment |
| 3 | Zero-out is not applied | Second embodiment |
| 4 | First embodiment | Zero-out is not applied |
| 5 | First embodiment | First embodiment |
| 6 | First embodiment | Second embodiment |
| 7 | Second embodiment | Zero-out is not applied |
| 8 | Second embodiment | First embodiment |
| 9 | Second embodiment | Second embodiment |

In an embodiment of the present disclosure, the encoder/decoder may not perform residual coding for a region regarded as a region having transform coefficients of 0 according to zero-out. That is, the encoder/decoder can be defined such that they perform residual coding only for regions other than zero-out regions.

In the above-described first, second and third embodiments, a region (or coefficient) that needs to have a value of 0 is obviously determined. That is, regions other than the top-left region in which presence of transform coefficients is permitted are zero-out. Accordingly, in an entropy coding (or residual coding) process, the encoder/decoder may be configured to bypass a region guaranteed to have a value of 0 without performing residual coding thereon.

In an embodiment, the encoder/decoder may code a flag (referred to as subblock_flag) (or a syntax, or a syntax element) indicating presence or absence of a non-zero transform coefficient in a coefficient group (CG). Here, the CG is a subblock of a TU and may be set to a 4×4 or 2×2 block according to the shape of the TU block and/or whether the TU is a chroma/luma component.

Here, the encoder/decoder can scan the CG to code coefficient values (or coefficient level values) only in a case where the subblock_flag is 1. Accordingly, the encoder/decoder may configure CGs belonging to a zero-out region such that they have a value of 0 by default without performing subblock_flag coding thereon.

In addition, in an embodiment, the encoder may code a position of a last coefficient (or a syntax or a syntax element indicating a position of a last significant coefficient) in forward scanning order first. For example, the encoder may code last_coefficient_position_x that is a position in the horizontal direction and last_coefficient_position_y that is a position in the vertical direction.

Although maximum values of available values of last_coefficient_position_x and last_coefficient_position_y may be determined as (width −1) and (height −1) of a TU, when a region in which non-zero coefficients can be present is limited according to zero-out, the available values of last_coefficient_position_x and maximum values of last_coefficient_position_y may also be limited.

Accordingly, the encoder/decoder may limit the maximum values of available values of last_coefficient_position_x and last_coefficient_position_y in consideration of zero-out and then code them. For example, when a binarization method applied to last_coefficient_position_x and last_coefficient_position_y is a truncated unary (or truncated Rice (TR), or truncated binary (TB)) binarization method, the encoder/decoder can control (reduce) a maximum length of truncated unary code such that it corresponds to adjusted maximum values (i.e., available maximum values of last_coefficient_position_x and last_coefficient_position_y).

Although some of the above-described embodiments of the present disclosure have been classified for convenience of description, the present disclosure is not limited thereto. That is, the above-described embodiments may be independently performed or one or more embodiments may be performed in a combined manner.

FIG. 29 is a flowchart illustrating a method for decoding a video signal based on reduced transform according to an embodiment of the present disclosure.

Referring to FIG. 29, although description is based on the decoder for convenience, the present disclosure is not limited thereto and a method for converting a video signal according to the present embodiment can be substantially equally applied to the encoder. The flowchart of FIG. 29 can be performed by the decoding apparatus 200 or the inverse transform unit 230.

The decoder obtains a transform index indicating transform kernels applied to a current block in the horizontal and vertical direction from the video signal (S2901).

The decoder determines a region in which a transform (i.e., inverse transform) is applied to the current block based on the transform kernels indicated by the transform index and the size of the current block (S2902).

The decoder sets, as 0, coefficients of the remaining region other than the region to which the transform is applied within the current block (S2903).

The decoder performs an inverse transform on the region to which the transform is applied using the transform kernels indicated by the transform index (S2904).

As described above, in determination of the region to which the transform is applied, when the transform kernels indicated by the transform index are a predefined transform, and the width and/or the height of the current block are greater than a predefined size, a region having a width and/or a height corresponding to the predefined size may be determined as the region to which the transform is applied.

As described above, the predefined transform may be any one of a plurality of transform combinations of DST7 and/or DCT8.

As described above, the predefined size may be 16.

As described above, in determination of the region to which the transform is applied, a smaller value between the width of the current block and 32 may be determined as the width of the region to which the transform is applied and a smaller value between the height of the current block and 32 may be determined as the height of the region to which the transform is applied when the transform kernels indicated by the transform index belong to a first transform group, and a smaller value between the width of the current block and 16 may be determined as the width of the region to which the transform is applied and a smaller value between the height of the current block and 16 may be determined as the height of the region to which the transform is applied when the transform kernels indicated by the transform index belong to a second transform group. As an embodiment, the first transform group may include DCT2, and the second transform group may include a plurality of transform combinations of DST7 and/or DCT8.

As described above, the method may further include a step of obtaining a syntax element indicating a position of a last significant coefficient in scanning order within the current block, and coefficients to which the inverse transform is applied may be obtained from the video signal based on the position of the last significant coefficient.

As described above, the syntax element may be binarized according to a truncated unary method, and a maximum value of the syntax element may be determined based on the region set as 0.

FIG. 30 is a flowchart illustrating a method for decoding a video signal according to an embodiment of the present disclosure.

Referring to FIG. 30, although description will be based on a decoder for convenience, the present disclosure is not limited thereto and a method for converting a video signal according to the present embodiment can be substantially equally applied to an encoder. The flowchart of FIG. 30 can be executed by the decoding apparatus 200 or the inverse transform unit 230.

The decoder checks whether a transform skip is applied to a current block (S3001).

When the transform skip is not applied to the current block, the decoder obtains a transform index indicating a transform type set applied to the current block from the video signal (S3002). Here, the transform type set may include transform types applied to the current block in the horizontal and vertical directions.

The decoder checks whether the transform type set includes DCT2 (S3003).

The decoder determines a region to which a primary transform is applied based on a checking result (S3004).

The decoder performs inverse transform on the region to which the primary transform is applied in the horizontal and vertical directions using the transform types included in the transform type set (S3005).

As described above, the decoder may derive coefficients of a region other than the region to which the primary transform is applied as 0 within the current block.

As described above, when the transform type set includes DCT2, the width of the region to which the primary transform is applied may be determined as a smaller value between the width of the current block and 32 and the height of the region to which the primary transform is applied may be determined as a smaller value between the height of the current block and 32.

As described above, when the transform type set is any one of a plurality of transform type sets including combinations of DST7 and/or DCT8, the width of the region to which the primary transform is applied may be determined as a smaller value between the width of the current block and 16 and the height of the region to which the primary transform is applied may be determined as a smaller value between the height of the current block and 16.

As described above, the decoder may obtain a syntax element indicating a position of a last significant coefficient in scan order within the current block, and coefficients to which the inverse transform is applied may be obtained from the video signal based on the position of the last significant coefficient.

As described above, the syntax element may be binarized according to a truncated unary method, and a maximum length of code for the syntax element may be determined based on the region derived as 0.

FIG. 31 is an exemplary block diagram of an apparatus for processing a video signal as an embodiment to which the present disclosure is applied. The video signal processing apparatus of FIG. 31 may correspond to an encoding apparatus of FIG. 1 or the decoding apparatus of FIG. 2.

A video processing apparatus 3100 for processing video signals includes a memory 3120 for storing video signals and a processor 3110 that is connected to the memory and processes video signals.

The processor 3110 according to an embodiment of the present disclosure may be configured as at least one processing circuit for video signal processing and can process video signals by executing commands for video signal encoding or decoding. That is, the processor 3110 can encode original video data or decode encoded video signals by executing the above-described encoding or decoding methods. Further, the processor 1220 may encode original video data or decode encoded video signals by applying embodiments pertaining to DST7/DCT8 based on discrete Fourier transform (DFT) which will be described later.

Hereinafter, a method for designing DST7/DCT8 used for transform/inverse transform described with reference to FIG. 6 to FIG. 31 based on discrete Fourier transform (DFT) will be described.

FIG. 32 is a flowchart illustrating a design of forward DST7 with a length of 16 using discrete Fourier transform (DFT) as an embodiment to which the present disclosure is applied.

The present disclosure provides specific embodiments of designing DST7 using DFT. The embodiments of the present disclosure can be used for DCT8 design and applied to MTS configuration.

Signals (information) transmitted between blocks shown in the flowchart of FIG. 32 may be scalar values or may have a vector form. For example, a vector may be represented as x[0 . . . . N−1] which indicates a signal (information) composed of N elements, such as x[0 . . . . N−1]=[x[0] x[1] . . . x[N−2] x[N−1]. A partial signal of the vector x[0 . . . . N−1] may be represented as x[i . . . j]. For example, a partial signal of x[0 . . . 15] may be represented as x[5 . . . 10]=[x[5] x[6] x[7] x[8] x[9] x[10]].

FIG. 32 shows a flowchart for realizing DST7 for one row or column having a length of 16. Here, DST7 with a length of 16 is represented as DST7_B16, forward DST7 is represented as DST7_B16, and inverse DST7 is represented as inverse DST7_B16.

Furthermore, input data may be represented as x[0 . . . 15] and final output data may be represented as y[0 . . . 15].

An encoder performs pre-processing on forward DST7 with a length of 16 when the input data x[0 . . . 15] is input thereto (S3210).

The encoder may apply DFT to the output (w[0 . . . 15]) of step S3210 (S3220). Here, step S3220 in which DFT is applied will be described in detail later with reference to FIGS. 34 to 36.

The encoder may perform post-processing on the output (z[0 . . . 15]) of step S3220 and output final output data y[0 . . . 15] (S3230).

FIG. 33 is a flowchart illustrating a design of inverse DST7 with a length of 16 using discrete Fourier transform (DFT) as an embodiment to which the present disclosure is applied.

FIG. 33 shows a flowchart for realizing inverse DST7 for one row or column having a length of 16. Here, input data may be represented as x[0 . . . 15] and final output data may be represented as y[0 . . . 15].

A decoder performs pre-processing on inverse DST7 with a length of 16 when the input data x[0 . . . 15] is input thereto (S3310).

The decoder may apply DFT to the output of step S3310 (S3320). Here, step S3320 in which DFT is applied will be described in detail later with reference to FIGS. 34 to 36.

The decoder may perform post-processing on the output of step S3320 and output final output data y[0 . . . 15] (S3330).

FIGS. 34 to 36 are flowcharts illustrating application of the function xDST7_FFT_B16 of FIGS. 32 and 33 as embodiments to which the present disclosure is applied.

Referring to FIG. 34, src[0 . . . 15] is input to an xDST7_FFT3 block and src_FFT11[0 . . . 15] is output therefrom (S3410). The output src_FFT11[0 . . . 15] may be divided into two partial signals and transmitted.

For example, src_FFT11[0 . . . 4] may be transmitted to an xDST7_FFT11_type 1 block and src_FFT11[5 . . . 15] may be transmitted to an xDST7_FFT11_type2 block.

The xDST7_FFT11_type1 block receives src_FFT 11[0 . . . 4] and outputs dst[0 . . . 4] (S3420).

The xDST7_FFT11_type2 block receives src_FFT 11[5 . . . 15] and outputs dst[5 . . . 15] (S3430).

Here, implementation of the xDST7_FFT11_type1 block is described in detail in FIG. 35, and implementation of the xDST7_FFT11_type2 block is described in detail in FIG. 36.

Referring to FIG. 35, src[0 . . . 4] is input to an xDST7_FFT11_half1 block and dst_half1[0 . . . 4] is output therefrom (S3510).

The output dst_half1[0 . . . 4] is input to an xDST7_FFT11_type1 block and dst[0 . . . 4] is output therefrom (S3520).

Referring to FIG. 36, src[0 . . . 10] may be divided into two partial signals and transmitted. For example, src[0 . . . 4] may be transmitted to an xDST7_FFT11_half1 block and src[5 . . . 10] may be transmitted to an xDST7_FFT11_half2 block.

The xDST7_FFT11_half1 block receives src[0 . . . 4] and outputs dst_half1[0 . . . 4] (S3610).

The xDST7_FFT11_half2 block receives src[5 . . . 10] and outputs dst_half2[0 . . . 5] (S3620).

The encoder/decoder may perform post-processing on the output of step S3620 through an xDST7_FFT11_type2_Post_Processing block and output final output data dst[0 . . . 10] (S3630).

src_FFT11[5 . . . 15] of FIG. 34 corresponds to src[0 . . . 10] of FIG. 36. That is, allocation is performed in such a manner that src[0]=src_FFT11[5], src[1]=src_FFT11[6], . . . , and src[10]=src_FFT11[15].

In addition, dst_half1[0 . . . 4] and dst_half2[0 . . . 5] are sequentially input to the xDST7_FFT11_type2_Post_Processing block in FIG. 36 and they respectively correspond to input parameters src_half1[0 . . . 4] and src_half2[0 . . . 5]. This will be described in detail with reference to the following tables showing operation of each block.

In this manner, the block diagrams of FIGS. 32 and 33 may be interpreted in connection with the block diagrams of FIGS. 34 to 36.

Detailed operations of the functions of FIGS. 32 to 36 can be described using the following tables 23 to 31.

TABLE 23

| | |
|---|---|
| Name | Forward_DST7_Pre_Processing_B16 |
| Input | src[0 . . . 15] |
| Output | dst[0 . . . 15] |
| Operation | dst[0] = src[10]; dst[1] = src[8]; dst[2] = src[1]; dst[3] = −src[12]; |
| | dst[4] = −src[14]; dst[5] = src[6]; dst[6] = src[3]; dst[7] = src[5]; |
| | dst[8] = −src[15]; dst[9] = src[4]; dst[10] = src[2]; dst[11] = src[7]; |
| | dst[12] = −src[13]; dst[13] = −src[11]; dst[14] = src[0]; dst[15] = src[9]; |

TABLE 24

| | |
|---|---|
| Name | Forward_DST7_Post_Processing_B16 |
| Input | src[0 . . . 15] |
| Output | dst[0 . . . 15] |
| Operation | int aiReordIdx[16] = { 12, 0, 14, 10, 2, 5, 8, 4, 7, 6, 3, 9, 15, 1, 11, 13 }; |
| | for (int i = 0; i < 16; i++) |
| | dst[i] = (int)((src[aiReordIdx[i]] + rnd_factor) >> final_shift); |

In Table 24, a value of rnd_factor=1<<(final_shift−1) can be used. In addition, when a function of applying DST7 to all rows or columns of one block is used in FIGS. 32 and 33, a value of final_shift=shift−1 can be used if a value "shift" is transmitted through a parameter.

TABLE 25

| | |
|---|---|
| Name | Inverse_DST7_Pre_Processing_B16 |
| Input | src[0 . . . 15] |
| Output | dst[0 . . . 15] |
| Operation | dst[0] = src[5]; dst[1] = src[4]; dst[2] = src[15]; dst[3] = −src[6]; |
| | dst[4] = −src[7]; dst[5] = src[3]; dst[6] = src[14]; dst[7] = src[13]; |
| | dst[8] = −src[8]; dst[9] = src[2]; dst[10] = src[1]; dst[11] = src[12]; |
| | dst[12] = −src[9]; dst[13] = −src[10]; dst[14] = src[0]; dst[15] = src[11]; |

TABLE 26

| Name | Inverse_DST7_Post_Processing_B16 |
|---|---|
| Input | src[0 . . . 15] |
| Output | dst[0 . . . 15] |
| Operation | int aiReordIdx[16] = { 12, 13, 0, 11, 14, 1, 10, 15, 2, 9, 5, 3, 8, 6, 4, 7 };<br>for (int i = 0; i < 16; i++)<br>dst[i] = Clip3(outputMinimum, outputMaximum, (int)((src[aiReordIdx[i]] + rnd_factor) >> final_shift)); |

In Table 26, a value of rnd_factor=1<<(final_shift−1) can be used. In addition, when the function of applying DST7 to all rows or columns of one block is used in FIGS. 32 and 33, a value of final_shift=shift−1 can be used if a value "shift" is transmitted through a parameter.

In Table 26, outputMinimum and outputMaximum indicate available minimum and maximum values of an output value, and the Clip3 function executes operation of Clip3(A, B, C)=(C<A)?A:(C>B)?B:C. That is, the Clip3 function clips a value C such that it must be present in a range of A to B.

TABLE 27

| Name | xDST7_FFT3 |
|---|---|
| Input | src[0 . . . 15] |
| Output | dst[0 . . . 15] |
| Operation | int C3 = −443;<br>dst[10] = ((−src[0] * C3) + rnd_factor) >> shift;<br>for (Int i = 0; i < 5; i++) {<br>dst[i] = (((src[3*i + 1] + src[3*i + 2] + src[3*i + 3]) << 9) + rnd_factor) >> shift;<br>dst[5 + i] = ((((src[3*i + 1] << 1) − src[3*i + 2] − src[3*i + 3]) << 8) + rnd_factor) >> shift;<br>dst[11 + i] = (((src[3*i + 2] − src[3*i + 3]) * C3) + rnd_factor) >> shift;<br>} |

In Table 25, a value C3 means round $$\left(\sin\left(\frac{2\pi}{3}\right)\cdot 2^9\right)$$

and represents scaling of a multiplication factor by $2^9$. In Table 27, since shift=10 and md_factor=1<<(shift−1)=$2^9$ are applied, dst[i] and dst[5+i] may be calculated by the following equation 4.

$$dst[i] = (src[3*i+1] + src[3*i+2] + src[3*i+3] + 1) \gg 1 \quad \text{[Equation 4]}$$

$$dst[5+i] = ((src[3*i+1] \ll 1) - src[3*i+2] - src[3*i+3] + 2) \gg 2$$

TABLE 28

| Name | xDST7_FFT11_half1 |
|---|---|
| Input | src[0 . . . 4] |
| Output | dst[0 . . . 4] |
| Operation | int C11R[5] = { 193, 324, 353, 269, 100 };<br>dst[0] = src[0] * C11R[1] + src[1] * C11R[3] − src[2] * C11R[4] − src[3] * C11R[2] − src[4] * C11R[0];<br>dst[1] = src[0] * C11R[2] − src[1] * C11R[4] − src[2] * C11R[1] + src[3] * C11R[0] + src[4] * C11R[3];<br>dst[2] = −src[0] * C11R[3] + src[1] * C11R[2] − src[2] * C11R[0] − src[3] * C11R[4] + src[4] * C11R[1];<br>dst[3] = src[0] * C11R[4] − src[1] * C11R[0] + src[2] * C11R[3] − src[3] * C11R[1] + src[4] * C11R[2];<br>dst[4] = src[0] * C11R[0] + src[1] * C11R[1] + src[2] * C11R[2] + src[3] * C11R[3] + src[4] * C11R[4]; |

In table 28, sequence C11R represents a value calculated through $$\left(\frac{1}{\sqrt{2\times 16+1}}\cdot \sin\left(\frac{2\pi i}{11}\right)\cdot 2^{11}\right),$$

i=1, 2, 3, 4, 5.

TABLE 29

| | |
|---|---|
| Name | xDST7_FFT11_half2 |
| Input | src[0 . . . 5] |
| Output | dst[0 . . . 5] |
| Operation | int C11I[6] = { 357, 300, 148, −51, −233, −342 };<br>dst[0] = (src[0] + src[1] + src[2] + src[3] + src[4] + src[5]) * C11I[0];<br>dst[1] = src[0] * C11I[0] + src[1] * C11I[2] + src[2] * C11I[4] + src[3] * C11I[5] + src[4] * C11I[3] + src[5] * C11I[1];<br>dst[2] = src[0] * C11I[0] + src[1] * C11I[3] + src[2] * C11I[5] + src[3] * C11I[2] + src[4] * C11I[1] + src[5] * C11I[4];<br>dst[3] = src[0] * C11I[0] + src[1] * C11I[4] + src[2] * C11I[3] + src[3] * C11I[1] + src[4] * C11I[5] + src[5] * C11I[2];<br>dst[4] = src[0] * C11I[0] + src[1] * C11I[5] + src[2] * C11I[1] + src[3] * C11I[4] + src[4] * C11I[2] + src[5] * C11I[3];<br>dst[5] = src[0] * C11I[0] + src[1] * C11I[1] + src[2] * C11I[2] + src[3] * C11I[3] + src[4] * C11I[4] + src[5] * C11I[5]; |

In Table 29, sequence C11R represents a value calculated through round $$\left(\frac{1}{\sqrt{2\times 16+1}}\cdot \cos\left(\frac{2\pi i}{11}\right)\cdot 2^{11}\right),$$

i=0, 1, 2, 3, 4, 5.

TABLE 30

| | |
|---|---|
| Name | xDST7_FFT11_type1_Post_Processing |
| Input | src[0 . . . 4] |
| Output | dst[0 . . . 4] |
| Operation | dst[0] = src[4]; dst[1] =<br>−src[0]; dst[2] = src[1];<br>dst[3] = src[2]; dst[4] = src[3]; |

TABLE 31

| | |
|---|---|
| Name | xDST7_FFT11_type2_Post_Processing |
| Input | src_half1[0 . . . 4], src_half2[0 . . . 5] |
| Output | dst[0 . . . 10] |
| Operation | dst[0] = −src_half2[0];<br>dst[1] = src_half2[5] − src_half1[4];<br>dst[2] = −(src_half2[1] − src_half1[0]);<br>dst[3] = src_half2[2] − src_half1[1];<br>dst[4] = −(src_half2[3] + src_half1[2]);<br>dst[5] = src_half2[4] − src_half1[3];<br>dst[6] = −(src_half2[4] + src_half1[3]);<br>dst[7] = src_half2[3] − src_half1[2];<br>dst[8] = src_half2[2] + src_half1[1];<br>dst[9] = −(src_half2[1] + src_half1[0]);<br>dst[10] = src_half2[5] + src_half1[4]; |

When DST7 is applied to a 16×16 two-dimensional block in the horizontal direction (or vertical direction), the flowcharts of FIGS. 32 and 33 can be used for 16 rows (or columns).

FIG. 37 is a flowchart illustrating a design of forward DST7 with a length of 32 using discrete Fourier transform (DFT) as an embodiment to which the present disclosure is applied.

The present disclosure provides specific embodiments of designing DST7 using DFT. The embodiments of the present disclosure can be used for DCT8 design and applied to MTS configuration.

FIG. 37 shows a flowchart for realizing DST7 for one row or column having a length of 32. Here, DST7 with a length of 32 is represented as DST7_B32, forward DST7 is represented as Forward DST7_B32, and inverse DST7 is represented as Inverse DST7_B32.

Further, input data may be represented as x[0 . . . 31] and final output data may be represented as y[0 . . . 31].

An encoder performs pre-processing on forward DST7 with a length of 32 when the input data x[0 . . . 31] is input thereto (S3710).

The encoder may apply DFT to the output (w[0 . . . 31]) of step S3710 (S3720). Here, step S3720 in which DFT is applied will be described in detail later with reference to FIGS. 39 to 41.

The encoder may perform post-processing on the output (z[0 . . . 31]) of step S3720 and output final output data y[0 . . . 31] (S3730).

FIG. 38 is a flowchart illustrating a design of inverse DST7 with a length of 32 using discrete Fourier transform (DFT) as an embodiment to which the present disclosure is applied.

FIG. 38 shows a flowchart for realizing inverse DST7 for one row or column having a length of 32. Here, input data may be represented as x[0 . . . 31] and final output data may be represented as y[0 . . . 31].

A decoder performs pre-processing on inverse DST7 with a length of 32 when the input data x[0 . . . 31] is input thereto (S3810).

The decoder may apply DFT to the output w[0 . . . 31] of step S3810 (S3320). Here, step S3820 in which DFT is applied will be described in detail later with reference to FIGS. 39 to 41.

The decoder may perform post-processing on the output z[0 . . . 31] of step S3820 and output final output data y[0 . . . 31] (S3830).

FIGS. 39 to 41 are flowcharts illustrating application of the function xDST7_FFT_B32 of FIGS. 37 and 38 as embodiments to which the present disclosure is applied.

Referring to FIG. 39, src[0 . . . 31] is input to an xDST7_FFT5 block and src_FFT13[0 . . . 31] is output therefrom (S3910). The output src_FFT13[0 . . . 31] may be divided into three partial signals and transmitted.

For example, src_FFT13[0 . . . 5] may be transmitted to an xDST7_FFT13_type1 block, src_FFT13[6 . . . 18] may be transmitted to an xDST7_FFT13_type2 block, and src_FFT13[19 31] may be transmitted to another xDST7_FFT13_type2 block.

The xDST7_FFT13_type1 block receives src_FFT13[0 . . . 5] and outputs dst[0 . . . 5] (S3920).

The xDST7_FFT13_type2 block receives src_FFT13[6 . . . 18] and outputs dst[6 . . . 18] (S3930).

The xDST7_FFT13_type2 block receives src_FFT13[9 . . . 31] and outputs dst[19 . . . 31] (S3940).

Here, implementation of the xDST7_FFT13_type1 block is described in detail in FIG. 40, and implementation of the xDST7_FFT13_type2 block is described in detail in FIG. 41.

Referring to FIG. 40, src[0 . . . 5] is input to an xDST7_FFT13_half1 block and dst_half1[0 . . . 5] is output therefrom (S4010).

The output dst_half1[0 . . . 5] is input to an xDST7_FFT13_type1_Post_Processing block and dst[0 . . . 5] is output therefrom (S4020).

Referring to FIG. 41, src[0 . . . 12] may be divided into two partial signals and transmitted. For example, src[0 . . . 5] may be transmitted to an xDST7_FFT13_half1 block and src[6 . . . 12] may be transmitted to an xDST7_FFT13_half2 block.

The xDST7_FFT13_half1 block receives src[0 . . . 5] and outputs dst_half1[0 . . . 5] (S4110).

The xDST7_FFT13_half2 block receives src[6 . . . 12] and outputs dst_half2[0 . . . 6] (S4120).

The encoder/decoder may perform post-processing on the outputs of steps S4110 and S4120 through an xDST7_FFT13_type2_Post_Processing block and output final output data dst[0 . . . 12] (S4130).

src_FFT13[0 . . . 5] of FIG. 39 corresponds to src[0 . . . 5] of FIG. 40. That is, allocation is performed in such a manner that src[0]=src_FFT13[0], src[1]=src_FFT13[1], . . . , and src[5]=src_FFT13[5].

In addition, src_FFT13[6 . . . 18] or src_FFT13[19 . . . 31] of FIG. 39 corresponds to src[0 . . . 12] of FIG. 40. For example, allocation is performed in such a manner that src[0]=src_FFT13[6], src[1]=src_FFT13[7], . . . , and src[12]=src_FFT13[18].

Furthermore, dst_half1[0 . . . 5] and dst_half2[0 . . . 6] are sequentially input to the xDST7_FFT13_type2_Post_Processing block in FIG. 41 and they respectively correspond to input parameters src_half1[0 . . . 5] and src_half2[0 . . . 6]. This will be described in detail with reference to the following tables showing operation of each block.

In this manner, the block diagrams of FIGS. 37 and 38 may be interpreted in connection with the block diagrams of FIGS. 39 to 41.

Detailed operations of the functions of FIGS. 37 to 41 can be described using the following tables 32 to 39.

TABLE 32

| | |
|---|---|
| Name | Forward_DST7_Pre_Processing_B32 |
| Input | src[0 . . . 31] |
| Output | dst[0 . . . 31] |
| Operation | int aiFFTInReordIdx[32] =<br>{ 12, 25, −14, 1, 10, −23, 27, 29,<br>−16, 3, 8, −21, −19,<br>31, −18, 5, 6, 4, −17, 30, −20, 7, 9, 2, −15, 28,<br>−22, −24, 11, 0, −13, 26 };<br>for (int i = 0; i < 32; i++) {<br>int index = aiFFTInReordIdx[i];<br>dst[i] = (index < 0) ? −src[−index] : src[index];<br>} |

TABLE 33

| | |
|---|---|
| Name | Forward_DST7_Post_Processing_B32 |
| Input | src[0 . . . 31] |
| Output | dst[0 . . . 31] |
| Operation | int aiFFTOutReordIdx[32] = { −27,<br>−17, 0, 15, 25, −29, −6, 2, 13, 23, −31, −8, 4,<br>11, 21, −20, −10, 5, 9, 19, −22, −12, 3, 7,<br>30, −24, −14, 1, 18, 28, −26, −16 };<br>for (int i = 0; i < 32; i++) {<br>int index = aiFFTOutReordIdx[i];<br>dst[i] = (int)((((index < 0) ?<br>−src[−index] : src[index]) + rnd_factor) >><br>final_shift);<br>} |

In Table 33, a value of rnd_factor=1<<(final_shift−1) can be used. In addition, when a function of applying DST7 to all rows or columns of one block is used in FIGS. 37 and 38, a value of final_shift=shift−1 can be used if a value "shift" is transmitted through a parameter.

TABLE 34

| | |
|---|---|
| Name | Inverse_DST7_Pre_Processing_B32 |
| Input | src[0 . . . 31] |
| Output | dst[0 . . . 31] |
| Operation | int aiFFTInReordIdx[32] =<br>{ 6, 19, −7, 31, 5, −20, 18, 17, −8, 30, 4, −21, −22,<br>16, −9, 29, 3, 2, −23, 15, −10, 28, 27, 1, −24, 14,<br>−11, −12, 26, 0, −25, 13 };<br>for (int i = 0; i < 32; i++) {<br>int index = aiFFTInReordIdx[i];<br>dst[i] = (index < 0) ? −src[−index] : src[index];<br>} |

TABLE 35

| | |
|---|---|
| Name | Inverse_DST7_Post_Processing_B32 |
| Input | src[0 . . . 31] |
| Output | dst[0 . . . 31] |
| Operation | int aiFFTOutReordIdx[32] = { −27,<br>−16, −17, −26, 0, 28, 15, 18, 25, 1, −29, −14,<br>−6, −24, 2, 30, 13, 7, 23, 3, −31, −12, −8, −22,<br>4, 19, 11, 9, 21, 5, −20, −10 };<br>for (int i = 0; i < 32; i++) {<br>int index = aiFFTOutReordIdx[i];<br>dst[i] = Clip3(outputMinimum, outputMaximum,<br>(Int)((((index < 0) ? −src[−<br>index] : src[index]) + rnd_factor) >> final_shift));<br>} |

In Table 35, a value of rnd_factor=1<<(final_shift−1) can be used. In addition, when a function of applying DST7 to all rows or columns of one block is used in FIGS. 37 and 38, a value of final_shift=shift−1 can be used if a value "shift" is transmitted through a parameter.

In Table 35, outputMinimum and outputMaximum indicate available minimum and maximum values of an output value, and the Clip3 function executes operation of Clip3(A, B, C)=(C<A)?A:(C>B)?B:C. That is, the Clip3 function clips a value C such that it must be present in a range of A to B.

TABLE 36

| | |
|---|---|
| Name | xDST7_FFT13_half1 |
| Input | src[0 . . . 5] |
| Output | dst[0 . . . 5] |
| Operation | Int C13R[6] = { 167, 296, 357, 336, 238, 86 };<br>dst[0] = −src[0] * C13R[0] − src[1] * C13R[1] −<br>src[2] * C13R[2] − src[3] *<br>C13R[3] − src[4] * C13R[4] − src[5] * C13R[5];<br>dst[1] = −src[0] * C13R[1] − src[1] * C13R[3] −<br>src[2] * C13R[5] + src[3] *<br>C13R[4] + src[4] * C13R[2] + src[5] * C13R[0];<br>dst[2] = −src[0] * C13R[2] − src[1] * C13R[5] +<br>src[2] * C13R[3] + src[3] *<br>C13R[0] − src[4] * C13R[1] − src[5] * C13R[4];<br>dst[3] = −src[0] * C13R[3] + src[1] * C13R[4] +<br>src[2] * C13R[0] − src[3] *<br>C13R[2] + src[4] * C13R[5] + src[5] * C13R[1];<br>dst[4] = −src[0] * C13R[4] + src[1] * C13R[2] −<br>src[2] * C13R[1] + src[3] *<br>C13R[5] + src[4] * C13R[0] − src[5] * C13R[3];<br>dst[5] = −src[0] * C13R[5] + src[1] * C13R[0] −<br>src[2] * C13R[4] + src[3] *<br>C13R[1] − src[4] * C13R[3] + src[5] * C13R[2]; |

In Table 36, sequence C13R represents a value calculated through round $$\left(\frac{1}{\sqrt{2\times 32+1}}\cdot\sqrt{2}\cdot\sin\left(\frac{2\pi i}{13}\right)\cdot 2^{11}\right),$$

i=1, 2, 3, 4, 5, 6.

TABLE 37

| | |
|---|---|
| Name | xDST7_FFT13_half2 |
| Input | src[0 . . . 6] |
| Output | dst[0 . . . 6] |
| Operation | int C13I[7] = { 359, 318, 204, 43, −127,<br>−269, −349 };<br>dst[0] = (src[0] + src[1] + src[2] +<br>src[3] + src[4] + src[5] + src[6]) * C13I[0];<br>dst[1] = src[0] * C13I[0] + src[1] * C13I[1] +<br>src[2] * C13I[2] + src[3] *<br>C13I[3] + src[4] * C13I[4] + src[5] * C13I[5] +<br>src[6] * C13I[6];<br>dst[2] = src[0] * C13I[0] + src[1] * C13I[2] +<br>src[2] * C13I[4] + src[3] *<br>C13I[6] + src[4] * C13I[5] + src[5] * C13I[3] +<br>src[6] * C13I[1];<br>dst[3] = src[0] * C13I[0] + src[1] * C13I[3] +<br>src[2] * C13I[6] + src[3] *<br>C13I[4] + src[4] * C13I[1] + src[5] * C13I[2] +<br>src[6] * C13I[5];<br>dst[4] = src[0] * C13I[0] + src[1] * C13I[4] +<br>src[2] * C13I[5] + src[3] *<br>C13I[1] + src[4] * C13I[3] + src[5] * C13I[6] +<br>src[6] * C13I[2];<br>dst[5] = src[0] * C13I[0] + src[1] * C13I[5] +<br>src[2] * C13I[3] + src[3] *<br>C13I[2] + src[4] * C13I[6] + src[5] * C13I[1] +<br>src[6] * C13I[4];<br>dst[6] = src[0] * C13I[0] + src[1] * C13I[6] +<br>src[2] * C13I[1] + src[3] *<br>C13I[5] + src[4] * C13I[2] + src[5]<br>* C13I[4] + src[6] * C13I[3]; |

In Table 37, sequence C13I represents a value calculated throughround $$\left(\frac{1}{\sqrt{2\times 32+1}}\cdot\sqrt{2}\cdot\cos\left(\frac{2\pi i}{13}\right)\cdot 2^{11}\right),$$

i=0, 1, 2, 3, 4, 5, 6.

TABLE 38

| | |
|---|---|
| Name | xDST7_FFT13_type1_Post_Processing |
| Input | src[0 . . . 5] |
| Output | dst[0 . . . 5] |
| Operation | dst[0] = −src[0]; dst[1] = src[1]; dst[2] = −src[2];<br>dst[3] = src[3]; dst[4] = −src[4]; dst[5] = src[5] |

TABLE 39

| | |
|---|---|
| Name | xDST7_FFT13_type2_Post_Processing |
| Input | src_half1[0 . . . 5], src_half2[0 . . . 6] |
| Output | dst[0 . . . 12] |
| Operation | dst[0] = src_half2[0];<br>for (int i = 0; i < 6; i++) {<br>dst[1 + i] = src_half1[i] + src_half2[1 + i];<br>}<br>for (int i = 0; i < 6; i++) {<br>dst[7 + i] = −src_half1[5 − i] + src_half2[6 − i];<br>} |

When DST7 is applied to a 32×32 two-dimensional block in the horizontal direction (or vertical direction), the flowcharts of FIGS. 37 and 38 can be used for 32 rows (or columns).

FIG. 42 is a flowchart illustrating a design of forward DST7 with a length of 8 using discrete Fourier transform (DFT) as an embodiment to which the present disclosure is applied.

The present disclosure provides specific embodiments of designing DST7 using DFT. The embodiments of the present disclosure can be used for DCT8 design and applied to MTS configuration.

FIG. 42 shows a flowchart for realizing DST7 for one row or column having a length of 8. Here, DST7 with a length of 8 is represented as DST7_B8, forward DST7 is represented as Forward DST7_B8, and inverse DST7 is represented as Inverse DST7_B8.

Further, input data may be represented as x[0 . . . 7] and final output data may be represented as y[0 . . . 7].

An encoder performs pre-processing on forward DST7 with a length of 8 when the input data x[0 . . . 7] is input thereto (S4210).

The encoder may apply DFT to the output (w[0 . . . 7]) of step S4210 (S4220). Here, step S4220 in which DFT is applied will be described in detail later with reference to FIGS. 44 and 45.

The encoder may perform post-processing on the output (z[0 . . . 7]) of step S4220 and output final output data y[0 . . . 7] (S4230).

FIG. 43 is a flowchart illustrating a design of inverse DST7 with a length of 8 using discrete Fourier transform (DFT) as an embodiment to which the present disclosure is applied.

FIG. 43 shows a flowchart for realizing inverse DST7 for one row or column having a length of 8. Here, input data may be represented as x[0 . . . 7] and final output data may be represented as y[0 . . . 7].

A decoder performs pre-processing on inverse DST7 with a length of 8 when the input data x[0 . . . 7] is input thereto (S4310).

The decoder may apply DFT to the output w[0 . . . 7] of step S4310 (S4320). Here, step S4320 in which DFT is applied will be described in detail later with reference to FIGS. 44 and 45.

The decoder may perform post-processing on the output z[0 . . . 7] of step S2620 and output final output data y[0 . . . 7] (S4330).

Detailed operations of the functions of FIGS. 42 and 43 can be described using the following tables 40 to 44.

TABLE 40

| | |
|---|---|
| Name | Forward_DST7_Pre_Processing_B8 |
| Input | src[0 . . . 7] |
| Output | dst[0 . . . 7] |
| Operation | dst[0] = src[1]; dst[1] = src[5];<br>dst[2] = −src[0]; dst[3] = −src[2];<br>dst[4] = −src[7]; dst[5] = src[6];<br>dst[6] = −src[3]; dst[7] = −src[4]; |

TABLE 41

| | |
|---|---|
| Name | Forward_DST7_Post_Processing_B8 |
| Input | src[0 . . . 7] |
| Output | dst[0 . . . 7] |
| Operation | int aiReordIdx[8] = { 0, 2, 4, 6, 7, 5, 3, 1 };<br>for (int i = 0; i < 8; i++) {<br>dst[i] = (int)((src[aiReordIdx[i]] + rnd_factor) >> shift);<br>} |

In Table 41, a value of rnd_factor=1<<(final_shift−1) can be used. In addition, when a function of applying DST7 to all rows or columns of one block is used, a value of final_shift=shift−1 can be used if a value "shift" is transmitted through a parameter.

TABLE 42

| | |
|---|---|
| Name | Inverse_DST7_Pre_Processing_B8 |
| Input | src[0 . . . 7] |
| Output | dst[0 . . . 7] |
| Operation | dst[0] = src[7]; dst[1] = src[5];<br>dst[2] = −src[0]; dst[3] = −src[1];<br>dst[4] = −src[4]; dst[5] = src[3];<br>dst[6] = −src[6]; dst[7] = −src[2]; |

TABLE 43

| | |
|---|---|
| Name | Inverse_DST7_Post_Processing_B8 |
| Input | src[0 . . . 7] |
| Output | dst[0 . . . 7] |
| Operation | for (Int i = 0; i < 8; i++) {<br>dst[i] = Clip3(outputMinimum, outputMaximum,<br>(Int)((src[i]) + rnd_factor)<br>>> shift);<br>} |

In Table 43, a value of rnd_factor=1<<(final_shift−1) can be used. In addition, when a function of applying DST7 to all rows or columns of one block is used, a value of final_shift=shift−1 can be used if a value "shift" is transmitted through a parameter.

In Table 43, outputMinimum and outputMaximum indicate available minimum and maximum values of an output value, and the Clip3 function executes operation of Clip3(A, B, C)=(C<A)?A:(C>B)?B:C. That is, the Clip3 function clips a value C such that it must be present in a range of A to B.

TABLE 44

| | |
|---|---|
| Name | xDST7_FFT_B8 |
| Input | src[0 . . . 7] |
| Output | dst[0 . . . 7] |
| Operation | int C8[8] = { 127, 237, 314, 350, 338, 280, 185, 65 };<br>dst[0] = src[0] * C8[0] + src[1] * C8[2] −<br>src[2] * C8[7] − src[3] * C8[6] − src[4]<br>* C8[3] + src[5] * C8[4] − src[6] * C8[1] −<br>src[7] * C8[5];<br>dst[1] = −src[0] * C8[1] − src[1] * C8[5] −<br>src[2] * C8[0] − src[3] * C8[2] +<br>src[4] * C8[7] + src[5] * C8[6] + src[6] * C8[3] −<br>src[7] * C8[4];<br>dst[2] = src[0] * C8[2] − src[1] * C8[7] −<br>src[2] * C8[6] − src[3] * C8[3] + src[4]<br>* C8[4] − src[5] * C8[1] − src[6] * C8[5] −<br>src[7] * C8[0];<br>dst[3] = −src[0] * C8[3] + src[1] * C8[4] −<br>src[2] * C8[1] − src[3] * C8[5] −<br>src[4] * C8[0] − src[5] * C8[2] + src[6] * C8[7] +<br>src[7] * C8[6];<br>dst[4] = src[0] * C8[4] − src[1] * C8[1] −<br>src[2] * C8[5] − src[3] * C8[0] − src[4]<br>* C8[2] + src[5] * C8[7] + src[6] * C8[6] +<br>src[7] * C8[3];<br>dst[5] = −src[0] * C8[5] − src[1] * C8[0] −<br>src[2] * C8[2] + src[3] * C8[7] +<br>src[4] * C8[6] + src[5] * C8[3] − src[6] * C8[4] +<br>src[7] * C8[1];<br>dst[6] = src[0] * C8[6] + src[1] * C8[3] −<br>src[2] * C8[4] + src[3] * C8[1] +<br>src[4] * C8[5] + src[5] * C8[0] + src[6] * C8[2] −<br>src[7] * C8[7];<br>dst[7] = −src[0] * C8[7] − src[1] * C8[6] −<br>src[2] * C8[3] + sr[3] * C8[4] −<br>src[4] * C8[1] − src[5] * C8[5] − src[6]<br>* C8[0] − src[7] * C8[2]; |

In Table 44, sequence C8 represents a value calculated through round $$\left(\frac{1}{\sqrt{2\times 8+1}}\cdot\sqrt{2}\cdot\sin\left(\frac{2\pi i}{17}\right)\cdot 2^{10}\right),$$

i=1, 2, 3, 4, 5, 6, 7, 8.

When DST7 is applied to an 8×8 two-dimensional block in the horizontal direction (or vertical direction), the flowcharts of FIGS. 42 and 43 can be used for 8 rows (or columns).

In embodiments of the present disclosure, DST7 implementation proposed in embodiment 1 and embodiment 2 may be applied to length-16 DST7 and length-32 DST7, and DST7 implementation proposed in embodiment 3 may be applied to length-8 DST7. However, the present disclosure is not limited thereto and may be applied in different manners. For example, when DST7 implementation proposed in embodiment 3 is not applied, DST7 implementation in a general matrix multiplication form may be applied.

In an embodiment of the present disclosure, a matrix form of N×N DST7 may be represented by Equation 5.

$$[S_N^{VII}]_{n,k}=\frac{2}{\sqrt{2N+1}}\sin\left(\frac{\pi(2k+1)(n+1)}{2N+1}\right),\quad n,k=0,1,\ldots,N-1 \qquad \text{[Equation 5]}$$

Here, when n is a row index in a range of 0 to N−1 and k is a column index in a range of 0 to N−1, the matrix of Equation 5 matches an inverse DST7 matrix multiplied by transform coefficients to restore original inputs.

Accordingly, the transpose matrix of Equation 5 is a forward DST7 matrix. Further, forward DST7 and inverse DST7 matrices are orthogonal, and basic vectors thereof have norm 1.

A relationship between DST7 and DFT may be represented by Equations 6 and 7 based on Equation 5.

$$(S_N^{VII})^T = R\Im[F_{2N+1}]QP \quad \text{[Equation 6]}$$

$$\text{where } [R]_{n,k} = \begin{cases} -1, & \text{if } k = 2n+1, n = 0, 1, \dots, N-1 \\ 0, & \text{otherwise} \end{cases},$$

$$Q = \begin{pmatrix} 0^T \\ I_N \\ -J_N \end{pmatrix}, \quad \text{[Equation 7]}$$

$$\text{and } [P]_{n,k} = \begin{cases} 1, & \text{if } k+1 = 2(n+1), n = 0, 1, \dots, N/2-1 \\ 1, & \text{if } k+1 = 2(N-n)-1, n = N/2, \dots, N-1 \\ 0, & \text{otherwise} \end{cases}$$

In Equation 6, R is an N×(2N+1) matrix(number of rows×number of columns), Q is a (2N+1)×N matrix, and P is an N×N matrix. $I_N$ represents an N×N identity matrix and $J_N$ represents $$[J_N]_{ij, i,j=0,\dots,N-1} = \begin{cases} 1, & j = N-1-i \\ 0, & \text{otherwise} \end{cases}.$$

In Equation 6, $\Im[F_{2N+1}]$ means that only an imaginary part of a DFT result is taken after (2N+1)-length DFT is performed. Equation 6 is held only when N is an even number. Specifically, $\Im[F_{2N+1}]$ means that (2N+1)×1 vector z is output when z=QPx is calculated in a case where x input to forward DST7 is an N×1 vector, and only an imaginary part is taken after (2N+1)-length DFT is performed using the vector z as input.

As in Equations 6 and 7, the matrices P, Q, and R are used to perform rearrangement of only N inputs and assignment of sign (+/−) thereof such that a principal calculation part becomes (2N+1)-length DFT in forward DST7.

The present disclosure uses DST7 having a size of 2n×2n (N=2n). Accordingly, 9-point DFT, 17-point DFT, 33-point DFT, and 65-point DFT may be applied when N=4, 8, 16, 32, respectively.

The present disclosure is described based on a case in which N=8, 16, 32, introduces a design of corresponding DFTs as a form of multi-dimensional DFT, and provides a method of integrating the DFTs in order to obtain low-complexity DST7.

Inverse N×N DST7 consistent with forward DST6 may be represented as (2N+1)-length DFT as represented in Equations 8 and 9.

$$S_N^{VII} = R\Im[F_{2N+1}]QP, \quad \text{[Equation 8]}$$

$$\text{where } [R]_{n,k} = \begin{cases} 1, & \text{if } k = n+1, n = 1, 3, \dots, N-1 \\ -1, & \text{if } k = n+1, n = 0, 2, \dots, N-2 \\ 0, & \text{otherwise} \end{cases},$$

$$Q = \begin{pmatrix} 0^T \\ J_N \\ -I_N \end{pmatrix}, \text{ and } [P]_{n,k} = \begin{cases} 1, & \text{if } k = n, n = 0, 1, \dots, N-1 \\ 0, & \text{otherwise} \end{cases} \quad \text{[Equation 9]}$$

Here, R is an N×(2N+1) matrix(number of rows number of columns), Q is a (2N+1)×N matrix, and $I_N$ represents an N×N identify matrix. $J_N$ is defined as in Equations 6 and 7.

$\Im[F_{2N+1}]$ means that (2N+1)×1 vector z is output when z=Qx is calculated in a case where x input to forward DST7 is an N×1 vector, and only an imaginary part is taken after (2N+1)-length DFT is performed using the vector z as input. That is, $\Im[F_{2N+1}]$ in Equation 9 is defined as in Equations 6 and 7 except calculation of z=QPx.

In Equations 9 and 10, N is an even number. Further, (2N+1)-length DFT which is the same as that in forward DST7 can also be reused for inverse DST7.

A trigonometric transform having a length of an even number may be applied to a CODEC system to which the present disclosure is applied. For example, length-17, 33, 65, and 129 DFTs from Equations 6 and 7 are respectively required for length-8, 16, 32, and 64 DST7. 33-point DFT and 65-point DFT applicable to length-8 DST7 and length-16 DST7 may be represented as a one-dimensional DFT as in Equations 10 and 11. Equation 12 represents a general length-N DFT formula.

$$X(k) = \frac{1}{\sqrt{2\cdot 16+1}} \sum_{n=0}^{32} x(n) W_N^{nk}, \; W_N = e^{-j(2\pi/33)} \quad \text{[Equation 10]}$$

$$X(k) = \frac{1}{\sqrt{2\cdot 32+1}} \sum_{n=0}^{64} x(n) W_N^{nk}, \; W_N = e^{-j(2\pi/65)} \quad \text{[Equation 11]}$$

$$X(k) = \frac{1}{\sqrt{N}} \sum_{n=0}^{N-1} x(n) W_N^{nk}, \; W_N = e^{-j(2\pi/M)} \quad \text{[Equation 12]}$$

Although the procedure of applying (2N+1)-length DFT in order to implement N×N DST7 has been described, length N can be used instead of length 2N+1 in description including Equations 10 and 11 for convenience of notation. Accordingly, when DFT is applied through Equations 6 to 9, appropriate notational conversion is required.

Furthermore, the aforementioned one-dimensional 33-point DFT and one-dimensional 65-point DFT are also represented as equivalent two-dimensional DFTs through simple input/output data conversion, and equations corresponding thereto are Equations 13 and 14.

$$\hat{X}(k_1, k_2) = \frac{1}{\sqrt{2\cdot 16+1}} \sum_{n_2=0}^{10} \sum_{n_1=0}^{2} \hat{x}(n_1, n_2) W_3^{n_1 k_1} W_{11}^{n_2 k_2} = \sum_{n_2=0}^{10} \hat{y}(k_1, n_2) W_{11}^{n_2 k_2} \quad \text{[Equation 13]}$$

$$\hat{X}(k_1, k_2) = \frac{1}{\sqrt{2\cdot 32+1}} \sum_{n_2=0}^{12} \sum_{n_1=0}^{4} \hat{x}(n_1, n_2) W_5^{n_1 k_1} W_{13}^{n_2 k_2} = \sum_{n_2=0}^{12} \hat{y}(k_1, n_2) W_{13}^{n_2 k_2} \quad \text{[Equation 14]}$$

Here, n denotes an index for input data and k denotes an index for a transform coefficient.

Hereinafter, a residue of a number is represented as $\langle x \rangle_N$=x mod N. Further, four index variables $n_1$, $n_2$, $k_1$, and $k_2$ are introduced, and a relationship between 33-point DFT and 65-point DFT is represented by Equations 15 and 16.

$$n = \langle 22n_1 + 12n_2 \rangle_{33} \quad \text{[Equation 15]}$$

$$k = \langle 11k_1 + 3k_2 \rangle_{33}$$

-continued $$n = \langle 26n_1 + 40n_2 \rangle_{65} \quad \text{[Equation 16]}$$

$$k = \langle 13k_1 + 5k_2 \rangle_{65}$$

Here, n denotes an index for input data and k denotes an index for a transform coefficient. Equation 15 represents indexes mapped to 33-point DFT and Equation 16 represents indexes mapped to 65-point DFT.

According to Equations 15 and 16, input/output data mapping between one-dimensional DFT and two-dimensional DFT is given as represented by Equations 17 and 18. From Equations 15 and 16, the present disclosure can define new input/output variables with two index arguments $\hat{x}(n_1, n_2)$ and $\hat{X}(k_1, k_2)$ as represented by Equations 17 and 19.

$$\hat{x}(n_1, n_2) = x(\langle 22n_1 + 12n_2 \rangle_{33}) \quad \text{[Equation 17]}$$

$$\hat{X}(k_1, k_2) = X(\langle 11k_1 + 3k_2 \rangle_{33})$$

$$\hat{x}(n_1, n_2) = x(\langle 26n_1 + 40n_2 \rangle_{65}) \quad \text{[Equation 18]}$$

$$\hat{X}(k_1, k_2) = X(\langle 13k_1 + 5k_2 \rangle_{65})$$

Here, $\langle x \rangle_N$=x mod N.

Although two-dimensional DFT is realized by Equations 15 and 17 in an embodiment of the present disclosure, the present disclosure is not limited thereto. That is, when Equation 19 is satisfied, two-dimensional DFT as represented by Equations 13 and 14 can be realized.

$$N = N_1 N_2 \quad \text{[Equation 19]}$$

$$n = \langle K_1 n_1 + K_2 n_2 \rangle_N$$

$$k = \langle K_3 k_1 + K_4 k_2 \rangle_N$$

$$\langle K_1 K_3 \rangle_N = N_2$$

$$\langle K_2 K_4 \rangle_N = N_1$$

$$\langle K_1 K_4 \rangle_N = \langle K_2 K_3 \rangle_N = 0$$

Here, $N_1$ and $N_2$ are mutually prime factors, and $\langle x \rangle_N$=x mod N.

33-point one-dimensional DFT corresponds to (N1, N2)=(3, 11) and 65-point one-dimensional DFT corresponds to (N1, N2)=(5, 13). In both cases, N1 and N2 are mutually prime factors, and thus, Equation 19 is applicable. If $K_1$, $K_2$, $K_3$, and $K_4$ satisfy Equation 20, the condition of $\langle K_1K_4 \rangle_N = \langle K_2K_3 \rangle_N$=0 in Equation 19 is satisfied.

$$K_1 = \alpha N_2,\ K_2 = \beta N_1,\ K_3 = \gamma N_2,\ K_4 = \delta N_1 \quad \text{[Equation 20]}$$

In addition, to satisfy other conditions of Equation 19, relations in Equation 21 need to be satisfied.

$$\langle \alpha\gamma N_2 \rangle_{N_1} = 1,\ \langle \beta\delta N_1 \rangle_{N_2} = 1 \quad \text{[Equation 21]}$$

Accordingly, $K_1$, $K_2$, $K_3$, and $K_4$ that satisfy Equation 19 can be derived from Equation 20 using α, β, γ, δ that satisfy Equation 21, and thus, equivalent two-dimensional DFT can be configured. Embodiments of available α, β, γ, δ are as follows.

1) (α, β, γ, δ)=(2, 4, 1, 1)

This corresponds to Equation 15 and a case of(N1, N2)=(3, 11).

2) (α, β, γ, δ)=(2, 8, 1, 1)

This corresponds to Equation 15 and a case of(N1, N2)=(5, 13).

3) (α, β, γ, δ)=(1, 1, 2, 4)

This corresponds to a case of(N1, N2)=(3, 11).

4) (α, β, γ, δ)=(1, 1, 2, 8)

This corresponds to a case of(N1, N2)=(5, 13).

When the corresponding two-dimensional DFT is configured according to $K_1$, $K_2$, $K_3$, and $K_4$ derived from α, β, γ, δ that satisfy Equation 21, symmetry with respect to input/output data and intermediate result values as in the aforementioned equations may be generated in a process of calculating the two-dimensional DFT.

Accordingly, even in the case of two-dimensional DFT having indexes different from those of the above-described embodiments (i.e., having different α, β, γ, δ values), complexity required to execute DST7 can be considerably reduced by applying methods and structures proposed in the above-described embodiments.

In short, DFT for a length of N ($N=N_1N_2$, $N_1$ and $N_2$ are mutually prime factors) can be calculated as two-dimensional DFT as represented by Equation 22 through index conversion (i.e., conversion between a one-dimensional index and a two-dimensional index) that satisfy Equations 19 to 21.

$$\hat{X}(k_1, k_2) = \frac{1}{\sqrt{N}} \sum_{n_2=0}^{N_2-1} \sum_{n_1=0}^{N_1-1} \hat{x}(n_1, n_2) W_{N_1}^{n_1 k_1} W_{N_2}^{n_2 k_2} = \sum_{n_2=0}^{N_2-1} \hat{y}(k_1, n_2) W_{N_2}^{n_2 k_2} \quad \text{[Equation 22]}$$

When the two-dimensional DFT form of Equation 22 is used, this can be decomposed into short-length DFTs and calculated and thus the amount of calculation can be considerably reduced as compared to equivalent one-dimensional DFT.

In an embodiment of the present disclosure, according to Equations 13 and 14, 3-point DFT of $\hat{x}(0, n_2)$, $\hat{x}(1, n_2)$, and $\hat{x}(2, n_2)$ and 5-point DFT of $\hat{x}(0, n_2)$, $\hat{x}(1, n_2)$, $\hat{x}(2, n_2)$, $\hat{x}(3, n_2)$, and $\hat{x}(4, n_2)$ are performed for given $n_2$.

For $\hat{y}(k_1, n_2)$ generated after execution of an inner DFT loop of Equations 13 and 14, the present disclosure can define a real part and an imaginary part of $\hat{y}(k_1, n_2)$ as represented in Equation 23.

$$\hat{y}(k_1, n_2) = \hat{y}_R(k_1, n_2) + j \cdot \hat{y}_I(k_1, n_2) \quad \text{[Equation 23]}$$

Here, $\hat{y}_R$ represents the real part and $\hat{y}_1$ represents the imaginary part.

Similarly, input $\hat{x}(n_1, n_2)$ and output $\hat{X}(k_1, k_2)$ can also be decomposed into a real part and an imaginary part.

[Equation 24]

$$\hat{x}(n_1, n_2) = \hat{x}_R(n_1, n_2) + j \cdot \hat{x}_I(n_1, n_2)$$

$$\hat{X}(k_1, k_2) = \hat{X}_R(k_1, k_2) + j \cdot \hat{X}_I(k_1, k_2)$$

Here, input $\hat{x}(n_1, n_2)$ may be pixels or residual data to which a designated transform is predicted to be applied. Accordingly, it can be assumed that all actual $\hat{x}_I(n_1, n_2)$ have a value of 0.

On this assumption, the present disclosure can check relationships between first transformed data $\hat{y}(k_1, n_2)$ output according to input symmetries imposed on the first-phase DFT (i.e., 3-point DFT in the case of 33-point DFT and 5-point DFT in the case of 65-point DFT). Such symmetries are provided by matrices P and Q of any one of the aforementioned Equations 6 to 9 and described by Equations 25 and 26.

[Equation 25]

Case 1)

$$x(0, n_2) = 0,\ x(2, n_2) = -x(1, n_2)$$

Case 2)

$$x(0, n_2) = -x(0, n_2'),\ x(1, n_2) = -x(2, n_2'),\ x(2, n_2) = -x(1, n_2') \text{ for some } n_2'$$

[Equation 26]

Case 1)

$$x(0, n_2) = 0,\ x(3, n_2) = -x(2, n_2),\ x(4, n_2) = -x(1, n_2)$$

Case 2)

$$x(0, n_2) = -x(0, n_2'),\ x(1, n_2) = -x(4, n_2'),\ x(2, n_2) = -x(3, n_2'),$$

$$x(3, n_2) = -x(2, n_2'),\ x(4, n_2) = -x(1, n_2') \text{ for some } n_2'$$

Furthermore, first-phase output relationships in $\hat{y}(k_1, n_2)$ are represented by Equations 27 and 28.

[Equation 27]

$$\hat{y}_R(2, n_2) = \hat{y}_R(1, n_2)$$

$$\hat{y}_I(0, n_2) = 0,\ \hat{y}_I(2, n_2) = -\hat{y}_I(1, n_2)$$

[Equation 28]

$$\hat{y}_R(3, n_2) = \hat{y}_R(2, n_2),\ \hat{y}_R(4, n_2) = \hat{y}_R(1, n_2)$$

$$\hat{y}_I(0, n_2) = 0,\ \hat{y}_I(3, n_2) = -\hat{y}_I(2, n_2),\ \hat{y}_I(4, n_2) = -\hat{y}_I(1, n_2)$$

Equations 25 and 27 represent a relationship in 3-point FFT belonging to 33-point DFT and Equations 26 and 28 represent a relationship in 5-point FFT belonging to 65-point DFT.

For example, in Equations 25 and 26, Case 1 occurs when $$n_2 = 11 - n_2',\ n_2' = 1, 2, \ldots, 10\ \ (n_2 = 13 - n_2',\ n_2' = 1, 2, \ldots, 12).$$

Real parts of all outputs from 3-point FFT (5-point FFT) become 0 for inputs of Case 1, and one (two) imaginary part output needs to be kept because the present disclosure can recover the remaining one output (two outputs) according to Equations 27 and 28.

A relationship between $\hat{y}(k_1, n_2)$ and $$\hat{y}(k_1, n_2')$$

as represented by Equation 29 is obtained due to input patterns of Case 2 in Equations 25 and 26.

[Equation 29]

$$\hat{y}_R(k_1, n_2) = -\hat{y}_R(k_1, n_2')$$

$$\hat{y}_I(k_1, n_2) = \hat{y}_I(k_1, n_2')$$

In the case of Equation 29, relationships between indexes $$n_2 = 11 - n_2',\ n_2' = 1, 2, \ldots, 10\ \ (n_2 = 13 - n_2',\ n_2' = 1, 2, \ldots, 12)$$

of 11-point FFT (13-point FFT) are equally applied.

Accordingly, the present disclosure performs 3-point FFT (5-point FFT) only when $n_2$ falls within a range of [0, 5] ([0, 6]) according to Equation 29, and thus, the amount of associated calculation can be reduced.

In addition, since other parts of outputs can be recovered according to Equation 21 in each 3-point FFT (5-point FFT) calculation over a range of [1, 5] ([1, 6]) only some outputs which are two (three) real part outputs and one (two) imaginary part output are calculated.

Due to symmetries present in the first-phase outputs (Equation 29), outputs calculated from an outer loop (second-phase FFT) in Equations 13 and 14 are symmetrically arranged, which can reduce the amount of calculation. Input patterns of the outer loop (second-phase FFT) are as in Equations 30 to 33.

[Equation 30]

1) Real part $$\hat{y}_R(k_1, 0) = 0,\ \hat{y}_R(k_1, 6) = -\hat{y}_R(k_1, 5),\ \hat{y}_R(k_1, 7) = -\hat{y}_R(k_1, 4),$$

$$\hat{y}_R(k_1, 8) = -\hat{y}_R(k_1, 3),\ \hat{y}_R(k_1, 9) = -\hat{y}_R(k_1, 2),\ \hat{y}_R(k_1, 10) = -\hat{y}_R(k_1, 1)$$

[Equation 31]

1) Real part $$\hat{y}_R(k_1, 0) = 0,\ \hat{y}_R(k_1, 7) = -\hat{y}_R(k_1, 6),\ \hat{y}_R(k_1, 8) = -\hat{y}_R(k_1, 5),\ \hat{y}_R(k_1, 9) = -\hat{y}_R(k_1, 4),$$

$$\hat{y}_R(k_1, 10) = -\hat{y}_R(k_1, 3),\ \hat{y}_R(k_1, 11) = -\hat{y}_R(k_1, 2),\ \hat{y}_R(k_1, 12) = -\hat{y}_R(k_1, 1)$$

[Equation 32]

2) Imaginary part $$\hat{y}_I(k_1, 6) = \hat{y}_I(k_1, 5),\ \hat{y}_I(k_1, 7) = \hat{y}_I(k_1, 4),$$

$$\hat{y}_I(k_1, 8) = \hat{y}_I(k_1, 3),\ \hat{y}_I(k_1, 9) = \hat{y}_I(k_1, 2),\ \hat{y}_I(k_1, 10) = \hat{y}_I(k_1, 1)$$

[Equation 33]

2) Imaginary part $$\hat{y}_I(k_1, 7) = \hat{y}_I(k_1, 6),\ \hat{y}_I(k_1, 8) = \hat{y}_I(k_1, 5),\ \hat{y}_I(k_1, 9) = \hat{y}_I(k_1, 4),$$

$$\hat{y}_I(k_1, 10) = \hat{y}_I(k_1, 3),\ \hat{y}_I(k_1, 11) = \hat{y}_I(k_1, 2),\ \hat{y}_I(k_1, 12) = \hat{y}_I(k_1, 1)$$

Equations 30 and 32 represent input symmetries encountered in 11-point FFT belonging to 33-point FFT.

Equations 31 and 33 represent input symmetries encountered in 13-point FFT belonging to 65-point FFT. Other symmetries are encountered in input sets of 11-point FFT (13-point FFT) according to outer loop iteration and allow output recovery for iteration from one of previous iterations.

In the present disclosure, when the vector of $\hat{y}(k_1, n_2)$ is represented as $\hat{Y}(k_1)=[\hat{y}(k_1, 0)\ \hat{y}(k_1, 1)\ \ldots\ \hat{y}(k_1, N_2-1)]^T=\hat{Y}_R(k_1)+j\cdot\hat{Y}_I(k_1)$, input symmetries present in an iteration process may be represented by Equation 34.

$$\text{Case 1: } \hat{Y}_I(k_1)=0 \qquad \text{[Equation 34]}$$

$$\text{Case 2: } \hat{Y}_R(k_1)=\hat{Y}_R(k_1'),\ \hat{Y}_I(k_1)=-\hat{Y}_I(k_1')$$

In two-dimensional DFT such as 33-point FFT (65-point FFT), $k_1$ has a range of [0, 2] ([0, 4]).

In Equation 34, Case 1 occurs only when $k_1=0$. In Equation 34, Case 2 occurs when $$k_1=3-k_1',\ k_1'=1, 2\ \ (k_1=5-k_1',\ k_1'=1, 2, 3, 4).$$

Since an output of skipped iteration can be derived from one of previous iterations from the symmetries in Equation 34, the number of effective iterations of 11-point FFT (15-point FFT) in 33-point FFT (65-point FFT) can be reduced from 3 (5) to 2 (3).

Furthermore, the present disclosure can take only imaginary parts among outputs from 33-point FFT (65-point FFT) according to Equations 6 to 9, and thus output patterns of the cases in Equation 34 may be represented by Equations 35 to 38.

$$\text{Case 1: } \hat{X}_I(k_1, 0)=0,\ \hat{X}_I(k_1, 11-k_2)=-\hat{X}_I(k_1, k_2),\ k_2=1, 2, \ldots, 10 \qquad \text{[Equation 35]}$$

$$\text{Case 1: } \hat{X}_I(k_1, 0)=0,\ \hat{X}_I(k_1, 13-k_2)=-\hat{X}_I(k_1, k_2),\ k_2=1, 2, \ldots, 12 \qquad \text{[Equation 36]}$$

$$\text{Case 2: } \hat{X}_I(k_1, 0)=-\hat{X}_I(3-k_1, 0),\ \hat{X}_I(k_1, k_2)=-\hat{X}_I(3-k_1, 11-k_2),\ k_1=1, 2,\ k_2=1, 2, \ldots, 10 \qquad \text{[Equation 37]}$$

$$\text{Case 2: } \hat{X}_I(k_1, 0)=-\hat{X}_I(5-k_1, 0),\ \hat{X}_I(k_1, k_2)=-\hat{X}_I(5-k_1, 13-k_2),\ k_1=1, 2, 3, 4,\ k_2=1, 2, \ldots, 12 \qquad \text{[Equation 38]}$$

Equations 35 and 37 represent output symmetries in 11-point FFT belonging to 33-point FFT and Equations 36 and 38 represent output symmetries in 13-point FFT belonging to 65-point FFT.

Subsequent iterations of the outer loop in two-dimensional DFT are unnecessary due to the symmetries as represented in Equations 35 to 38. Final output Indexes k are k=2m+1 from the relationship between forward DST7 and DFT in Equations 6 and 7. Here, the range of m is [0, 15] ([0, 31]) for 16×16 DST7 (32×32 DST7).

FIGS. 44 and 45 illustrate embodiments to which the present disclosure is applied, FIG. 44 is a block diagram illustrating 16×16 DST7 to which 33-point DFT is applied, and FIG. 45 is a block diagram illustrating 32×32 DST7 to which 65-point DFT is applied.

In an embodiment of the present disclosure, a configuration in which general DFT is used instead of Winograd FFT is proposed.

A formula for general one-dimensional DFT is given as the aforementioned Equations 7 and 8 respectively for 33-point DFT and 65-point DFT. Further, formulas for general two-dimensional DFTs corresponding to 33-point one-dimensional DFT and 65-point one-dimensional DFT are respectively given as Equations 13 and 14.

In FIGS. 44 and 45, first-phase DFT is 3-point DFT or 5-point DFT. A general DFT formula for the first-phase DFT is as follows.

$$\hat{y}(k_1, n_2)=\hat{y}_R(k_1, n_2)+j\cdot\hat{y}_I(k_1, n_2)=\sum_{n_1=0}^{N_1-1}\hat{x}(n_1, n_2)W_{N_1}^{n_1k_1} \qquad \text{[Equation 39]}$$

$$\hat{y}_R(k_1, n_2)=\sum_{n_1=0}^{N_1-1}\hat{x}(n_1, n_2)\cos\left(\frac{2\pi k_1n_1}{N_1}\right)$$

$$\hat{y}_I(k_1, n_2)=-\sum_{n_1=0}^{N_1-1}\hat{x}(n_1, n_2)\sin\left(\frac{2nk_1n_1}{N_1}\right)$$

Equation 39 represents 3-point DFT when $N_1=3$ and represents 5-point DFT when $N_1=5$. Corresponding DFT can be calculated only for a range in which $n_2$ is 0 to $(N_2-1)/2$ according to symmetry proposed in Equation 21. That is, $N_2=11$ when $N_1=3$, and $N_2=13$ when $N_1=5$.

Case 1 in Equations 25 and 26 corresponds to simplified 3-point DFT Type 1 of FIG. 44 and simplified 5-point DFT Type 1 of FIG. 45, which correspond to a case in which $n_2=0$.

Simplified 3-point DFT Type 1 is given by Equation 40.

$$\hat{y}_R(k_1, 0)=0,\ \hat{y}_I(k_1, 0)=-2\hat{x}(1, 0)\sin\left(\frac{2\pi k_1}{3}\right) \qquad \text{[Equation 40]}$$

Since calculation is necessary only for a case in which $k_1=1$ in Equation 40, only one multiplication is required. Simplified 5-point DFT Type 1 is represented by Equation 41 in the same manner.

$$\hat{y}_R(k_1, 0)=0,\ \hat{y}_I(k_1, 0)=-2\hat{x}(1, 0)\sin\left(\frac{2\pi k_1}{5}\right)-2\hat{x}(2, 0)\sin\left(\frac{2\pi k_1\cdot 2}{5}\right) \qquad \text{[Equation 41]}$$

Since calculation is necessary only for a case in which $k_1=1$, 2 in Equation 41, only two multiplications are required. Further, "multiply 2" in Equations 40 and 41 can be processed through a left shift operation and thus is not counted as multiplication.

Case 2 in Equations 25 and 26 corresponds to simplified 3-point DFT Type 2 of FIG. 44 and simplified 5-point DFT Type 2 of FIG. 45, which correspond to a case in which $n_2=1$ to 5 and a case in which $n_2=1$ to 6.

Simplified 3-point DFT Type 2 can be implemented through Equation 39. Here, when symmetry of Equation 27 is used, $\hat{y}_R(k_1, n_2)$ is obtained only for a case in which $k_1=0$, 1 and $\hat{y}_I(k_1, n_2)$ is obtained only for a case in which $k_1=1$.

Likewise, simplified 5-point DFT Type 2 can be implemented through Equation 39. Likewise, when symmetry of Equation 28 is used, $\hat{y}_R(k_1, n_2)$ is obtained only for a case in which $k_1=0$, 1, 2 and $\hat{y}_I(k_1, n_2)$ is obtained only for a case in which $k_1=1$, 2.

Second-phase DFT in FIGS. 44 and 45 is 11-point DFT or 13-point DFT. A general DFT formula for the second-phase DFT is represented by Equation 42.

$$\hat{X}(k_1,k_2)=\hat{X}_R(k_1,k_2)+j\cdot\hat{X}_I(k_1,k_2)=\sum_{n_2=0}^{N_2-1}\hat{y}(k_1,n_2)W_{N_2}^{n_2k_2}$$ [Equation 42]

$$\hat{X}_I(k_1,k_2)=\sum_{n_2=0}^{N_2-1}\left[\hat{y}_I(k_1,n_2)\cos\left(\frac{2\pi k_2n_2}{N_2}\right)-\hat{y}_R(k_1,n_2)\sin\left(\frac{2\pi k_2n_2}{N_2}\right)\right]$$

Equation 42 represents 11-point DFT when $N_2=11$ and represents 13-point DFT when $N_2=13$. Corresponding DFT can be calculated only for a range in which $k_1$ is 0 to $(N_1-1)/2$ according to symmetry proposed in Equations 36 to 38. $N_1=2$ when $N_2=11$, and $N_1=5$ when $N_2=13$.

Case 1 of Equation 34 and Equation 35 correspond to simplified 11-point DFT Type 1 of FIG. 44. In addition, Case 1 of Equation 34 and Equation 36 correspond to simplified 13-point DFT Type 1.

When symmetries proposed in Equations 30 to 33 are used, simplified 11-point DFT Type 1 and simplified 13-point DFT Type 1 are obtained as represented in Equation 43. That is, they correspond to a case in which $k_1=0$.

$$\hat{X}_I(0,k_2)=\sum_{n_2=1}^{\frac{N_2-1}{2}}[-2\hat{y}_R(0,n_2)]\sin\left(\frac{2\pi k_2n_2}{N_2}\right)=-2\sum_{n_2=1}^{\frac{N_2-1}{2}}\hat{y}_R(0,n_2)\sin\left(\frac{2\pi k_2n_2}{N_2}\right)$$ [Equation 43]

According to Equation 43, simplified 11-point DFT Type 1 requires multiplication five times and simplified 13-point DFT Type 1 requires multiplication six times.

Similarly, when symmetries proposed in Equations 30 to 33 are used, simplified 11-point DFT Type 2 and simplified 13-point DFT Type 2 may be obtained as represented in Equation 44. Here, simplified 11-point DFT Type 2 is performed when $k_1=1$ and simplified 13-point DFT Type 2 is performed when $k_1=1, 2$.

$$\hat{X}_I(k_1,k_2)=2\left[\sum_{n_2=1}^{\frac{N_2-1}{2}}\hat{y}_I(k_1,n_2)\cos\left(\frac{2\pi k_2n_2}{N_2}\right)\right]+\hat{y}_I(k_1,0)-2\left[\sum_{n_2=1}^{\frac{N_2-1}{2}}\hat{y}_R(k_1,n_2)\sin\left(\frac{2\pi k_2n_2}{N_2}\right)\right]$$ [Equation 44]

According to Equation 44, simplified 11-point DFT Type 2 requires multiplication ten times and simplified 13-point DFT Type 2 requires multiplication twelve times.

In multiplications in Equations 40 to 44, cosine values and sine values are multiplied as DFT kernel coefficients. Since available values $N_1$ and $N_2$ are 3, 5, 11, and 13, coefficients in Equation 45 appear in the corresponding multiplications. However, a case in which i=0 is excluded because a corresponding cosine or sine value is 0 or 1.

$$\cos\left(\frac{2\pi i}{3}\right),\ \sin\left(\frac{2\pi i}{3}\right),\ i=1,2$$ [Equation 45]

-continued $$\cos\left(\frac{2\pi i}{5}\right),\ \sin\left(\frac{2\pi i}{5}\right),\ i=1,2,3,4$$

$$\cos\left(\frac{2\pi i}{11}\right),\ \sin\left(\frac{2\pi i}{11}\right),\ i=1,2,3,4,5$$

$$\cos\left(\frac{2\pi i}{13}\right),\ \sin\left(\frac{2\pi i}{13}\right),\ i=1,2,3,4,5,6$$

Since index $n_2$ increases only to $(N_2-1)/2$ in Equations 43 and 44, value i is limited to $(N_2-1)/2$ for the last two cases in Equation 45.

The number of coefficients appearing in Equation 45 is 2×(2+4+5+6)=34, and 2×(2+5)=14 coefficients are required for 33-point DFT and 2×(2+6)=20 coefficients are required for 65-point DFT. Each coefficient can be approximated to an integer through scaling and rounding and, since input data of DST7 is residual data in the form of an integer, all associated calculations can be performed as integer calculations. Since intermediate results values are also scaled values, it is necessary to appropriately apply down scaling in each calculation step or output step.

In addition, reference order of coefficient values may vary according to values $k_1$ and $k_2$ because reference forms of cosine values and sine values are $$\cos\left(\frac{2\pi k_1n_1}{N_1}\right),\ \sin\left(\frac{2\pi k_1n_1}{N_1}\right),\ \cos\left(\frac{2\pi k_2n_2}{N_2}\right),\text{ and }\sin\left(\frac{2\pi k_2n_2}{N_2}\right).$$

Accordingly, an order table having the values $k_1$ and $k_2$ as addresses may be generated and reference order according to $n_1$ and $n_2$ may be obtained in the form of a table look-up. For example, if $N_2=11$, $k_2=3$, $\lfloor\langle k_2n_2\rangle_{N_2}\rfloor_{n_2=1,2,\ldots,5}=[3,6,9,1,4]$ can be a corresponding table entry and the table entry corresponding to all available values $k_2$ may be set.

Rectangles denoted by 16 and 32 in FIGS. 44 and 45 represent data permutation and code conversion. Simplified 3-point DFT Type 1, simplified 3-point DFT Type 2, simplified 5-point DFT Type 1, and simplified 5-point DFT Type 2 blocks in FIGS. 44 and 45 can receive corresponding data through index conversion represented by Equations 15 and 16 and input data symmetries represented by Equations 25 and 26, and some data is input after conversion of signs thereof due to symmetries of Equations 25 and 26.

In embodiments of the present disclosure, simplified 3-point DFT Type 2 of FIG. 44 and simplified 5-point DFT Type 2 of FIG. 45 are calculated through Equation 39. More specifically, they correspond to a case in which $n_2\neq0$ in Equation 39, and the absolute values of $$\cos\left(\frac{2\pi k_1n_1}{N_1}\right)\text{ and }\sin\left(\frac{2\pi k_1n_1}{N_1}\right)$$

are identical according to change in the value $n_1$ in many cases. Accordingly, $N_1$ multiplications are not required even if $n_1$ increases from 0 to $N_1-1$ as in Equation 39. It is assumed that a value A/B is scaled as represented by Equation 46 for a case in which $n_2\neq0$ in Equation 39 (i.e., in the case of simplified 3-point DFT Type 2 of FIG. 44 and simplified 5-point DFT Type 2 of FIG. 45).

[Equation 46]

$$\frac{A}{B}\hat{y}_R(k_1, n_2) = \frac{A}{B}\sum_{n_1=0}^{N_1-1}\hat{x}(n_1, n_2)\cos\left(\frac{2\pi k_1 n_1}{N_1}\right) = \frac{1}{B}\sum_{n_1=0}^{N_1-1}\hat{x}(n_1, n_2)\left[A\cos\left(\frac{2\pi k_1 n_1}{N_1}\right)\right]$$

$$\frac{A}{B}\hat{y}_I(k_1, n_2) = -\frac{A}{B}\sum_{n_1=0}^{N_1-1}\hat{x}(n_1, n_2)\sin\left(\frac{2\pi k_1 n_1}{N_1}\right) = \frac{1}{B}\left[-\sum_{n_1=0}^{N_1-1}\hat{x}(n_1, n_2)\left[A\sin\left(\frac{2\pi k_1 n_1}{N_1}\right)\right]\right]$$

Since $$\cos\left(\frac{2\pi k_1 n_1}{N_1}\right) \text{ or } \sin\left(\frac{2\pi k_1 n_1}{N_1}\right)$$

is a floating-point number having an absolute value equal to or greater than 1 as represented by Equation 46, an integer value or a floating-point number having sufficient accuracy can be generated when the value A is appropriately multiplied. 1/B that is finally multiplied in Equation 46 can be calculated only using a shift operation according to the value B. Details with respect thereto will be described later in embodiment 7.

When A/2B is multiplied instead of A/B in Equations 40 and 41, Equations 47 and 48 are obtained.

[Equation 47]

$$\frac{A}{2B}\hat{y}_R(k_1, 0) = 0,\ \frac{A}{2B}\hat{y}_I(k_1, 0) = \frac{1}{B}\left[-\hat{x}(1, 0)\left[A\sin\left(\frac{2\pi k_1}{3}\right)\right]\right]$$

[Equation 48]

$$\frac{A}{2B}\hat{y}_R(k_1, 0) = 0,\ \frac{A}{2B}\hat{y}_I(k_1, 0) = \frac{1}{B}\left[-\hat{x}(1, 0)\left[A\sin\left(\frac{2\pi k_1}{5}\right)\right] - \hat{x}(2, 0)\left[A\sin\left(\frac{2\pi k_1}{5}\right)\right]\right]$$

In Equations 47 and 48, an integer value or a floating-point number having sufficient accuracy can be generated by multiplying $$\cos\left(\frac{2\pi k_1 n_1}{N_1}\right) \text{ or } \sin\left(\frac{2\pi k_1 n_1}{N_1}\right)$$

by A, and 1/B that is finally multiplied can be calculated only using shift operation according to the value B. Details with respect thereto will be described later.

Simplified 11-point DFT Type 1 and Simplified 13-point DFT Type 1 perform operation (corresponding to a case in which $k_1=0$) described in Equation 43, and Equation 49 can be obtained when a value C/2D is multiplied as a scaling value.

[Equation 49]

$$\frac{C}{2D}\hat{X}_I(0, k_2) = \frac{1}{D}\sum_{n_2=1}^{\frac{N_2-1}{2}}[-\hat{y}_R(0, n_2)]\left[C\sin\left(\frac{2\pi k_2 n_2}{N_2}\right)\right]$$

$$\frac{A}{B}\frac{C}{2D}\hat{X}_I(0, k_2) = \frac{1}{D}\sum_{n_2=1}^{\frac{N_2-1}{2}}\left[-\frac{A}{B}\hat{y}_R(0, n_2)\right]\left[C\sin\left(\frac{2\pi k_2 n_2}{N_2}\right)\right]$$

Since $$\sin\left(\frac{2\pi k_2 n_2}{N_2}\right)$$

can be multiplied by C as in Equation 49, integer or fixed point operation can be applied. When A/B that is the scaling value multiplied in Equation 46 is considered, a total scaling value multiplied by $\hat{X}_I(0, k_2)$ that is one piece of final result data becomes $$\frac{A}{B}\frac{C}{2D}$$

as represented in Equation 49. Further, $$\frac{A}{B}\hat{y}_R(0, n_2)$$

calculated from Equation 46 can be directly applied as an input as represented in Equation 49.

Simplified 11-point DFT Type 2 and simplified 13-point DFT Type 2 are calculated through Equation 44 (simplified 11-point DFT Type 2 is performed when $k_1=1$ and simplified 13-point DFT Type 2 is performed when $k_1=1, 2$), and Equation 50 is obtained when C/2D is multiplied as a scaling value as in Equation 49.

[Equation 50]

$$\frac{C}{2D}\hat{X}_I(k_1, k_2) = \left[\frac{1}{D}\sum_{n_2=1}^{\frac{N_2-1}{2}}\hat{y}_I(k_1, n_2)\left[C\cos\left(\frac{2\pi k_2 n_2}{N_2}\right)\right]\right] + \frac{C}{2D}\hat{y}_I(k_1, 0) + \left[\frac{1}{D}\sum_{n_2=1}^{\frac{N_2-1}{2}}[-\hat{y}_R(k_1, k_2)]\left[C\sin\left(\frac{2\pi k_2 n_2}{N_2}\right)\right]\right]$$

$$\frac{A}{B}\frac{C}{2D}\hat{X}_I(k_1, k_2) = \left[\frac{1}{D}\sum_{n_2=1}^{\frac{N_2-1}{2}}\tilde{y}_I(k_1, n_2)\left[C\cos\left(\frac{2\pi k_2 n_2}{N_2}\right)\right]\right] + \left[\frac{1}{D}\sum_{n_2=1}^{\frac{N_2-1}{2}}\left[-\frac{A}{B}\hat{y}_R(k_1, n_2)\right]\left[C\sin\left(\frac{2\pi k_2 n_2}{N_2}\right)\right]\right]$$

$$\text{where } \tilde{y}_I(k_1, n_2) = \begin{cases}\frac{A}{2B}\hat{y}_I(k_1, 0), & \text{if } n_2 = 0\\ \frac{A}{B}\hat{y}_I(k_1, n_2), & \text{otherwise}\end{cases}$$

It can be confirmed that $$\sin\left(\frac{2\pi k_2 n_2}{N_2}\right) \text{ and } \cos\left(\frac{2\pi k_2 n_2}{N_2}\right)$$

are multiplied by C in Equation 50 as in Equation 49. Accordingly, the integer or a floating-point operation can be used to multiply a cosine value by a sine value. When A/B multiplied in Equation 46 and A/2B multiplied in Equations 47 and 48 are considered together as in Equation 49, the second equation in Equation 50 is obtained. When $\tilde{y}_I(k_1, n_2)$ is defined as represented by Equation 50, values obtained through Equations 46 to 48 can be used as input data of Equation 50.

Available values $k_2$ in Equation 50 are 0 to 10 in the case of simplified 11-point DFT Type 2 and 0 to 12 in the case of simplified 13-point DFT Type 2. Relations such as Equation 51 are established due to symmetry basically present in a cosine value and a sine value.

[Equation 51]

$$f(k_1, k_2) = \frac{1}{D}\sum_{n_2=1}^{\frac{N_2-1}{2}} \hat{y}_I(k_1, n_2)\left[C\cos\left(\frac{2\pi k_2 n_2}{N_2}\right)\right]$$

$$g(k_1, k_2) = \frac{1}{D}\sum_{n_2=1}^{\frac{N_2-1}{2}} \left[-\frac{A}{B}\hat{y}_R(k_1, n_2)\right]\left[C\sin\left(\frac{2\pi k_2 n_2}{N_2}\right)\right]$$

$$\frac{A}{B}\frac{C}{2D}\hat{X}_I(k_1, k_2) = f(k_1, k_2) + g(k_1, k_2) = h(k_1, k_2)$$

$$h(k_1, k_2) = \begin{cases} f(k_1, k_2), & k_2 = 0 \\ f(k_1, k_2) + g(k_1, k_2), & 1 \le k_2 \le \frac{N_2-1}{2} \\ f(k_1, N_2-k_2) - g(k_1, N_2-k_2), & \frac{N_2-1}{2} \le k_2 \le N_2-1 \end{cases}$$

In Equation 51, $N_2$ for simplified 11-point DFT Type 2 is 11 and $N_2$ for simplified 13-point DFT Type 2 is 13. All identifiers appearing in Equation 51 are defined as in Equation 50.

Accordingly, only the range of $$0 \le k_2 \le \frac{N_2-1}{2}$$

can be calculated for $f(k_1, k_2)$ and only the range of $$1 \le k_2 \le \frac{N_2-1}{2}$$

can be calculated for $g(k_1, k_2)$ as in Equation 51. With respect to Equation 49, only the range of $$1 \le k_2 \le \frac{N_2-1}{2}$$

can be calculated due to symmetry for $k_2$ according to the same principle.

In an embodiment of the present disclosure, all the aforementioned scaling values have a form of A/B, $$\cos\left(\frac{2\pi kn}{N}\right) \text{ or } \sin\left(\frac{2\pi kn}{N}\right)$$

is multiplied by A first such that integer operation can be performed and then multiplied by 1/B. Further, since the number of cosine values and sine values appearing in all equations is limited as in Equation 45, corresponding cosine values and sine values are multiplied by A in advance and stored in an array or a ROM such that they can be used through in a table look-up manner. Equation 46 may be represented as Equation 52.

[Equation 52]

$$\frac{A}{B}\hat{y}_R(k_1, n_2) = \frac{1}{B}\sum_{n_1=0}^{N_1-1}\hat{x}(n_1, n_2)\left[A\cos\left(\frac{2\pi k_1 n_1}{N_1}\right)\right]$$

$$\frac{A}{B}\hat{y}_I(k_1, n_2) = \frac{1}{B}\left[-\sum_{n_1=0}^{N_1-1}\hat{x}(n_1, n_2)\left[A\sin\left(\frac{2\pi k_1 n_1}{N_1}\right)\right]\right]$$

Here, when $$A\cos\left(\frac{2\pi kn}{N}\right) \text{ or } A\sin\left(\frac{2\pi kn}{N}\right)$$

is multiplied by a sufficiently large value as A and then rounded off, it is possible to maintain sufficient accuracy of cosine or sine values while modifying the cosine or sine values into scaled integer values. A power of 2 (2n) may be generally used as the value A. For example, $$A\cos\left(\frac{2\pi kn}{N}\right) \text{ or } A\sin\left(\frac{2\pi kn}{N}\right)$$

can be approximated through a method represented by Equation 53.

[Equation 53]

$$2^n\cos\left(\frac{2\pi kn}{N}\right) \approx \text{round}\left(2^n\cos\left(\frac{2\pi kn}{N}\right)\right)$$

In Equation 53, round represents a rounding operator. While any rounding method for conversion into an integer can be used, conventional rounding off based on 0.5 can be used.

Multiplying by 1/B (i.e., dividing by B) in Equation 52 can be implemented through right shift operation when B is a power of 2. When B=2m, multiplication for 1/B can be approximated as in Equation 54. Here, rounding can be considered as in Equation 54, but the present disclosure is not limited thereto.

[Equation 54]

$$\frac{x}{2^m} \approx \begin{cases} x \gg m, & \text{when rounding is not considered} \\ (x + (1 \ll (m-1))) \gg m, & \text{when rounding is considered} \end{cases}$$

Meanwhile, the multiplied value A need not necessarily be a power of 2 as represented in Equation 53. Particularly, when a scaling factor in the form of $$\frac{1}{\sqrt{N}}$$

needs to be additionally multiplied, this can be reflected in the value A.

For example, since values multiplied as numerators in Equations 49 to 51 are A and C, one of A and C may be multiplied by $$\frac{1}{\sqrt{N}}$$

or A may be multiplied by α and C may be multiplied by β when $$\frac{1}{\sqrt{N}} = \alpha\beta.$$

As an example in which A is not a power, a value such as $$2^{\frac{1}{2}}$$

may be additionally multiplied because a case in which $$2^{\frac{1}{2}}$$

is additionally multiplied in order to equally maintain ranges of kernel coefficient values for transforms of all sizes in a CODEC system to which the present disclose is applied occurs.

In a similar manner, the aforementioned Equations 40, 41, 43, and 44 can be appropriately approximated to simple operations of Equations 55 to 58, respectively.

$$\frac{A}{2B}\hat{y}_R(k_1, 0) = 0,\ \frac{A}{2B}\hat{y}_I(k_1, 0) = \frac{1}{B}\left[-\hat{x}(1, 0)\left[A\sin\left(\frac{2\pi k_1}{3}\right)\right]\right] \quad \text{[Equation 55]}$$

$$\frac{A}{2B}\hat{y}_R(k_1, 0) = 0,\ \frac{A}{2B}\hat{y}_I(k_1, 0) = \frac{1}{B}\left[-\hat{x}(1, 0)\left[A\sin\left(\frac{2\pi k_1}{5}\right)\right] - \hat{x}(2, 0)\left[A\sin\left(\frac{2\pi k_1}{5}\right)\right]\right] \quad \text{[Equation 56]}$$

$$\frac{A}{B}\frac{C}{2D}\hat{X}_I(0, k_2) = \frac{1}{D}\sum_{n_2=1}^{\frac{N_2-1}{2}}\left[-\frac{A}{B}\hat{y}_R(0, n_2)\right]\left[C\sin\left(\frac{2\pi k_2 n_2}{N_2}\right)\right] \quad \text{[Equation 57]}$$

$$f(k_1, k_2) = \frac{1}{D}\sum_{n_2=1}^{\frac{N_2-1}{2}}\tilde{y}_I(k_1, n_2)\left[C\cos\left(\frac{2\pi k_2 n_2}{N_2}\right)\right], \quad \text{[Equation 58]}$$

$$g(k_1, k_2) = \frac{1}{D}\sum_{n_2=1}^{\frac{N_2-1}{2}}\left[-\frac{A}{B}\hat{y}_R(k_1, n_2)\right]\left[C\sin\left(\frac{2\pi k_2 n_2}{N_2}\right)\right]$$

$$\frac{A}{B}\frac{C}{2D}\hat{X}_I(k_1, k_2) = \begin{cases} f(k_1, k_2), & k_2 = 0 \\ f(k_1, k_2) + g(k_1, k_2), & 1 \le k_2 \le \frac{N_2-1}{2} \\ f(k_1, N_2-k_2) - g(k_1, N_2-k_2), & \frac{N_2+1}{2} \le k_2 \le N_2 - 1 \end{cases}$$

$$\text{where } \tilde{y}_I(k_1, n_2) = \begin{cases} \frac{A}{2B}\hat{y}_I(k_1, 0), & \text{if } n_2 = 0 \\ \frac{A}{B}\hat{y}_I(k_1, n_2), & \text{otherwise} \end{cases}$$

Here, since $f(k_1, k_2)$ and $g(k_1, k_2)$ can be calculated only in partial ranges $$\left(\left[0, \frac{N_2-1}{2}\right] \text{ and } \left[1, \frac{N_2-1}{2}\right]\right)$$

due to symmetry, complexity can be substantially reduced.

Furthermore, approximation for multiplying by A and approximation for multiplying by 1/B may also be applied to Equations 47 to 51.

An example of approximate implementation for scaling factor multiplication in length-8, 16, and 32 DST7 is shown in Table 45. A, B, C, and D in Table 45 are identical to A, B, C, and D in Equations 46 to 51, and "shift" is a value input to a DST7 function as a factor and may be a value determined according to a method of executing quantization (or inverse quantization) performed after transform (or before inverse transform).

TABLE 45

| Config. | | Original | Approximation |
|---|---|---|---|
| 8 × 8 DST7 | 17-pt DFT | $A\sin\left(\frac{2\pi k}{17}\right)$, | $\text{round}\left\{\frac{1}{\sqrt{17}} \cdot 2^{\frac{1}{2}} \cdot \sin\left(\frac{2\pi k}{17}\right) \cdot 2^{10}\right\}$, |
| | | k = 1, 2, . . . , 8<br>1/B = $2^{-shift}$ | k = 1, 2, . . . , 8<br>(x + (1 << (shift − 1)) >> shift |
| 16 × 16 DST7 | 3-pt DFT | $A\sin\left(\frac{2\pi k}{3}\right)$, | $\text{round}\left\{\sin\left(\frac{2\pi k}{3}\right) \cdot 2^{9}\right\}$, |
| | | k = 1,<br>1/B = $2^{-10}$ | k = 1<br>(x + (1 << 9) >> 10 |
| | 11-pt DFT | $C\sin\left(\frac{2\pi k}{11}\right)$, | $\text{round}\left\{\frac{1}{\sqrt{33}} \cdot \sin\left(\frac{2\pi k}{11}\right) \cdot 2^{11}\right\}$, |
| | | k = 1, 2, . . . , 5 | k = 1, 2, . . . , 5 |
| | | $C\cos\left(\frac{2\pi k}{11}\right)$, | $\text{round}\left\{\frac{1}{\sqrt{33}} \cdot \cos\left(\frac{2\pi k}{11}\right) \cdot 2^{11}\right\}$, |
| | | k = 0, 1, . . . , 5<br>1/D = $2^{-(shift-1)}$ | k = 0, 1, . . . , 5<br>(x + (1 << (shift − 2)) >> (shift − 1) |
| 32 × 32 DST7 | 5-pt DFT | $A\sin\left(\frac{2\pi k}{5}\right)$, | $\text{round}\left\{\sin\left(\frac{2\pi k}{5}\right) \cdot 2^{9}\right\}$, |
| | | k = 1, 2 | k = 1, 2 |
| | | $A\cos\left(\frac{2\pi k}{5}\right)$, | $\text{round}\left\{\cos\left(\frac{2\pi k}{5}\right) \cdot 2^{9}\right\}$, |
| | | k = 1, 2<br>1/B = $2^{-10}$ | k = 1, 2<br>(x + (1 << 9) >> 10 |
| | 13-pt DFT | $C\sin\left(\frac{2\pi k}{13}\right)$, | $\text{round}\left\{\frac{1}{\sqrt{65}} \cdot 2^{\frac{1}{2}} \cdot \sin\left(\frac{2\pi k}{13}\right) \cdot 2^{11}\right\}$, |
| | | k = 1, 2, . . . , 6 | k = 1, 2, . . . , 6 |
| | | $C\cos\left(\frac{2\pi k}{13}\right)$, | $\text{round}\left\{\frac{1}{\sqrt{65}} \cdot 2^{\frac{1}{2}} \cdot \cos\left(\frac{2\pi k}{13}\right) \cdot 2^{11}\right\}$, |
| | | k = 0, 1, . . . , 6<br>1/D = $2^{-(shift-1)}$ | k = 0, 1, . . . , 6<br>(x + (1 << (shift − 2)) >> (shift − 1) |

Table 46 shows an example in which scaling values different from those in Table 45 are applied. That is, scaling values obtained by multiplying scaling values in Table 45 by ¼ are used.

TABLE 46

| Config. | | Original | Approximation |
|---|---|---|---|
| 8 × 8 DST7 | 17-pt DFT | $A\ \sin\left(\frac{2\pi k}{17}\right)$, | $\text{round}\left\{\frac{1}{\sqrt{17}}\cdot 2^{\frac{1}{2}}\cdot\sin\left(\frac{2\pi k}{17}\right)\cdot 2^{8}\right\}$, |
| | | k = 1, 2, . . . , 8<br>$1/B = 2^{-shift}$ | k = 1, 2, . . . , 8<br>(x + (1 << (shift − 1)) >> shift |
| 16 × 16 DST7 | 3-pt DFT | $A\ \sin\left(\frac{2\pi k}{3}\right)$, | $\text{round}\left\{\sin\left(\frac{2\pi k}{3}\right)\cdot 2^{7}\right\}$, |
| | | k = 1,<br>$1/B = 2^{-10}$ | k = 1<br>(x + (1 << 7) >> 8 |
| | 11-pt DFT | $C\ \sin\left(\frac{2\pi k}{11}\right)$, | $\text{round}\left\{\frac{1}{\sqrt{33}}\cdot\sin\left(\frac{2\pi k}{11}\right)\cdot 2^{9}\right\}$, |
| | | k = 1, 2, . . . , 5 | k = 1, 2, . . . , 5 |
| | | $C\ \cos\left(\frac{2\pi k}{11}\right)$, | $\text{round}\left\{\frac{1}{\sqrt{33}}\cdot\cos\left(\frac{2\pi k}{11}\right)\cdot 2^{9}\right\}$, |
| | | k = 0, 1, . . . , 5<br>$1/D = 2^{-(shift-1)}$ | k = 0, 1, . . . , 5<br>(x + (1 << (shift − 2)) >> (shift − 1) |
| 32 × 32 DST7 | 5-pt DFT | $A\ \sin\left(\frac{2\pi k}{5}\right)$, | $\text{round}\left\{\sin\left(\frac{2\pi k}{5}\right)\cdot 2^{7}\right\}$, |
| | | k = 1, 2 | k = 1, 2 |
| | | $A\ \cos\left(\frac{2\pi k}{5}\right)$, | $\text{round}\left\{\cos\left(\frac{2\pi k}{5}\right)\cdot 2^{7}\right\}$, |
| | | k = 1, 2<br>$1/B = 2^{-10}$ | k = 1, 2<br>(x + (1 << 7) >> 8 |
| | 13-pt DFT | $C\ \sin\left(\frac{2\pi k}{13}\right)$, | $\text{round}\left\{\frac{1}{\sqrt{65}}\cdot 2^{\frac{1}{2}}\cdot\sin\left(\frac{2\pi k}{13}\right)\cdot 2^{9}\right\}$, |
| | | k = 1, 2, . . . , 6 | k = 1, 2, . . . , 6 |
| | | $C\ \cos\left(\frac{2\pi k}{13}\right)$, | $\text{round}\left\{\frac{1}{\sqrt{65}}\cdot 2^{\frac{1}{2}}\cdot\cos\left(\frac{2\pi k}{13}\right)\cdot 2^{9}\right\}$, |
| | | k = 0, 1, . . . , 6<br>$1/D = 2^{-(shift-1)}$ | k = 0, 1, . . . , 6<br>(x + (1 << (shift − 2)) >> (shift − 1) |

FIG. 46 is a flowchart illustrating encoding of performing forward discrete sine transform-7 (DST7) and forward discrete cosine transform-8 (DCT8) through discrete Fourier transform (DFT) as an embodiment to which the present disclosure is applied.

An encoder may determine (or select) a horizontal transform and/or a vertical transform based on at least one of a prediction mode, a block shape, and a block size of a current block (S4610).

The encoder may determine an optimal horizontal transform and/or an optimal vertical transform through rate distortion (RD) optimization. The optimal horizontal transform and/or the optimal vertical transform may correspond to one of a plurality of transform combinations, and the plurality of transform combinations may be defined by transform indexes.

The encoder may signal transform indexes corresponding to the optimal horizontal transform and/or the optimal vertical transform (S4620). Here, the transform indexes may be applied to other embodiments described in the present disclosure.

As another example, a horizontal transform index for the optimal horizontal transform and a vertical transform index for the optimal vertical transform may be independently signaled.

The encoder may perform forward transform on the current block in the horizontal direction using the optimal horizontal transform (S4630). Here, the current block may refer to a transform block and the optimal horizontal transform may be forward DCT8.

In addition, the encoder may perform forward transform on the current block in the vertical direction using the optimal vertical transform (S4640). Here, the optimal vertical transform may be forward DST7, and forward DST7 may be designed as DFT.

Although the horizontal transform is performed and then the vertical transform is performed in the present embodiment, the present disclosure is not limited thereto. That is, the vertical transform may be performed first and then the horizontal transform may be performed.

The encoder may generate a transform coefficient block by performing quantization on the current block (S4650).

The encoder may perform entropy encoding on the transform coefficient block to generate a bitstream.

FIG. 47 is a flowchart illustrating decoding of performing inverse discrete sine transform-7 (DST7) and inverse discrete cosine transform-8 (DCT8) through discrete Fourier transform (DFT) as an embodiment to which the present disclosure is applied.

A decoder may obtain transform indexes from a bitstream (S4710). Here, the transform indexes may be applied to other embodiments described in the present disclosure.

The decoder may derive a horizontal transform and a vertical transform corresponding to the transform indexes (S4720).

However, steps S4710 and S4720 are an embodiment and the present disclosure is not limited thereto. For example, the decoder may derive the horizontal transform and the vertical transform based on a prediction mode, a block shape and a block size of a current block. As another example, the transform indexes may include a horizontal transform index corresponding to the horizontal transform and a vertical transform index corresponding to the vertical transform.

The decoder may perform entropy decoding on the bitstream to obtain a transform coefficient block and perform inverse quantization on the transform coefficient block (S4730).

The decoder may perform inverse transform on the inversely quantized transform coefficient block in the vertical direction using the vertical transform (S4740). Here, the vertical transform may correspond to DST7. That is, the decoder can apply inverse DST7 to the inversely quantized transform coefficient block.

The present disclosure provides a method for designing forward DST7 and/or inverse DST7 as discrete Fourier transform (DFT).

The decoder may implement DST7 through one-dimensional DFT or two-dimensional DFT.

Further, the decoder may implement DST7 only using integer operation by applying various scaling methods.

In addition, the decoder may design length-8, 16, and 32 DST7 through a method of implementing DST7 using DFT and a method of implementing DST7 only using integer operation.

In an embodiment, the decoder may derive a transform combination corresponding to a transform index and perform inverse transform on the current block in the vertical or horizontal direction using DST7 or DCT8. Here, the transform combination may include a horizontal transform and a vertical transform, and the horizontal transform and the vertical transform may correspond to any one of DST7 and DCT8.

In an embodiment, the present disclosure may include a step of distinguishing two partial vector signals for one row or one column of DST7 when 33-point DFT is applied to DST7, and a step of applying 11-point DFT type 1 or 11-point DFT type 2 to the two partial vector signals.

In an embodiment, when one row or one column of DST7 is represented as src[0 . . . 15], the two partial vector signals may be distinguished as src[0 . . . 4] and src[5 . . . 15].

In an embodiment, the present disclosure may include a step of distinguishing three partial vector signals for one row or one column of DST7 when 65-point DFT is applied to DST7, and a step of applying 13-point DFT type 1 or 13-point DFT type 2 to the three partial vector signals.

In an embodiment, when one row or one column of DST7 is represented as src[0 . . . 31], the three partial vector signals may be distinguished as src[0 . . . 5], src[6 . . . 18] and src[19 . . . 31].

In an embodiment, 13-point DFT type 1 may be applied to src[0 . . . 5] among the three partial vector signals, and 13-point DFT type 2 may be applied to src[6 . . . 18] and src[19 . . . 31].

In an embodiment, one-dimensional 33-point DFT necessary for 16×16 DST7 and one-dimensional 65-point DFT necessary for 32×32 DST7 may be decomposed into equivalent two-dimensional DFTs having shorter DFTs. In this manner, it is possible to eliminate redundant calculation and design low-complexity DST7 by executing DST7 according to DFT. In addition, the decoder may perform inverse transform in the horizontal direction using the horizontal transform (S4750). Here, the horizontal transform may correspond to DCT8. That is, the decoder may apply inverse DCT8 to the inversely quantized transform coefficient block.

Although the vertical transform is applied and then the horizontal transform is applied in the present embodiment, the present disclosure is not limited thereto. That is, the horizontal transform may be applied first and then the vertical transform may be applied.

In an embodiment, a combination of the horizontal transform and the vertical transform may include at least one of the embodiments of FIG. 6.

The decoder generates a residual block through step S4750 and generates a restored block by adding the residual block to a predicted block.

Furthermore, the processing methods to which the present disclosure is applied may be manufactured in the form of a program executed by a computer and stored in computer-readable recording media. Multimedia data having the data structure according to the present disclosure may also be stored in computer-readable recording media. The computer-readable recording media include all types of storage devices and distributed storage devices in which data readable by a computer is stored. The computer-readable recording media may include a Blueray disk (BD), a universal serial bus (USB), a ROM, a PROM, an EEPROM, a RAM, a CD-ROM, a magnetic tape, a floppy disk, and an optical data storage device, for example. Furthermore, the computer-readable recording media includes media implemented in the form of carrier waves (e.g., transmission through the Internet). Furthermore, a bit stream generated by the encoding method may be stored in a computer-readable recording medium or may be transmitted over wired/wireless communication networks.

Moreover, embodiments of the present disclosure may be implemented as computer program products according to program code and the program code may be executed in a computer according to embodiment of the present disclosure. The program code may be stored on computer-readable carriers.

As described above, the embodiments of the present disclosure may be implemented and executed on a processor, a microprocessor, a controller or a chip. For example, functional units shown in each figure may be implemented and executed on a computer, a processor, a microprocessor, a controller or a chip.

Furthermore, the decoder and the encoder to which the present disclosure is applied may be included in multimedia broadcast transmission/reception apparatuses, mobile communication terminals, home cinema video systems, digital cinema video systems, monitoring cameras, video conversation apparatuses, real-time communication apparatuses such as video communication, mobile streaming devices, storage media, camcorders, video-on-demand (VOD) service providing apparatuses, over the top video (OTT) video systems, Internet streaming service providing apparatuses, 3D video systems, video phone video systems, medical video systems, etc. and may be used to process video signals or data signals. For example, OTT video systems may include game consoles, Blueray players, Internet access TVs, home theater systems, smartphones, tablet PCs, digital video recorders (DVRs), etc.

Furthermore, the processing methods to which the present disclosure is applied may be manufactured in the form of a program executed by a computer and stored in computer-readable recording media. Multimedia data having the data structure according to the present disclosure may also be stored in computer-readable recording media. The computer-readable recording media include all types of storage devices and distributed storage devices in which data readable by a computer is stored. The computer-readable recording media may include a Blueray disk (BD), a universal serial bus (USB), a ROM, a PROM, an EEPROM, a RAM, a CD-ROM, a magnetic tape, a floppy disk, and an optical data storage device, for example. Furthermore, the computer-readable recording media includes media implemented in the form of carrier waves (e.g., transmission through the Internet). Furthermore, a bit stream generated by the encoding method may be stored in a computer-readable recording medium or may be transmitted over wired/wireless communication networks.

Moreover, embodiments of the present disclosure may be implemented as computer program products according to program code and the program code may be executed in a computer according to embodiment of the present disclosure. The program code may be stored on computer-readable carriers.

Embodiments described above are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an exemplary embodiment or included as a new claim by a subsequent amendment after the application is filed.

The implementations of the present disclosure may be achieved by various means, for example, hardware, firmware, software, or a combination thereof. In a hardware configuration, the methods according to the implementations of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, the implementations of the present disclosure may be implemented in the form of a module, a procedure, a function, etc. Software code may be stored in the memory and executed by the processor. The memory may be located at the interior or exterior of the processor and may transmit data to and receive data from the processor via various known means.

Those skilled in the art will appreciate that the present disclosure may be carried out in other specific ways than those set forth herein without departing from the spirit and essential characteristics of the present disclosure. Accordingly, the above embodiments are therefore to be construed in all aspects as illustrative and not restrictive. The scope of the present disclosure should be determined by the appended claims and their legal equivalents, not by the above description, and all changes coming within the meaning and equivalency range of the appended claims are intended to be embraced therein.

INDUSTRIAL APPLICABILITY

Although exemplary aspects of the present disclosure have been described for illustrative purposes, those skilled in the art will appreciate that various modifications, additions and substitutions are possible, without departing from essential characteristics of the disclosure.

What is claimed is:

1. A method comprising:

checking whether a transform skip is applied to a current block;

obtaining a transform index specifying which transform kernels are applied along horizontal and vertical directions of the current block based on that the transform skip is not applied to the current block;

determining a non-zero region based on the transform kernels specified by the transform index and a width and/or a height of the current block, wherein the transform kernels correspond to at least one of predefined transform types including DCT2, DST7 and DCT8;

performing an inverse transform on the non-zero region based on the transform kernels specified by the transform index to generate residual samples of the current block; and generating reconstructed samples of the current block based on the residual samples.

2. The method of claim 1, wherein, based on that the transform kernels correspond to DCT2, a width of the non-zero region is determined as a smaller value between the width of the current block and 32, and a height of the non-zero region is determined as a smaller value between the height of the current block and 32.

3. The method of claim 1, wherein, based on that the transform kernels correspond to one of a plurality of transform combinations of DST7 and/or DCT8, a width of the non-zero region is determined as a smaller value between the width of the current block and 16 and a height of the non-zero region is determined as a smaller value between the height of the current block and 16.

4. The method of claim 1, further comprising:

obtaining a syntax element indicating a position of a last significant coefficient in scan order within the current block, and obtaining coefficients to which the inverse transform is applied from the video signal based on the position of the last significant coefficient.

5. The method of claim 4, wherein the syntax element is binarized according to a truncated unary method, and a maximum length of code for the syntax element is determined based on a remaining region other than the non-zero region.

6. A method comprising:

determining whether a transform skip is applied to a current block;

deriving transform kernels being applied to a current block, wherein the transform kernels include a horizontal transform kernel and a vertical transform kernel;

determining a non-zero region in which a transform is applied to the current block based on the transform kernels and a width and/or a height of the current block;

performing a transform on the current block based on the transform kernels;

generating a transform index specifying which transform kernels are applied along horizontal and vertical directions of the current block based on that the transform skip is not applied to the current block, wherein the transform kernels correspond to at least one of predefined transform types including DCT2, DST7 and DCT8; and generating a syntax element representing whether the transform skip is applied to the current block.

7. The method of claim 6, wherein, based on that the transform kernels correspond to DCT2, a width of the non-zero region is determined as a smaller value between the width of the current block and 32, and a height of the non-zero region is determined as a smaller value between the height of the current block and 32.

8. The method of claim 6, wherein, based on that the transform kernels correspond to one of a plurality of transform combinations of DST7 and/or DCT8, a width of the non-zero region is determined as a smaller value between the width of the current block and 16 and a height of the non-zero region is determined as a smaller value between the height of the current block and 16.

9. The method of claim 6, further comprising:

generating a syntax element indicating a position of a last significant coefficient in scan order within the current block.

10. The method of claim 9, wherein the syntax element is binarized according to a truncated unary method, and a maximum length of code for the syntax element is determined based on a remaining region other than the non-zero region.

11. A method comprising:

generating a bitstream for a video signal, the bitstream is generated by determining whether a transform skip is applied to a current block, deriving transform kernels being applied to a current block, wherein the transform kernels include a horizontal transform kernel and a vertical transform kernel, determining a non-zero region in which a transform is applied to the current block based on the transform kernels and a width and/or a height of the current block, performing a transform on the current block based on the transform kernels, generating a transform index indicating which transform kernels are applied along horizontal and vertical directions of the current block based on that the transform skip is not applied to the current block, wherein the transform kernels correspond to at least one of predefined transform types including DCT2, DST7 and DCT8, and generating a syntax element representing whether the transform skip is applied to the current block; and transmitting data including the bitstream.

* * * * *